(12) United States Patent  
Parks et al.

(10) Patent No.: US 12,524,413 B2  
(45) Date of Patent: Jan. 13, 2026

(54) METADATA CHANGE TRIGGERS

(71) Applicant: Ab Initio Technology LLC, Lexington, MA (US)

(72) Inventors: Robert Parks, Weston, MA (US); Halldor Gylfason, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/885,179

(22) Filed: Sep. 13, 2024

(65) Prior Publication Data

US 2025/0335448 A1 Oct. 30, 2025

Related U.S. Application Data

(60) Provisional application No. 63/639,345, filed on Apr. 26, 2024.

(51) Int. Cl.  
 G06F 16/23 (2019.01)  
 G06F 16/2455 (2019.01)

(52) U.S. Cl.  
 CPC .... *G06F 16/24565* (2019.01); *G06F 16/2358* (2019.01)

(58) Field of Classification Search  
None  
See application file for complete search history.

(56) References Cited

U.S. PATENT DOCUMENTS

| | | | |
|---|---|---|---|
| 5,966,072 A | 10/1999 | Stanfill et al. | |
| 7,392,259 B2 | 6/2008 | Lee et al. | |
| 9,251,225 B2 | 2/2016 | Stanfill | |
| 11,397,719 B1* | 7/2022 | Khoyilar | H04L 51/216 |
| 11,704,494 B2 | 7/2023 | Butler et al. | |
| 11,853,282 B2* | 12/2023 | Kedia | G06F 16/24539 |
| 11,921,710 B2 | 3/2024 | Gylfason et al. | |
| 2014/0279808 A1* | 9/2014 | Strassner | G06Q 10/06 706/47 |
| 2021/0240675 A1* | 8/2021 | Portisch | G06F 16/212 |

(Continued)

OTHER PUBLICATIONS

[No Author Listed], "Tutorial | Automation scenarios," Dataiku, Sep. 2023, 11 pages.

(Continued)

*Primary Examiner* — Scott A. Waldron  
(74) *Attorney, Agent, or Firm* — Fish & Richardson P.C.

(57) ABSTRACT

A method implemented by a data processing system for automatically detecting a change in entities of a first entity class, and, in response to the detecting, generating a notification specifying that a change relating to a second entity class has been detected, including: storing an entity model for entity classes; determining that a notification is to be generated upon detection of a change to entities of a first entity class of the entity model, the notification specifying that the detected change relates to a second entity class; detecting a change to an entity of the first entity class; responsive to the change, traversing edges of the entity model to identify a node representing an entity of the second entity class related to another node representing the entity of the first entity class; generating the notification for the entity of the second entity class; and storing the notification for transmission.

23 Claims, 45 Drawing Sheets

(56) References Cited

U.S. PATENT DOCUMENTS

2023/0185983 A1* 6/2023 Ramanasankaran .... G06F 30/27 703/1
2024/0346051 A1 10/2024 Isman et al.

OTHER PUBLICATIONS

Bertino et al., "Trigger Inheritance and Overriding in an Active Object Database System," IEEE Transactions on Knowledge and Data Engineering, Jul./Aug. 2000, 12(4):588-608.

doc.dataiku.com [online], "Launching a scenario," available on or before Jun. 9, 2023, via Internet Archive: Wayback Machine URL <https://web.archive.org/web/20230609013052/https://doc.dataiku.com/dss/latest/scenarios/triggers.html>, retrieved on Dec. 18, 2024, retrieved from URL <https://doc.dataiku.com/dss/latest/scenarios/triggers.html>, 4 pages.

docs.oracle.com [online], "Oracle 8 Concepts: Release 8.0: 18 Database Triggers," available on or before Oct. 29, 2012, via Internet Archive: Wayback Machine URL <https://web.archive.org/web/20121029060844/https://docs.oracle.com/cd/A58617_01/server.804/a58227/ch15.htm>, retrieved on Dec. 18, 2023, retrieved from URL <https://docs.oracle.com/cd/A58617_01/server.804/a58227/ch15.htm>, 13 pages.

en.wikipedia.org [online], "Database trigger," available on or before Apr. 12, 2024, via Internet Archive: Wayback Machine URL <https://web.archive.org/web/20240412213545/https://en.wikipedia.org/wiki/Database_trigger>, retrieved on Dec. 18, 2024, retrieved from URL <https://en.wikipedia.org/wiki/Database_trigger>, 5 pages.

Kim et al., "A Framework for Supporting Triggers in Object-Oriented Database Systems," International Journal of Intelligent and Cooperative Information Systems, Mar. 1992, 1(1):127-143.

Bertino et al., "Extending the ODMG object model with triggers," IEEE Transactions on Knowledge and Data Engineering, Feb. 2004, 16(2):170-188.

Inngest.com [online], "Batching events—Inngest Documentation," available on or before Feb. 2024, via Internet Archive: Wayback Machine URL <https://web.archive.org/web/20240223143045/https://www.inngest.com/docs/guides/batching>, 4 pages.

International Search Report and Written Opinion in International Appln. No. PCT/US2025/026211, mailed on Aug. 11, 2025, 17 pages.

* cited by examiner

Example 1. Suppose that a class employee and a subclass manager are defined.

- trigger r₁ on class employee
  Events: modify(rank)
  Condition: employee(X),
  occurred(modify(rank),X),
  Y=X.rank, old(Y>X.rank)
  Action: modify(employee.salary, X,
  X.salary + 50)

- trigger r₂ on class manager
  Events: modify(rank)
  Condition: manager(X),
  occurred(modify(rank),X),
  Y=X.rank, old(Y>X.rank)
  Action: modify(=manager.salary, X,
  X.salary + 100)

In the above triggers, whenever the rank of an employee is increased, both r₁ and r₂ are triggered

FIG. 1A
(PRIOR ART)

(PRIOR ART ANNOTATED)

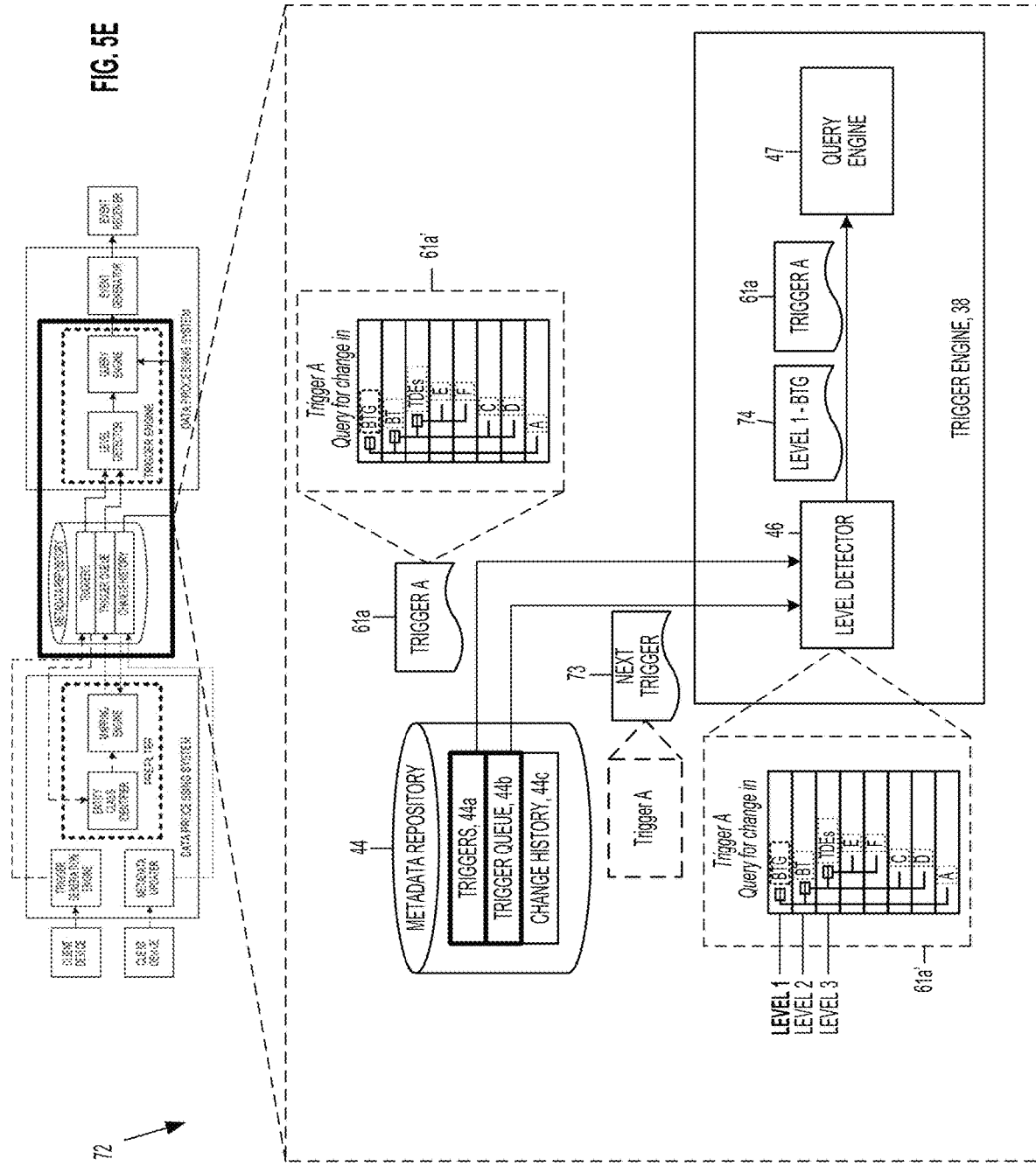

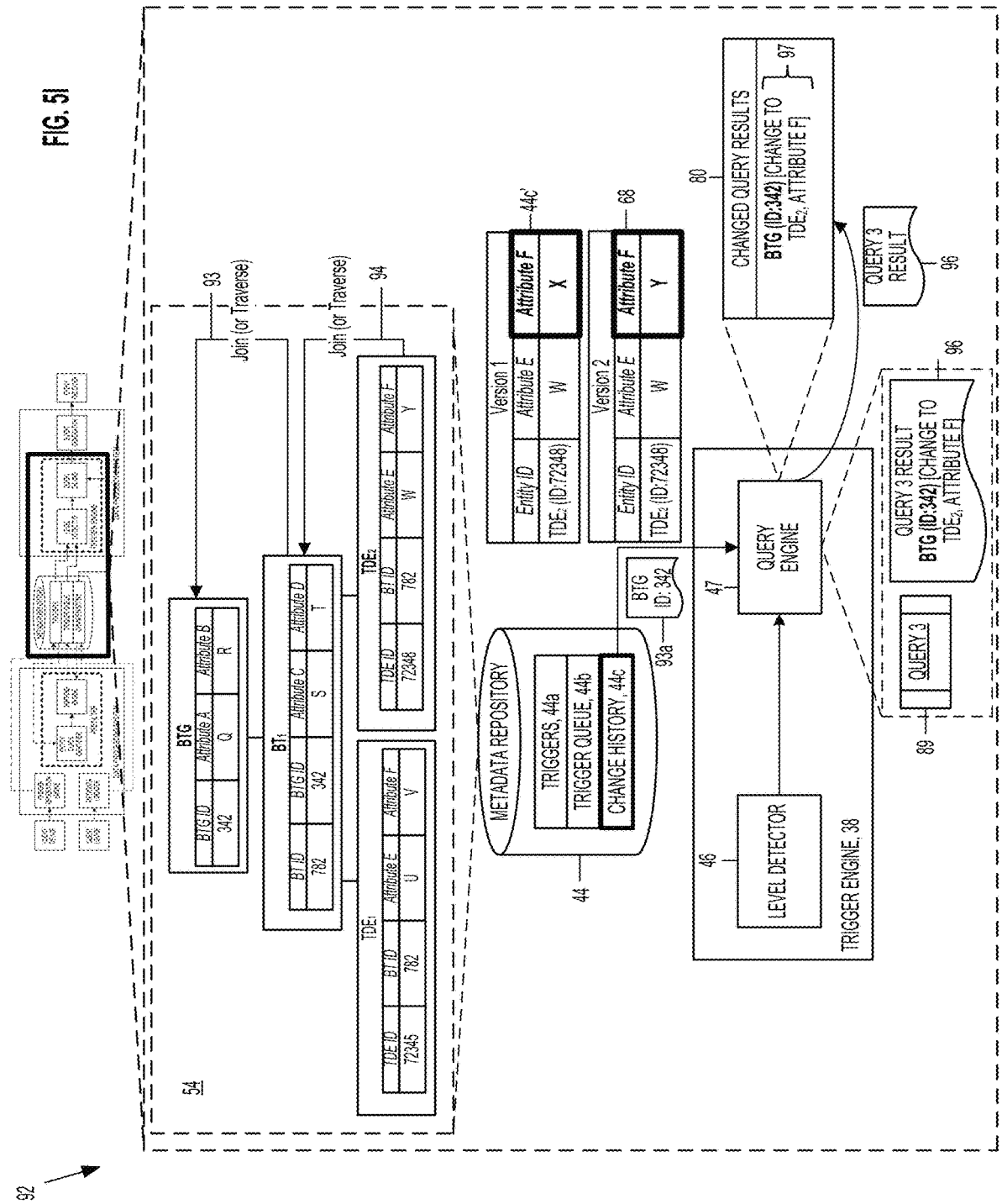

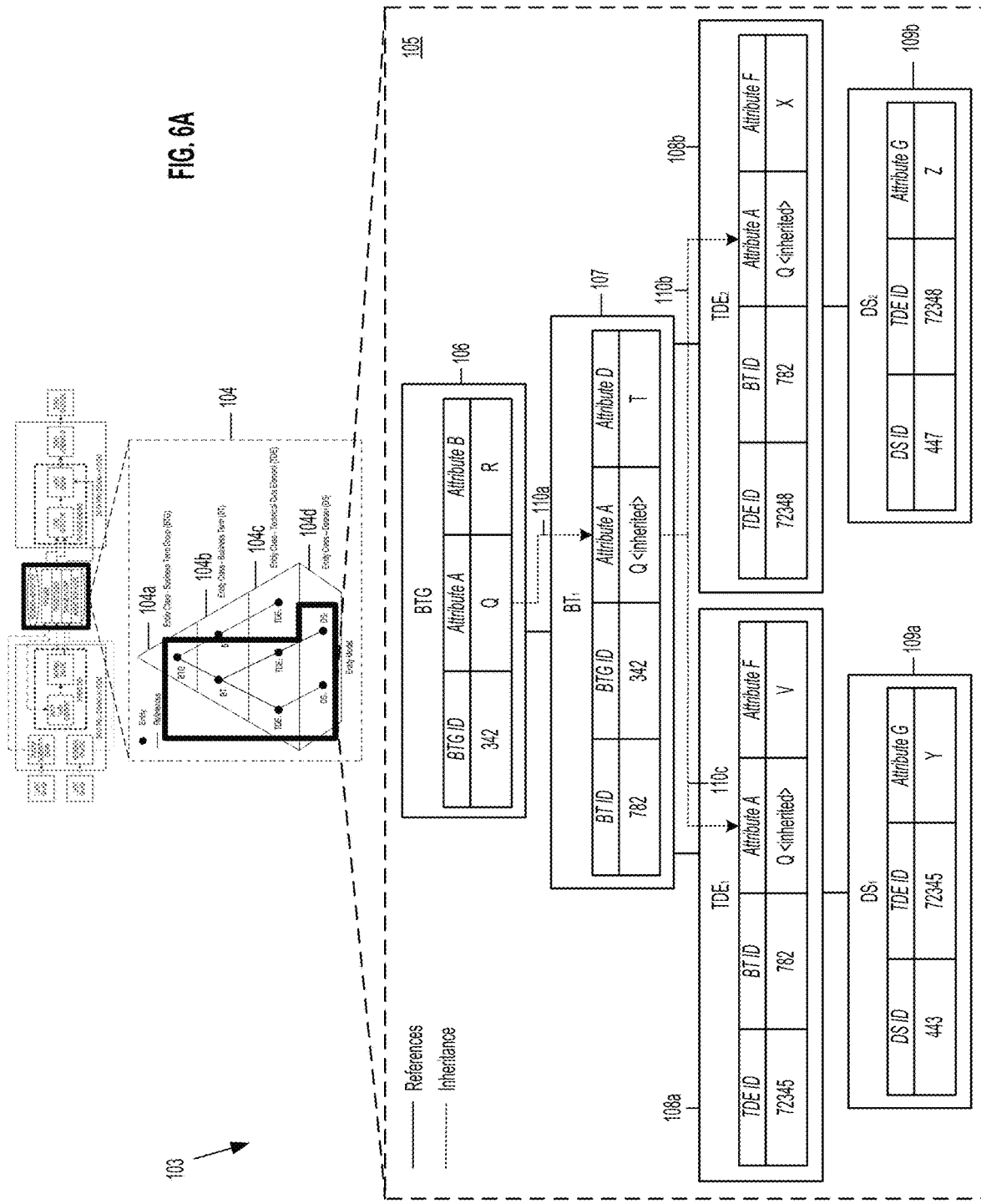

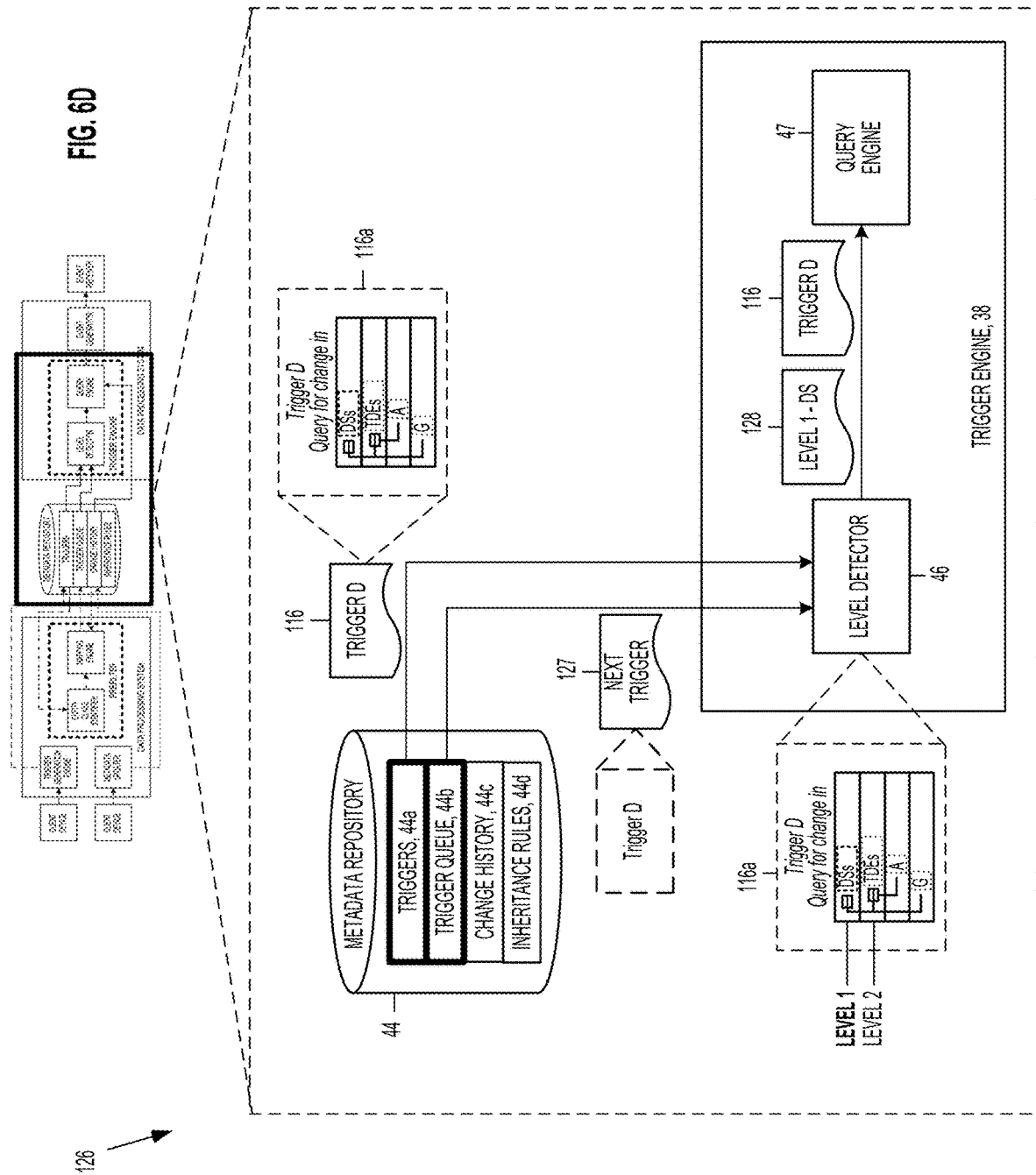

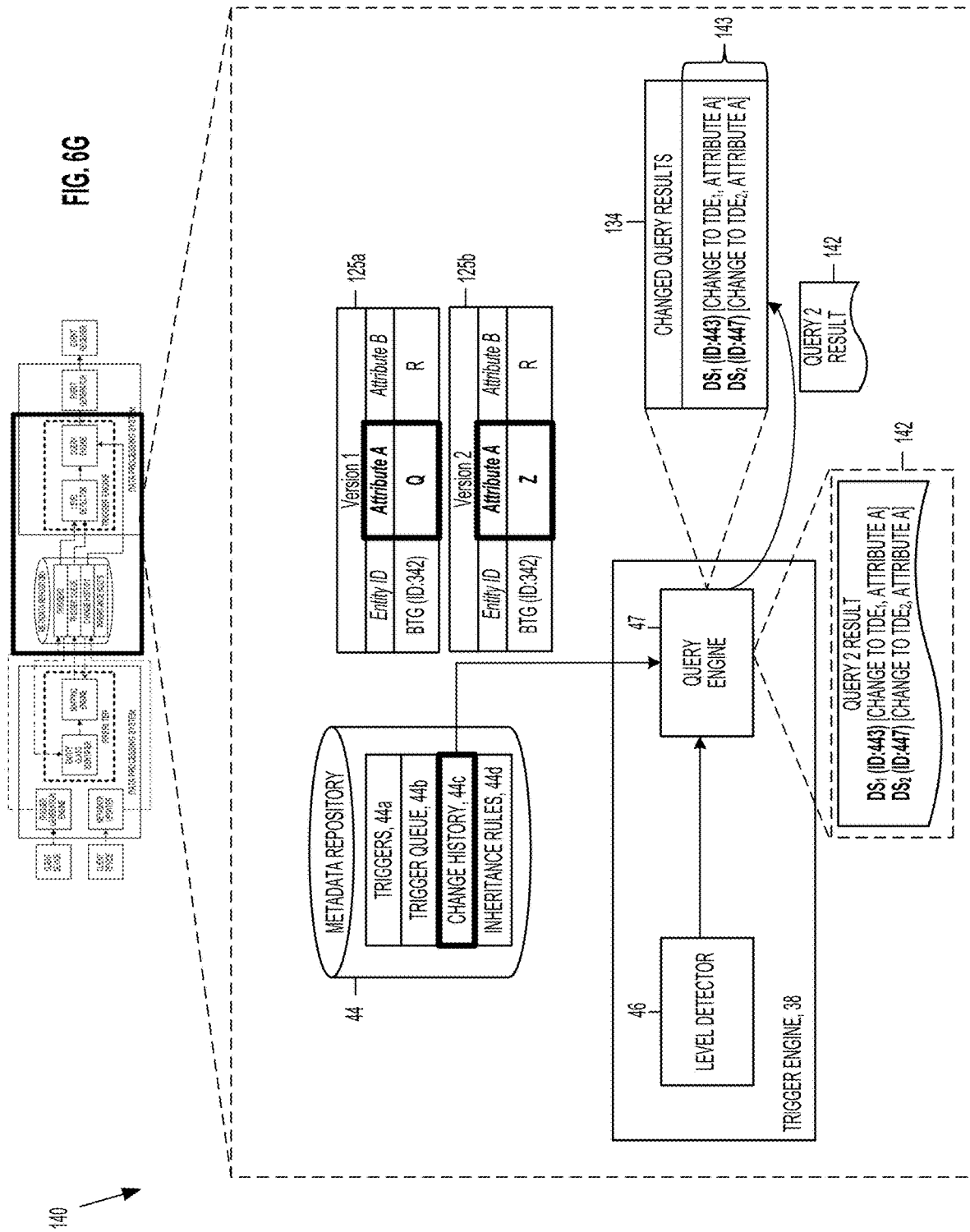

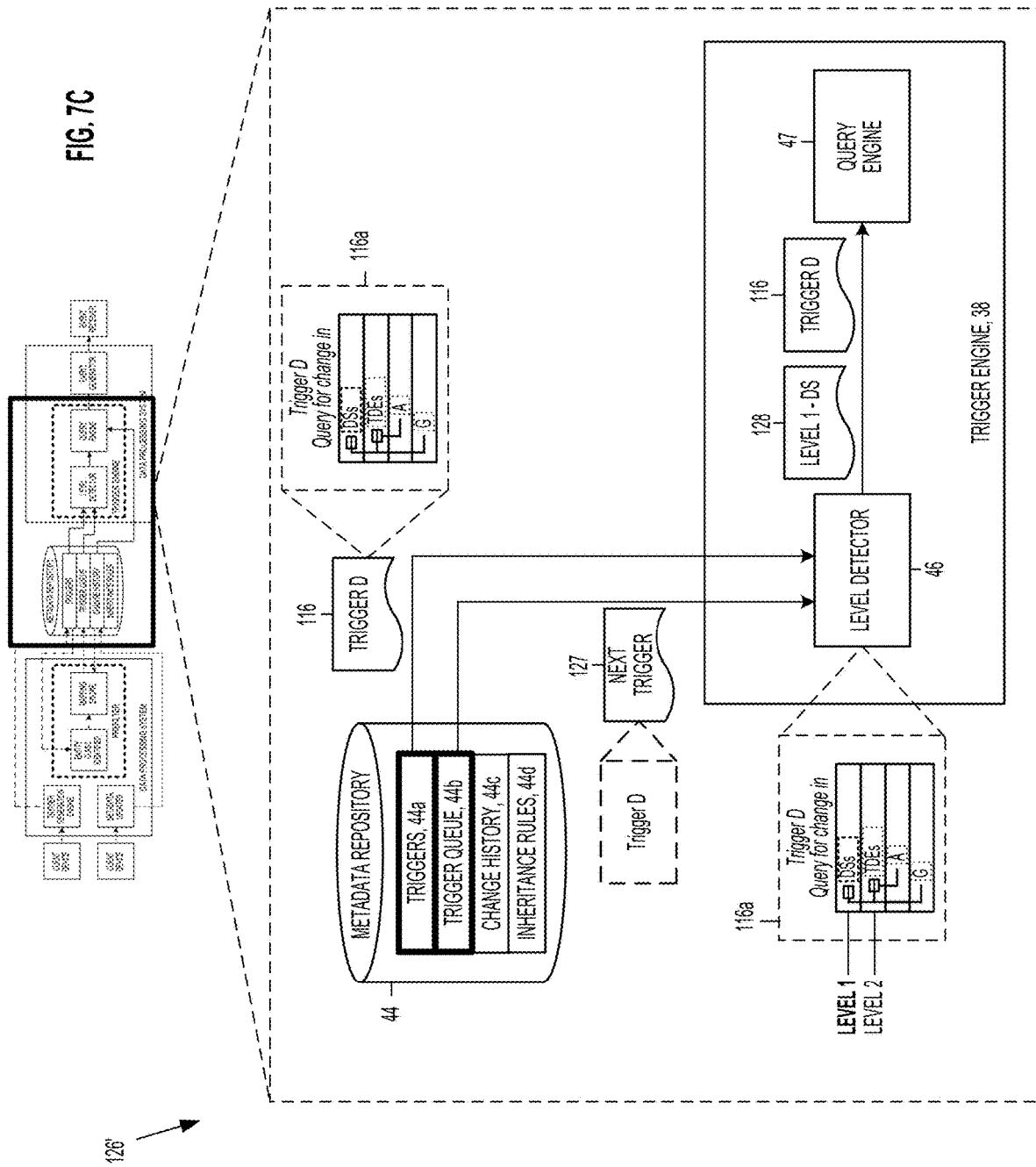

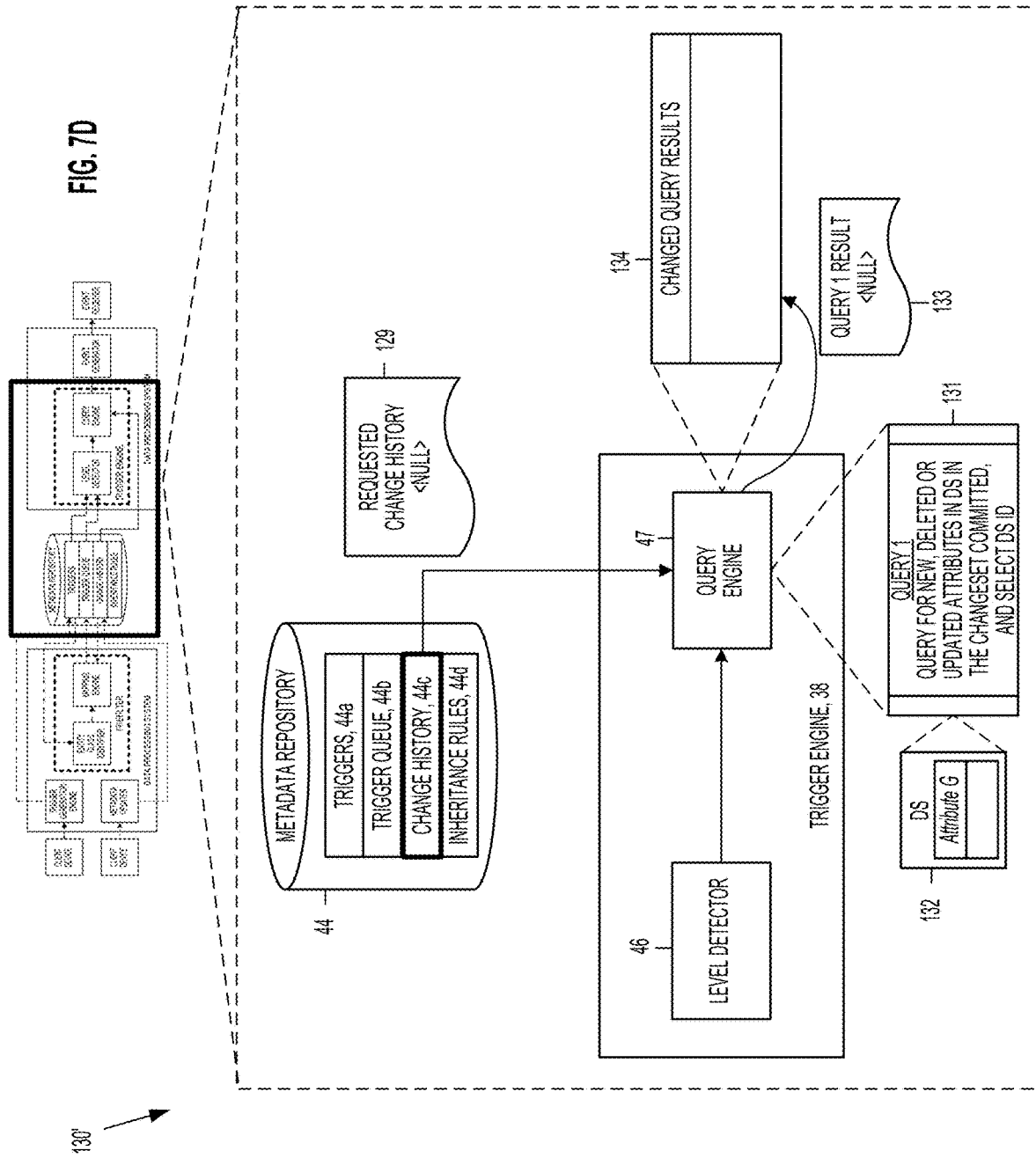

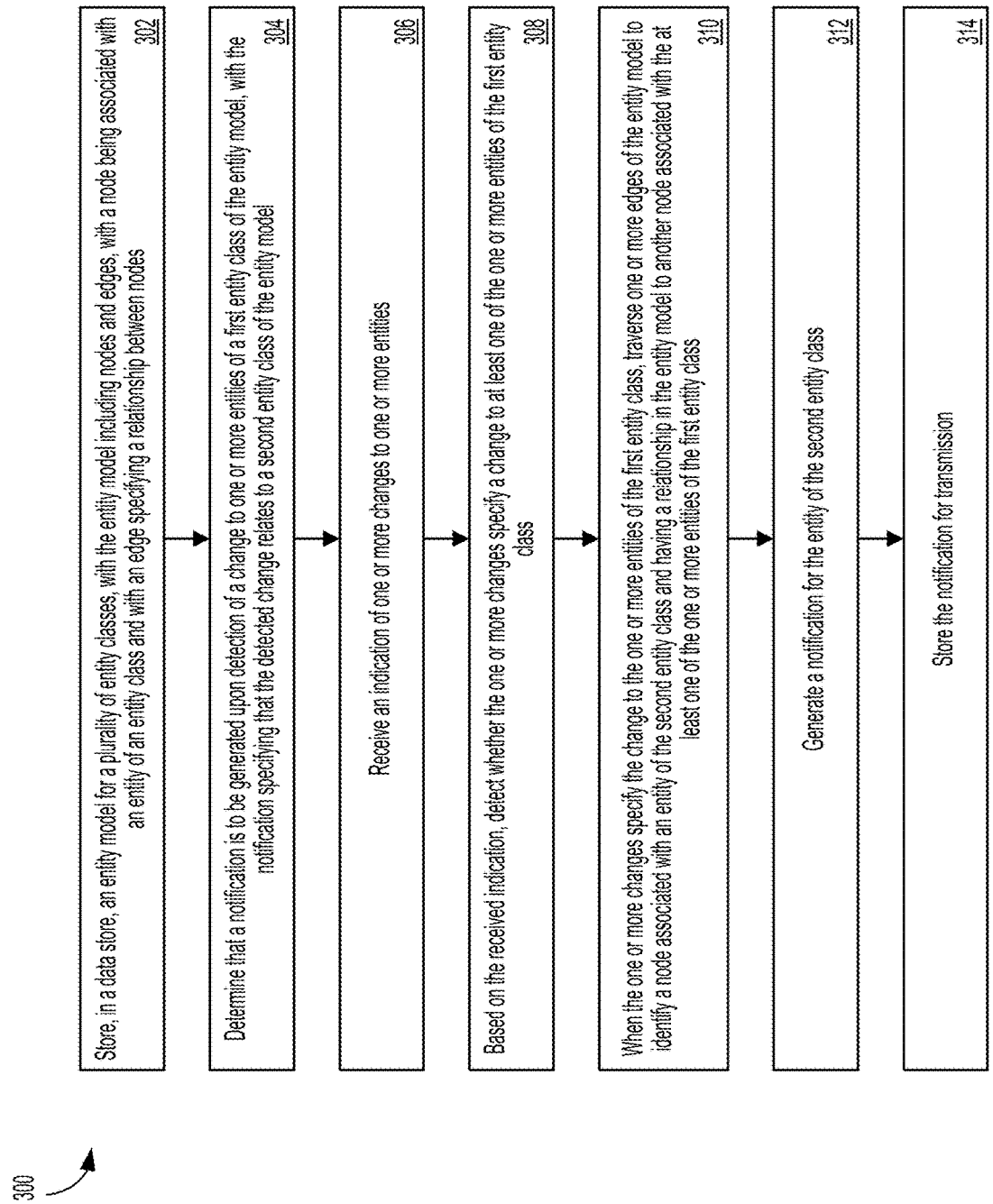

METADATA CHANGE TRIGGERS

CROSS-REFERENCE TO RELATED APPLICATIONS

This application claims priority to U.S. Provisional Patent Application No. 63/639,345, filed on Apr. 26, 2024, which is incorporated herein by reference in its entirety.

BACKGROUND

A computation can be expressed as dataflow through a computational graph with nodes and links. The computation includes components specifying portions of the computation. A node represents one or more of these components. The nodes are connected by the links to represent data flow, such as flow of data records, among the components. As such, a computational graph may also be referred to as a dataflow graph. The dataflow graph itself is executable, e.g., by compiling or otherwise processing the dataflow graph to generate executable computer code.

A component may be an upstream component, a downstream component, or both. An upstream component includes a component that outputs data to another component. A downstream component includes a component that receives data from another component. Additionally, components include input and output ports. The links are directed links that are coupled from an output port of an upstream component to an input port of a downstream component. The ports have indicators that represent characteristics of how data is written to and read from the links and/or how the components are controlled to process data. These ports may have various characteristics. For example, one characteristic of a port is its directionality as an input port or output port. The directed links represent data and/or control being conveyed from an output port of an upstream component to an input port of a downstream component.

A subset of the components serves as sources and/or sinks of data from the overall computation, for example, to and/or from data files, database tables, and external data flows. Parallelism can be achieved at least by enabling different components to be executed in parallel by different processes (hosted on the same or different server computers or processor cores), where different components executing in parallel on different paths through a dataflow graph is referred to as component parallelism, and different components executing in parallel on different portions of the same path through a dataflow graph is referred to as pipeline parallelism.

FIG. 1A is from "Trigger Inheritance and Overriding in an Active Object Database System," in IEEE Transactions On Knowledge And Data Engineering, Vol. 12, No. 4, July/August 2000," by Elisa Bertino, Senior Member, IEEE, Giovanna Guerrini, and Isabella Merlo. FIG. 1B is an annotated version of FIG. 1A.

SUMMARY

In general, in a first aspect, a method implemented by a data processing system for automatically detecting a change in one or more entities of a first entity class, and, in response to the detecting, generating a notification specifying that a change relating to a second entity class has been detected, includes: storing, in a data store, an entity model for a plurality of entity classes, with the entity model including nodes and edges, with a node being associated with an entity of an entity class and with an edge specifying a relationship between nodes; determining that a notification is to be generated upon detection of a change to one or more entities associated with a first entity class of the entity model, with the notification specifying that the detected change relates to a second entity class of the entity model; receiving an indication of one or more changes to one or more entities; based on the received indication, detecting whether the one or more changes specify a change to at least one of the one or more entities associated with the first entity class; when the one or more changes specify the change to the one or more entities associated with the first entity class, traversing one or more edges of the entity model to identify a node associated with an entity of the second entity class and having a relationship in the entity model to another node associated with the at least one of the one or more entities of the first entity class; generating the notification for the entity of the second entity class; and storing the notification for transmission.

In a second aspect combinable with the first aspect, the method includes: for a given application of the data processing system, accessing one or more entity queries associated with that given application; identifying, based on the entity model, an entity representing the given application; identifying, in the entity model, an entity class of the identified entity, wherein the identified entity class is a root entity class; based on the one or more entity queries, generating one or more instructions to generate a notification for the root entity class upon detection of one or more changes to one or more entities or one or more entity classes specified by the one or more entity queries; and storing the one or more instructions.

In a third aspect combinable with the first or second aspects, the method includes detecting one or more changes to one or more entities specified by the one or more entity queries; identifying an entity of the root entity class that is associated with at least one of the one or more entities for which the one or more changes are detected; and generating a notification for the identified entity of the root entity class, with the notification specifying an identifier of the identified entity of the root entity class.

In a fourth aspect combinable with any of the first through third aspects, the method includes: transmitting the notification to one or more client devices; and causing regeneration of code of the given application.

In a fifth aspect combinable with any of the first through fourth aspects, the method includes: determining that a notification is to be generated upon detection of a change to one or more attributes of one or more entities associated with a first entity class of the entity model.

In a sixth aspect combinable with any of the first through fifth aspects, one or more values of the one or more attributes are inherited from a third entity class of the entity model.

In a seventh aspect combinable with any of the first through sixth aspects, the method includes receiving inheritance data specifying that the one or more values of the one or more attributes of the one or more entities associated with the first entity class are inherited from a third entity class of the entity model; wherein detecting whether the one or more changes specify a change to at least one of the one or more entities associated with the first entity class includes: in accordance with the received inheritance data, detecting whether the one or more changes specify a change to one or more values of one or more attributes of one or more entities of the third entity class; when the one or more changes specify the change to the one or more values of the one or more attributes of the one or more entities associated with the third entity class, identifying an entity in the first entity class that inherits a value of the one or more attributes from at least one of the one or more entities in the third entity class; and identifying an entity in the second entity class related to the identified entity in the first class; generating a notification for the second entity class, with the generated notification specifying an identifier of the identified entity in the second entity class; and storing the generated notification for transmission.

In an eighth aspect combinable with any of the first through seventh aspects, the method includes receiving inheritance data specifying that the one or more values of the one or more attributes of the one or more entities associated with the first entity class are inherited from a third entity class of the entity model and further specifying that the one or more inherited values are overwritable; wherein detecting whether the one or more changes specify a change to at least one of the one or more entities associated with the first entity class includes: in accordance with the received inheritance data, detecting whether the one or more changes specify a change to one or more values of one or more attributes of one or more entities of the first entity class; when the one or more changes specify the change to the one or more values of the one or more attributes of the one or more entities of the first entity class, identifying at least one of the one or more entities of the first entity class; identifying an entity in the second entity class related to the identified entity in the first class; generating a notification for the second entity class, with the generated notification specifying an identifier of the identified entity in the second entity class; and storing the generated notification for transmission.

In a ninth aspect combinable with any of the first through eighth aspects, one or more values of the one or more attributes of one or more entities of the third entity class are inherited from a fourth entity class of the entity model, wherein the one or more values of the one or more attributes of one or more entities of the third entity class are overwritable, the method further includes: receiving inheritance data specifying that the one or more values of the one or more attributes of the one or more entities associated with the first entity class are inherited from a third entity class of the entity model and that one or more values of the one or more attributes of the third entity class are inherited from a fourth entity class and are overwritable; wherein detecting whether the one or more changes specify a change to at least one of the one or more entities associated with the first entity class includes: in accordance with the inheritance data, detecting whether the one or more changes specify a change to one or more values of one or more attributes of one or more entities of the third entity class, and, if not, detecting whether the one or more changes specify a change to one or more values of one or more attributes of one or more entities of the fourth entity class; when the one or more changes specify the change to the one or more values of the one or more attributes of the one or more entities associated with the third entity class, identifying an entity in the first entity class that inherits a value of the one or more attributes from at least one of the one or more entities in the third entity class; when the one or more changes specify the change to the one or more values of the one or more attributes of the one or more entities associated with the fourth entity class and not the third entity class, identifying an entity in the third entity class that inherits a value of the one or more attributes from at least one of the one or more entities in the fourth entity class; and identifying an entity in the first entity class related to the identified entity in the third entity class; identifying an entity in the second entity class related to the identified entity in the first entity class; generating a notification for the second entity class, with the generated notification specifying an identifier of the identified entity in the second entity class; and storing the generated notification for transmission.

In a tenth aspect combinable with any of the first through ninth aspects, the generated notification is a single notification.

In an eleventh aspect combinable with any of the first through tenth aspects, the method includes: rather than causing regeneration of a given data processing application of the data processing system every single time one or more entities or one or more entity classes are changed, causing regeneration of the data processing application once in accordance with the notification being generated.

In a twelfth aspect combinable with any of the first through eleventh aspects, the data processing system is configured to execute an application that is configured to use one or more associated entity queries when identifying which data to access to process with the application, wherein the data to be accessed is stored in a data storage and/or is received from data sources, and wherein the data to be accessed is represented in the entity model.

In a thirteenth aspect combinable with any of the first through twelfth aspects, the determining that the notification is to be generated is performed based on one or more of the entity queries associated with the application.

In a fourteenth aspect combinable with any of the first through thirteenth aspects, the method includes: executing one or more of the entity queries, and using an identifier of the application to identify, by traversing the entity model, an entity in the entity model with an identifier matching the identifier of the application; and in response to identifying the entity, generating the notification.

In a fifteenth aspect combinable with any of the first through fourteenth aspects, the method includes: in response to the generating of the notification, updating the one or more of the queries with data specifying the identified entity and/or the entity class of the identified entity as being associated with the application.

In a sixteenth aspect combinable with any of the first through fifteenth aspects, the method includes: providing a change set that includes data specifying one or more changes to a value of an attribute for a particular instance of an entity class of the entity model.

In a seventeenth aspect combinable with any of the first through sixteenth aspects, the change set includes all changes associated with all instances of a particular entity class.

In an eighteenth aspect combinable with any of the first through seventeenth aspects, where, when executing the queries, querying, by the data processing system, the change set for changes that are relevant to the executing queries, preferably without having to query all the instances of the entity classes of the entity model.

In a nineteenth aspect combinable with any of the first through eighteenth aspects, the method includes: in determining whether to generate the notification, querying, by the data processing system, only the change set rather than querying all entities of the entity model.

In a twentieth aspect combinable with any of the first through nineteenth aspects, the change set includes a structured item of data specifying an identifier of the respective entity of the instance of the entity class that is being changed, preferably along with the attributes of that instance and associated values of the attributes.

In a twenty-first aspect combinable with any of the first through twentieth aspects, the change set is distinct from the associated entities and/or instance of the entity class.

In a twenty-second aspect combinable with any of the first through twenty-first aspects, the change set describes the changes to the associated data but does not store the associated data itself.

In a twenty-third aspect combinable with any of the first through twenty-second aspects, the data processing system includes a prefilter that is configured to determine, upon detection of the change to one or more entities associated with the first entity class of the entity model, one or more other entity classes of the entity model that the detected change potentially relates to.

In a twenty-fourth aspect combinable with any of the first through twenty-third aspects, the method includes: rather than intermittently or periodically executing the entity queries for all of the entity classes, the data processing system only executes entity queries for the one or more other entity classes that the detected change potentially relates to.

In a twenty-fifth aspect combinable with any of the first through twenty-fourth aspects, the notification identifies the entity of the second entity class.

In a twenty-sixth aspect combinable with any of the first through twenty-fifth aspects, detecting whether the one or more changes specify a change to at least one of the one or more entities of the first entity class includes executing one or more queries on a change set that specifies one or more changes to one or more attributes of one or more entities of the first entity class.

In a twenty-seventh aspect combinable with any of the first through twenty-sixth aspects, the method includes: based on the indication, determining that at least one of the one or more changes relate to the first entity class; and queuing instructions to perform the detecting of whether the one or more changes specify a change to at least one of the one or more entities of the first entity class.

In a twenty-eighth aspect combinable with any of the first through twenty-seventh aspects, the method includes: accessing a first data structure associated with the at least one of the one or more entities of the first entity class, the first data structure having a first key value; identifying a second data structure having a second key value that matches the first key value; joining at least a portion of the first data structure with at least a portion of the second data structure to produce a joined data structure; and selecting, from the joined data structure, an identifier for the entity of the second entity class.

In general, in a twenty-ninth aspect, one or more machine-readable hardware storage devices includes instructions executable by one or more processors to perform the operations of any of the first through twenty-eighth aspects.

In general, in a thirtieth aspect, a data processing system includes one or more processing devices and one or more machine-readable hardware storage devices storing instructions that are executable by the one or more processing devices to perform the operations of any of the first through twenty-eighth aspects.

In general, in a thirty-first aspect, a computer program product includes instructions which, when the program is executed by a computer, causes the computer to carry out the operations of any of the first through twenty-eighth aspects.

Other embodiments of this aspect include corresponding computer systems, apparatus, and computer programs recorded on one or more computer storage devices, each configured to perform the actions of the methods.

Additionally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, causes the apparatus to perform the actions.

Aspects can include one or more of the following advantages.

Aspects of the present disclosure provide means to improve computational efficiency when handling changes to data, such as changes that affect execution of a data processing application. For example, by detecting a change that may affect a data processing application with regard to one entity class, and then generating a notification of the detected change with regard to a different, higher-level entity class, multiple lower-level changes can be consolidated into a single, higher-level notification. This approach increases computational efficiency by reducing the number of notifications that need to be generated and transmitted, and also avoids inundating users or systems with notifications. In addition, by generating a single notification even when there are multiple changes at a lower-level entity class, the need to reanalyze and/or regenerate data processing applications for every minor change is eliminated, thereby increasing computational efficiency.

In some examples, changes to data for a particular entity class are grouped into a change set, and the data processing system is configured to query this smaller, focused subset of changes in order to detect changes of interest. By querying the change set rather than all instances of an entity class, the volume of data that needs to be examined is reduced, thereby improving computational efficiency. This approach also narrows down the search to only the changes that are relevant, thereby saving time and processing power.

In some examples, the data processing system performs prefiltering to identify triggers that are relevant to a given change set. Once the relevant triggers are identified, the data processing system need only evaluate the relevant triggers, rather than continuously evaluating all triggers for every change. This targeted approach improves computational efficiency and conserves resources, especially in large-scale systems where querying every trigger could be prohibitively expensive in terms of computational resources. In some examples, the relevant triggers are stored in a trigger queue, which allows for more efficient processing by separating the evaluation of triggers from the implementation of changes. For example, using this approach, the system can process changes immediately and then evaluate triggers at a later time, such as during off-peak hours, to avoid delaying the implementation of the changes. This approach also allows the system to balance loads more effectively by managing the timing of resource-intensive tasks.

Other features and advantages of the invention will become apparent from the following description, and from the claims.

DESCRIPTION OF DRAWINGS

FIG. 1A shows an illustration from prior art.

FIGS. 5A-5J each illustrates a system for generating and executing triggers.

FIGS. 6A-6G each illustrates a system for generating and executing triggers with inheritance.

FIGS. 7A-7F each illustrates a system for generating and executing triggers with inheritance and override.

FIG. 10 is a flow diagram of an example process for generating a trigger.

DETAILED DESCRIPTION

Figure 1B:
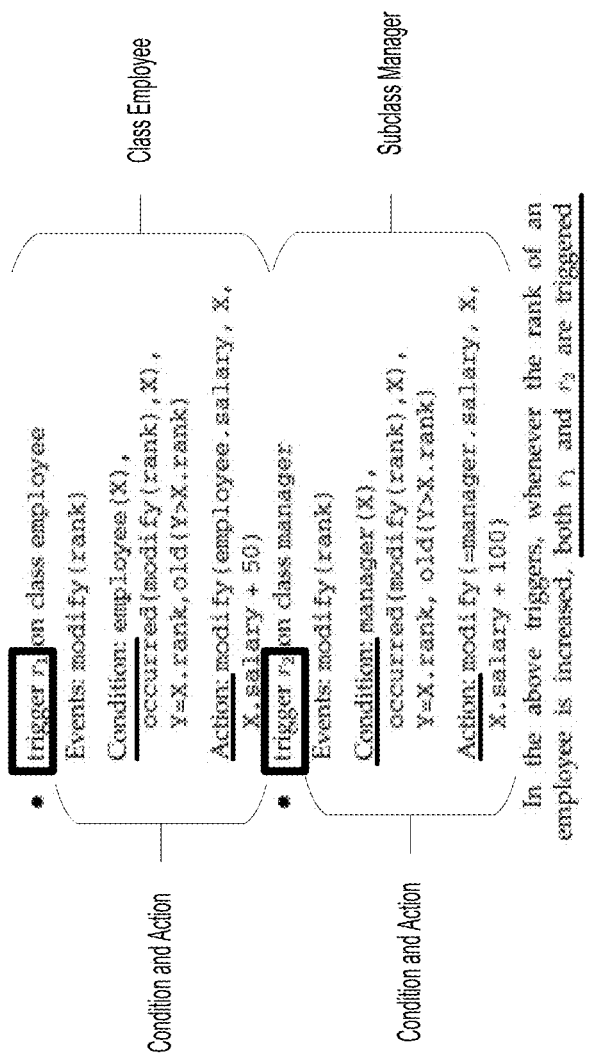
FIG. 1B is an annotated version of FIG. 1A.
Figure 2A:
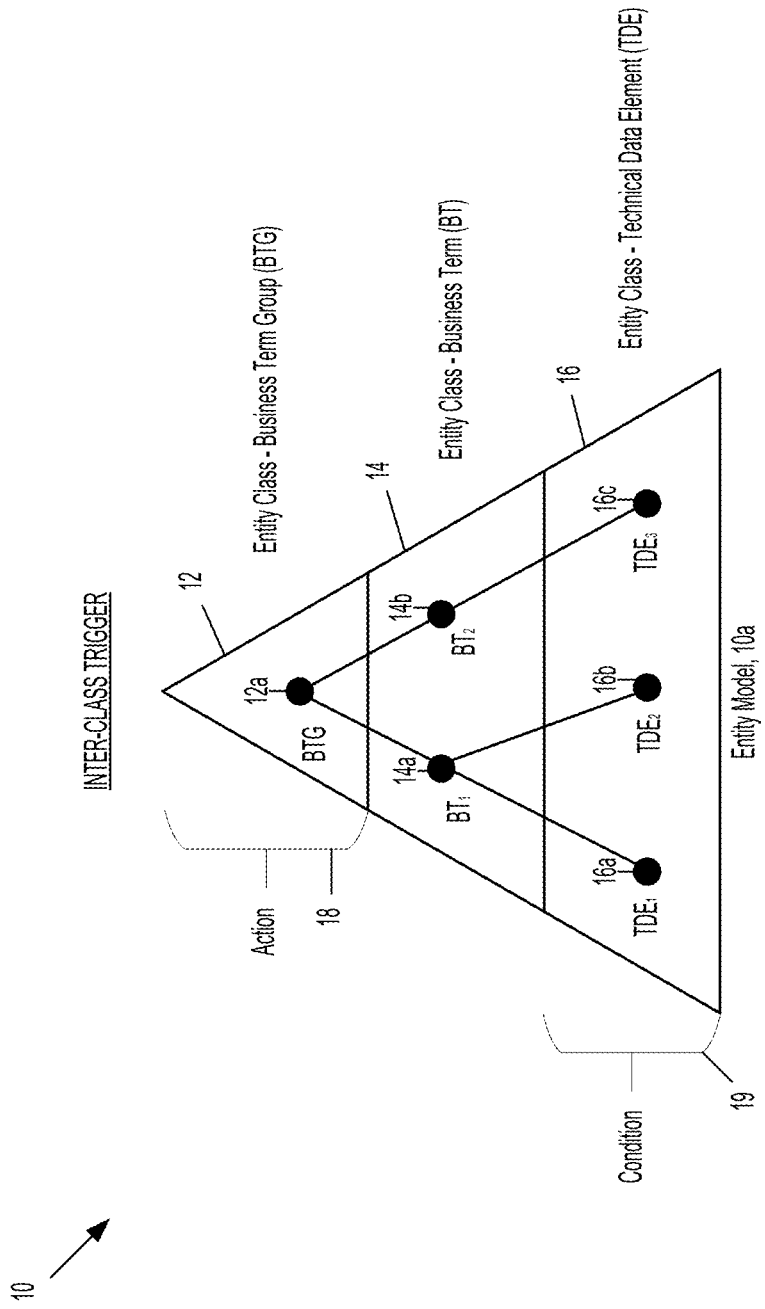
FIG. 2A illustrates an example of an entity model.

Referring to FIG. 2A, inter-class trigger 10 is shown. Generally, an inter-class trigger includes a trigger for which an action is defined with regard to one class and a condition is defined with regard to another class. Generally, a trigger defines actions that are executed automatically when a condition is satisfied, detected, etc. In this example, inter-class trigger 10 is shown with regard to entity model 10a. An entity model includes a metadata model and specifies relationships among entities. For example, an entity model includes a data structure (e.g., a schema) with nodes representing entities and edges among the nodes representing relationships among entities. An edge includes a link, a pointer, an object that stores a memory address and so forth.

In general, an entity is or includes a data object (or data structure) with attributes and values for those attributes. In an example, an entity includes a data structure that is structured with fields, where the fields have values. These fields can represent, for example, attributes of the entity, such as a name of the entity, an identifier for the entity, a description of the entity, or a type of the entity, among others, as well as attributes that reference other entities (e.g., identifier(s) or key(s) of related entities). An entity class defines a type of entity that includes one or more attributes. An entity is an instance of an entity class and includes one or more values for one or more attributes specified by that entity class. An entity model specifies entity classes and relationships among entity classes.

In this example, entity model 10a includes multiple entity classes 12, 14, 16, each represented by a different slice or level in entity model 10a. In this example, entity model 10a includes business term group (BTG) entity class 12 at the top level of entity model 10a, business term (BT) entity class 14 at the middle level of entity model 10a, and technical data element (TDE) entity class 16 at the bottom level of entity model 10a. Generally, a TDE includes or specifies technical metadata of a field of a dataset. For example, a social security number field may have a name of "24515fsd" for the field. However, the name "24515fsd" is meaningless and provides no indication that the values of the field represent social security numbers. Therefore, semantic discovery is performed to identify a name (or label) that describes the content of the field, as described in further detail below. In this example, semantic discovery identifies a name of "SSN" and associates a BT node with the name "SSN" (or information specifying SSN) to providing meaning for the field name "24515fsd" and for the values in the field. In this example, BT nodes are associated with names or information describing content of TDEs and providing (meaningful) names for TDEs. In this example, BTG specifies or represents a group of business terms, e.g., by specifying a data dictionary, a customer business term group, and so forth. For example, a data dictionary may include the SSN term. Therefore, in this example, a BTG node specifies a data dictionary with the term SSN. A BT node specifies the term SSN and is connected to the BTG node to specify that the term SSN is represented in the data dictionary specified by the BTG node. Note that an entity model with additional or alternative classes and arrangements can be used without departing from the scope of the invention.

The pyramidal shape of entity model 10a conveys relationships among the different entity classes. For example, BTG entity class 12 at the top level of entity model 10a is a parent of BT entity class 14 at the middle level of entity model 10a. In this way, the BTG and BT entity classes, 12 and 14 respectively, form a parent-child relationship. Similarly, BT entity class 14 is a parent of TDE entity class 16 at the bottom of entity model 10a, thereby forming a parent-child relationship among the BT and TDE entity classes, 14 and 16 respectively.

Each entity class can include one or more entities (represented by the black circles in FIG. 2A). Entities are related to one another in accordance with the relationships among the entity classes defined by the entity model. For example, in the example of FIG. 2A, BTG entity 12a is the parent of entities $BT_1$ 14a and $BT_2$ 14b (depicted by the lines connecting the entities). Similarly, $BT_1$ entity 14a is the parent of entities $TDE_1$ 16a and $TDE_2$ 16b, and $BT_2$ entity 14b is the parent of $TDE_3$ entity 16c. In general, each entity class specifies attributes that define a particular type of entity (e.g., a BTG, BT, or TDE), and an entity of an entity class is a data object or other data structure that includes values for the attributes defined by that entity class.

Each of these entity classes 12, 14, 16 describes data that is stored in a data store, a hardware storage device, and so forth. In another example, entity class 16 describes data that is stored in a hardware storage device or a data store, and entity classes 12, 14 specify semantic meanings or business terms for the data represented by entity class 16. In this example, the business terms that are represented by entity class 14 include business terms that are identified for the technical data elements represented in entity class 16 via semantic discovery, as described in U.S. Pat. No. 11,704,494, titled "Discovering a semantic meaning of data fields from profile data of the data fields," the entire contents of which are incorporated herein by reference. In this example, entity class 12 is a term representing a collection of the business terms specified by entity class 14. In this example, the condition for inter-class trigger 10 is specified at the entity class 16 level, as shown by condition indicator 19. The action for inter-class trigger 10 is defined or specified at entity class 12 level, as specified by the action indicator 18 in this figure. In this example, a data processing system will evaluate a conditional statement with regard to technical data elements assigned to entity class 16. When those conditions are satisfied or otherwise true, the data processing system performs an action with regard to a business term group represented by entity class 12.

A benefit of being able to assess whether conditions are satisfied with regard to one entity class level and then perform an action with regard to a different entity class level is that a number of generated notifications can be consolidated, and the data processing system can perform notifications more efficiently, for example, by not having to generate a notification for every triggering event. Also, identifying an action to be performed for an entity class 12 via identifying a condition with regard to another entity class 16 avoids having to analyze the entity class 12 as well, which saves computational resources. In this example, a data processing application, such as a data pipeline, may be represented by or associated with a business term group specified in entity class 12. In this example, changes to the technical data elements specified in entity class 16 may require that code (or instructions or logic) for the data processing application be regenerated or re-executed, or that it be updated to account for the changes in the technical data elements. In this example, if a notification was generated for every time there is a change to a technical data element, a data processing system would be completely inundated with notifications.

However, through the use of inter-class trigger 10, notifications are performed much more efficiently by, for example, notifying at the business term group level. Additionally, the data processing system has control over when notifications are generated. For example, through inter-class trigger 10, the data processing system can be configured to send a single notification for entity class 12 when there are one or more changes to the technical data elements specified by entity class 16, to consolidate notifications. This also results in more efficient data processing, because rather than having to regenerate a data processing application every single time a technical data element changes, the data processing application will only have to be regenerated once in accordance with the single trigger being generated, even when there are changes to a large number (e.g., thousands or millions) of technical data elements.

Figure 2B:
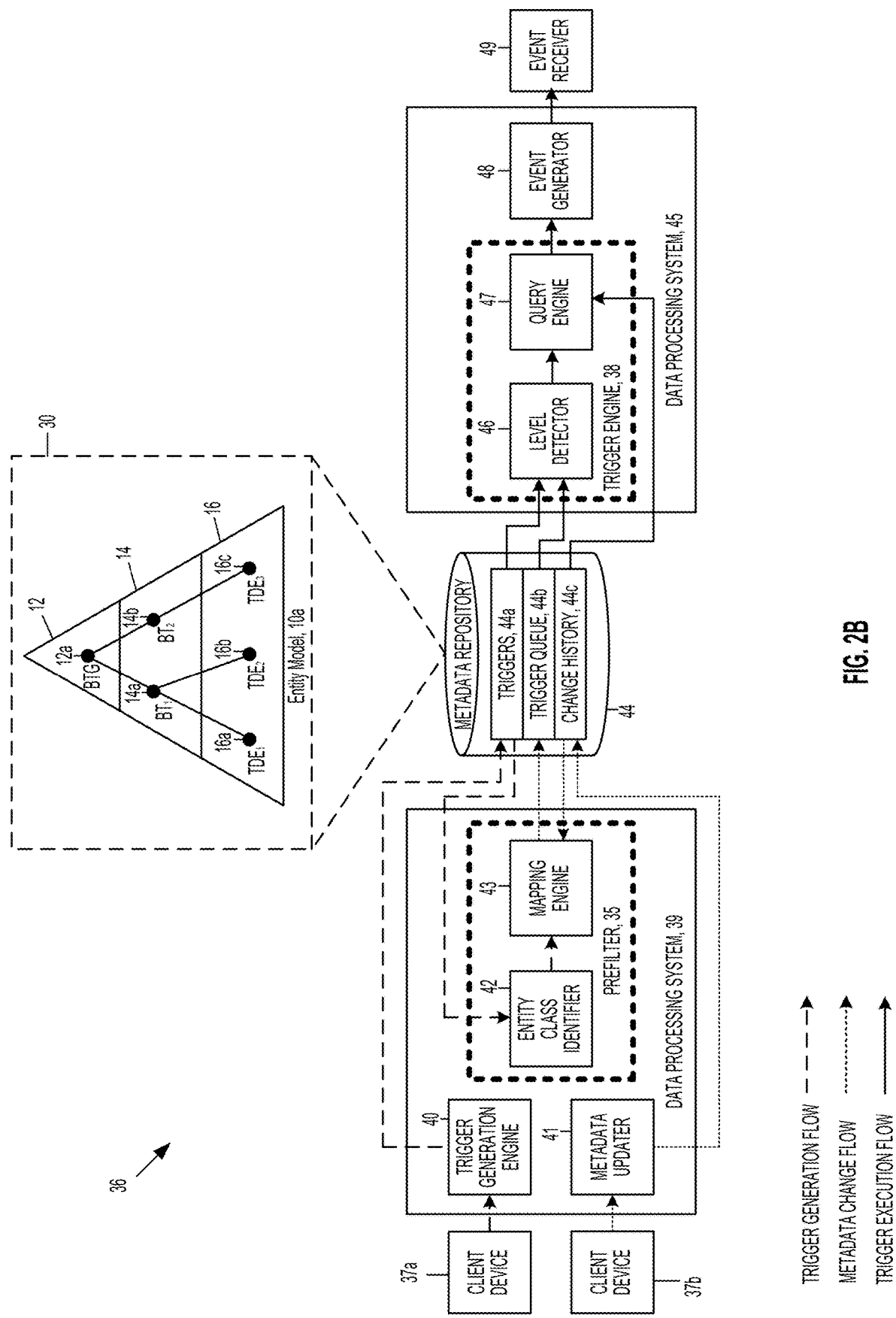
FIGS. 2B and 2C each illustrates a system for generating and executing triggers.

Referring to FIG. 2B, system 36 is shown for generating and executing a trigger. In this example, system 36 includes client devices 37a, 37b and data processing systems 39, 45. Data processing system 39 includes trigger generation engine 40 that is configured to generate a trigger based on instructions received from client device 37a. In some examples, the trigger engine can generate a trigger automatically based on, for example, analysis of the contents of an application, as described in further detail below. Data processing system 39 also includes metadata updater 41 that receives from client device 37b data specifying one or more changes to one or more attributes of one or more entities. Data processing system 39 includes prefilter 35 that determines, upon detection of a change, which triggers are potentially applicable to that change. Prefilter 35 improves the computational efficiency of data processing system 45 overall, because rather than intermittently or even periodically executing queries for all of the triggers (e.g., to determine whether conditions of the trigger have been satisfied), data processing system 45 only needs to execute queries for those triggers that are potentially relevant to received changes. This saves data processing system 45 from periodically polling all changes. Instead, data processing system 45 can conserve computational resources and only poll for changes that are potentially relevant to certain triggers.

Prefilter 35 includes entity class identifier 42 and mapping engine 43. Entity class identifier 42 is configured to identify which entity classes are relevant to a particular trigger. Entity class identifier 42, in turn, transmits this information to mapping engine 43. Mapping engine 43 generates a mapping of triggers and entity classes that are related to that trigger, as described in further detail below.

System 36 also includes metadata repository 44 that stores various types of metadata including a metadata model 30, a triggers portion 44a, a trigger queue 44b, and a change history portion 44c. For purposes of convenience, triggers portion 44a is also referred to as triggers 44a, and change history portion 44c is also referred to as change history 44c. Data processing system 45 includes trigger engine 38 for detecting when a change to data represented in metadata model 30 satisfies one or more conditions of a trigger such that an action or event is generated. Trigger engine 38 includes level detector 46 and query engine 47. Because triggers may be defined with regard to multiple different entity classes, level detector 46 detects each distinct entity class within a trigger. Level detector 46 transmits to query engine 47 level data specifying a particular or current level for which a query should be generated, and query engine 47 generates the query and queries change history portion 44c. Based on data or indicators included in change history 44c, query engine 47 determines whether one or more conditions of a trigger are satisfied, and if so, query engine 47 notifies event generator 48, which in turn generates an event and sends it to event receiver 49. Event receiver 49 includes client devices, data processing devices, external systems, computer systems, and so forth.

Figure 2C:
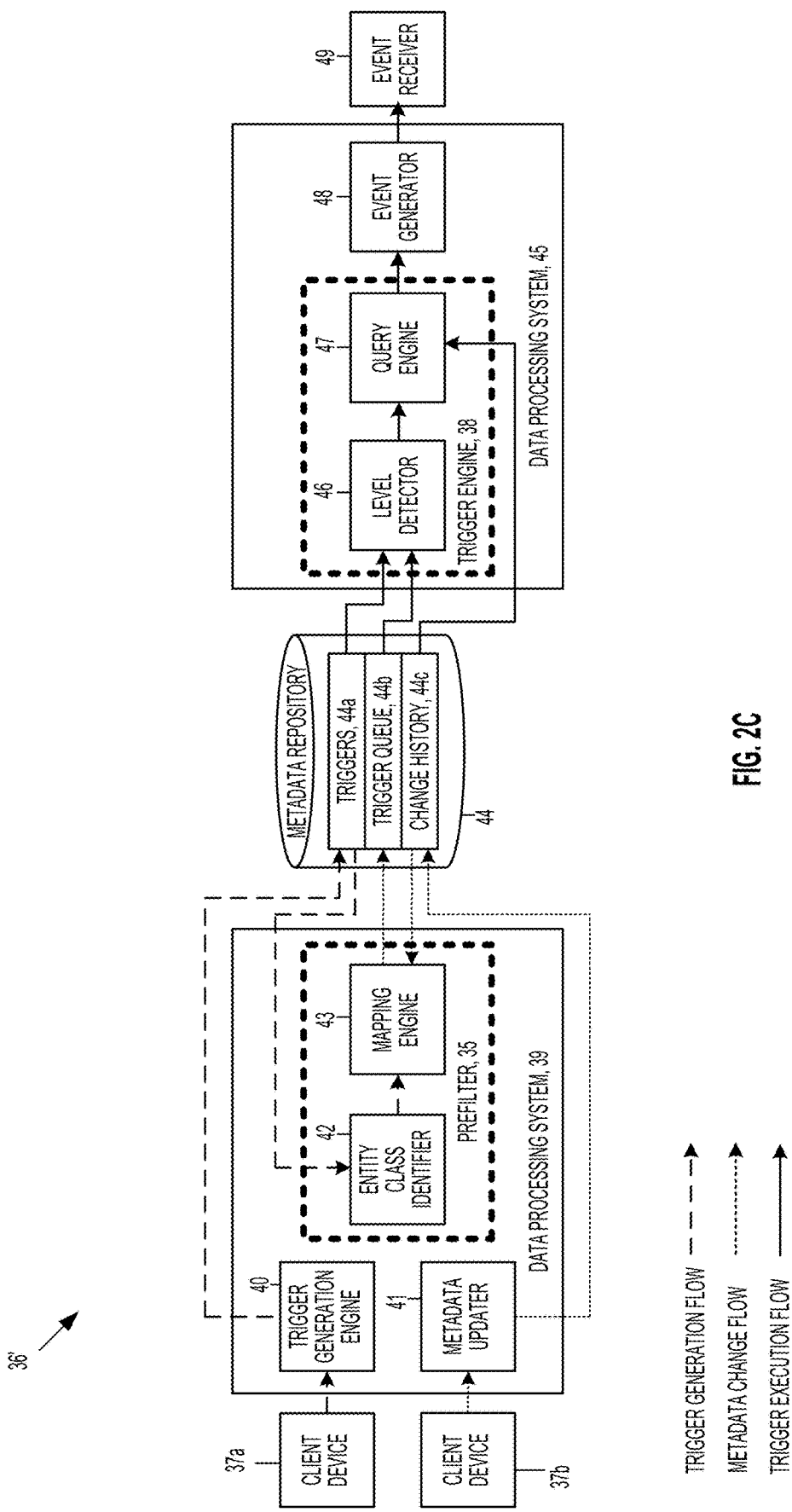

Referring to FIG. 2C, a system 36' is shown, which is a version of system 36.

Figure 3A:
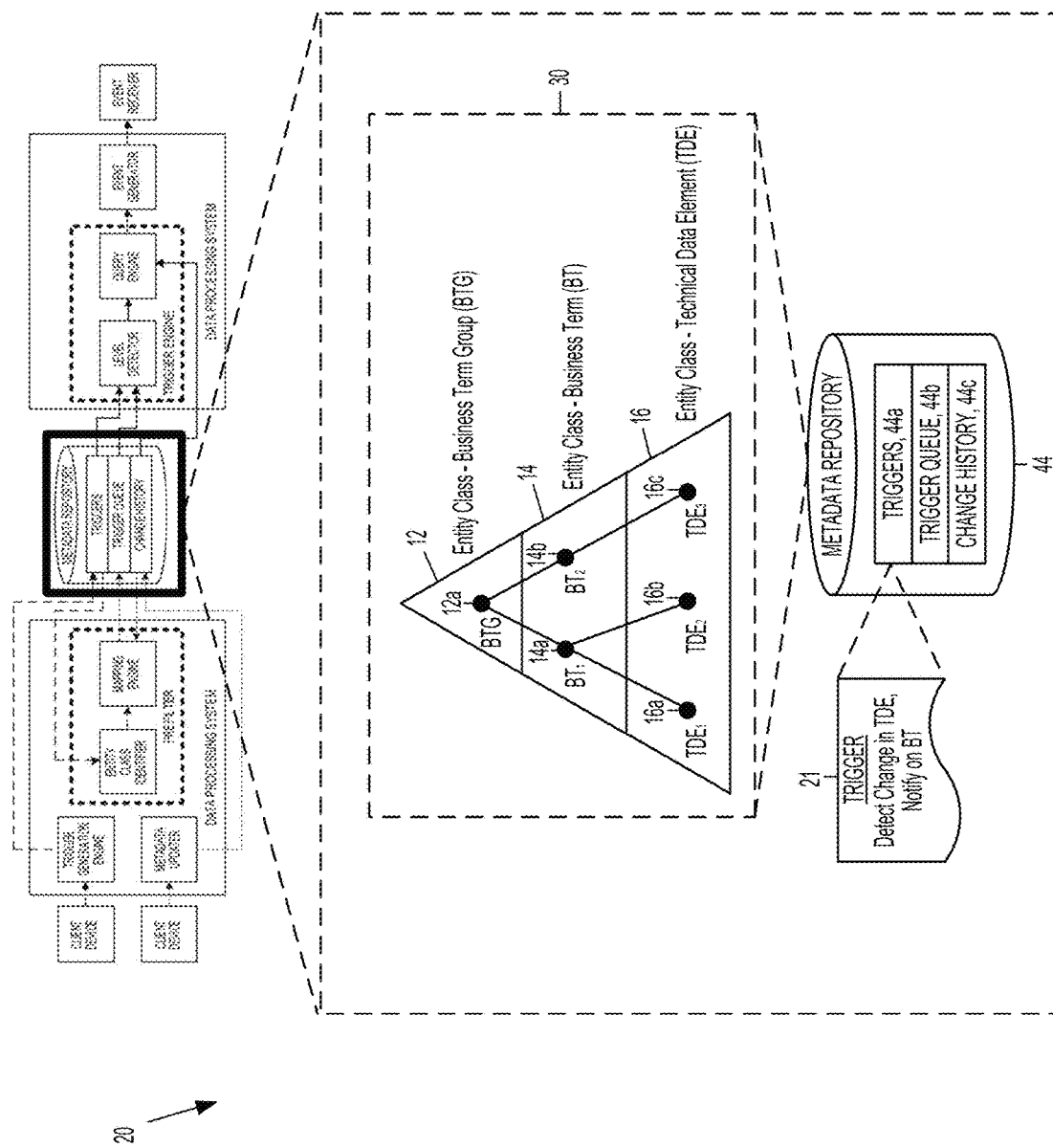
FIGS. 3A-3E each illustrates a system for generating and executing triggers.

Referring to FIG. 3A, a system 20 is shown with a metadata repository 44 storing a metadata model 30. Metadata model 30 includes multiple entity classes 12, 14, 16, each represented by a different slice or level in metadata model 30. In this example, metadata model 30 includes BTG entity class 12 at the top level of metadata model 30, a BT entity class 14 at the middle level of metadata model 30, and TDE entity class 16 at the bottom level of metadata model 30. Each entity class can include one or more entities. For example, the BTG entity class 12 includes a BTG entity 12a, the BT entity class 14 includes a $BT_1$ entity 14a and a $BT_2$ entity 14b, and the TDE entity class 16 includes a $TDE_1$ entity 16a, a $TDE_2$ entity 16b, and a $TDE_3$ entity 16c. Additional details regarding the metadata model 30 are described with reference to the entity model 10a in FIG. 2A.

In this example, the metadata repository 44 also stores a trigger 21 in triggers portions 44a. Trigger 21 specifies that when a change is detected to the TDE entity class, generate a notification for the BT entity class. Stated differently, trigger 21 specifies that, when there is a change to one or more of the TDE entities 16a, 16b, 16c in the TDE entity class 16, a notification is to be generated for the BT entity class 14 that identifies any BT entities 14a, 14b that are affected by the change. In some examples, trigger 21 is or includes an entity query. Generally, an entity query is a query of the entity model (e.g., the metadata model 30) for specified entities, such as entities of a specified entity class. In some examples, an entity query includes one or more declarative statements (e.g., statements that describe a desired result without explicitly listing commands or steps that must be performed to achieve those results) that specify entities of interest (e.g., all entities in the TDE entity class), and, in some examples, attributes whose values are to be retrieved for the specified entities (e.g., the attributes "Name" and "Description"). The entity query and its declarative statements can be transformed into one or more executable statements (e.g., executable SQL queries, among other executable queries) that are executed to obtain the desired results. Additional details and examples of an entity query are described in U.S. Pat. No. 11,921,710, the entire contents of which are incorporated herein by reference.

Figure 3B:
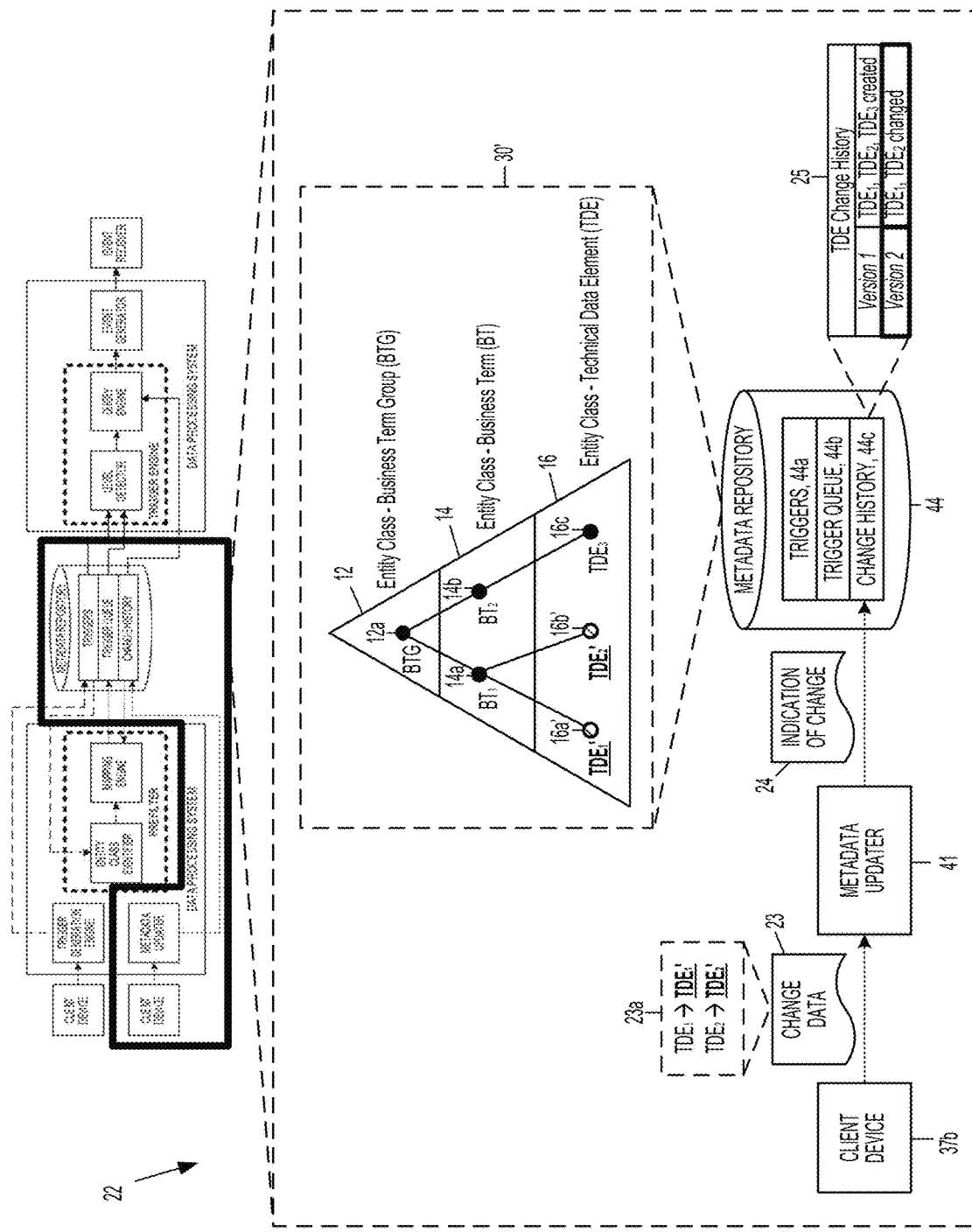

Referring to FIG. 3B, a system 22 shows a change to an entity. In this example, a client device 37b transmits change data 23 indicating a change to entities $TDE_1$ and $TDE_2$. Such a change can include, for example, a change to one or more values of one or more attributes of entities $TDE_1$ and $TDE_2$, such as a name or data type of the entities, among other attributes. This change data 23 is depicted in visualization 23a as $TDE_1$ transitioning to $TDE_1$' and $TDE_2$ transitioning to $TDE_2$'.

Upon receipt of the change data 23, metadata updater 41 generates an indication of the change 24 and transmits the indication to the metadata repository 44. The indication of the change 24 can include, for example, a change summary and/or a change set, as described herein. The change history portion 44c of the metadata repository 44 is updated based on the indication of the change 24. In this example, since the change relates to the TDE entity class, a TDE change history 25 is updated to specify, in version 2, that the entities $TDE_1$ and $TDE_2$ were changed. As described in detail below, storing the change history 25 enables asynchronous evaluation of triggers, and also increases the computational efficiency of the evaluation. The indication of the change 24 also causes an update to the metadata model. As a result of this change, metadata model 30' now includes TDE entity class 16 in which the $TDE_1$ entity 16a is changed to $TDE_1$' entity 16a', and the $TDE_2$ entity 16b is changed to $TDE_2$' entity 16b'.

Figure 3C:
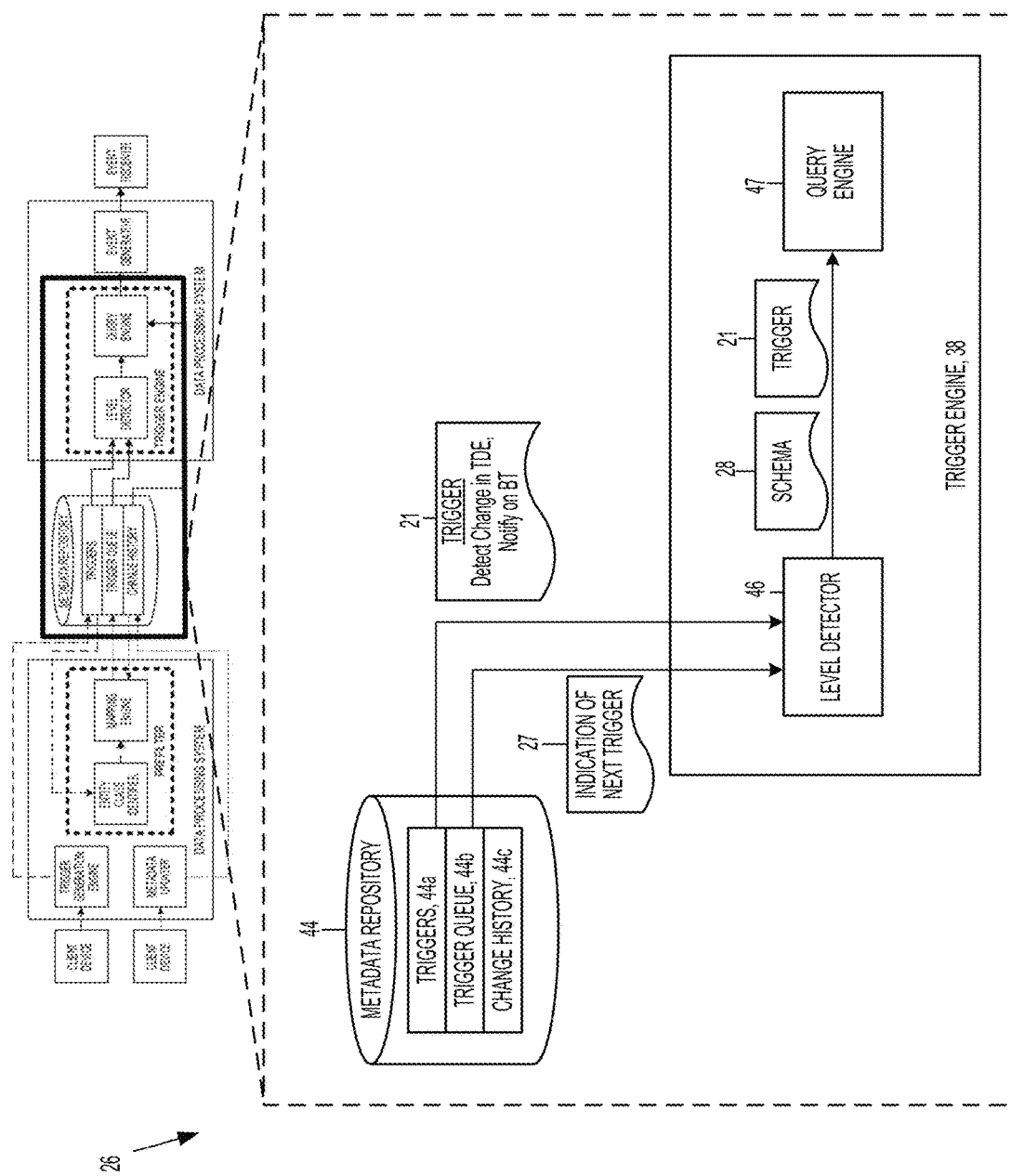

Referring to FIG. 3C, system 26 illustrates functionality performed when determining whether to execute a trigger (e.g., perform the action defined by the trigger, such as generate a notification). In this example, level detector 46 periodically, or otherwise from time to time, queries trigger queue portion 44b of the metadata repository 44 for relevant triggers to be evaluated. In this example, trigger queue portion 44b transmits an indication of the next trigger 27 to level detector 46. The indication of the next trigger 27 specifies that the next trigger to be evaluated is trigger 21. Level detector 46 requests and receives from triggers portion 44a trigger 21. Level detector 46 parses and analyzes the contents of trigger 21 and determines that there is a single level in the trigger: the TDE entity class level. Based on this analysis, level detector 46 sends trigger 21 and a schema 28 (e.g., the metadata model or a portion thereof) to the query engine 47 for generating a query to evaluate the trigger 21. In some examples, schema 28 is conveyed in trigger 21 or otherwise known by query engine 47.

Figure 3D:
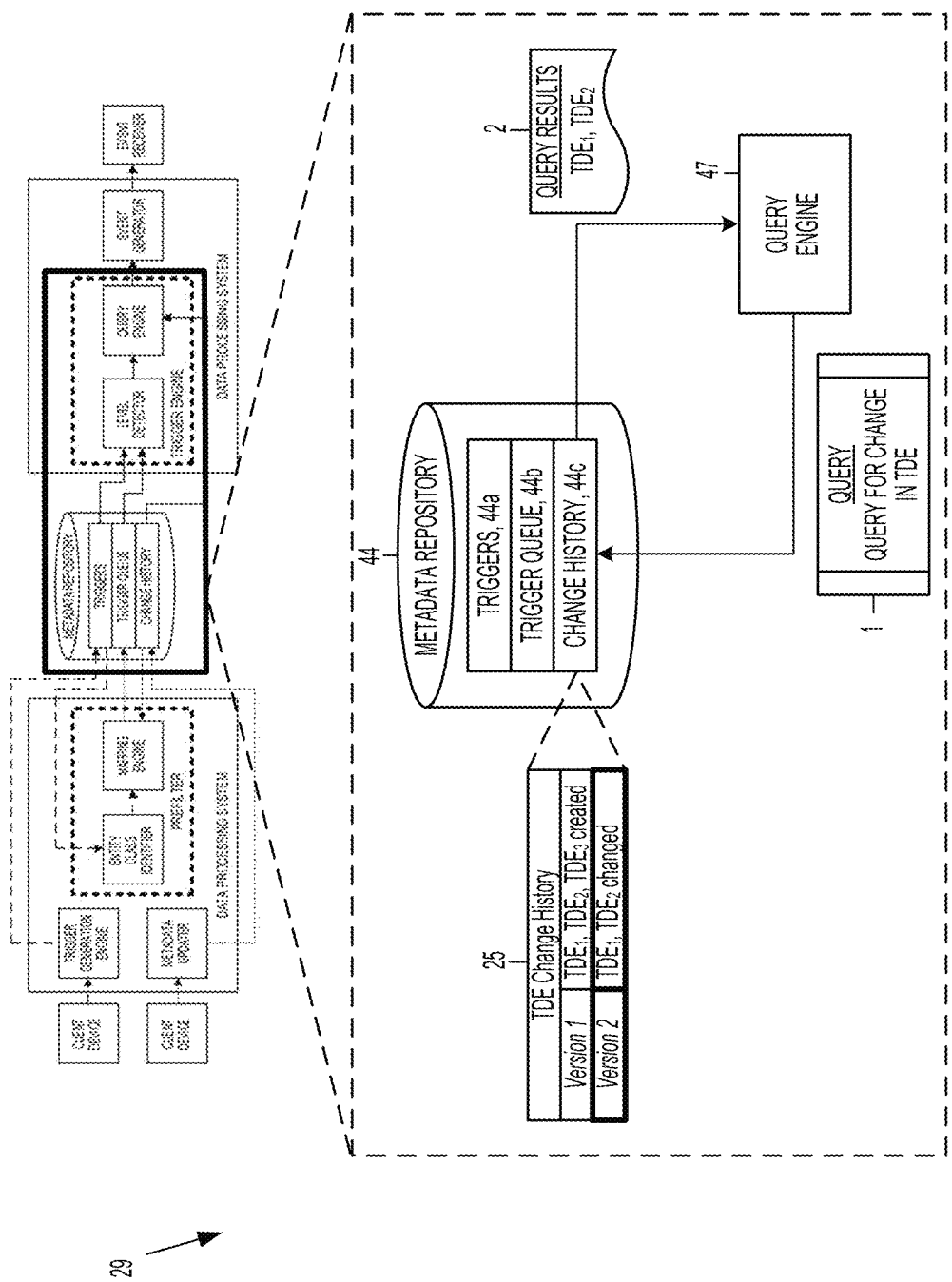

Referring to FIG. 3D, system 29 shows execution of queries by query engine 47. Query engine 47 generates query 1, which is a query for changes (e.g., additions, deletions, or updates) to attributes in instances of the TDE entity class in the changes committed. In some examples, query engine 47 generates query 1 by transforming aspects (e.g., declarative statements) of trigger 21 into executable statements (e.g., executable SQL queries or other executable database queries) that may be executed against metadata repository 44 and/or other databases storing the entities and values of their attributes. Additional details regarding the transformation of the transformation of the declarative trigger into executable queries is described in U.S. Pat. No. 11,921,710, the entire contents of which are incorporated herein by reference.

To reduce computational overhead, query 1 is executed against the TDE change history (rather than the entire corpus of data and/or metadata in the metadata repository 44) to identify the TDE entities (if any) that have changed. In this example, TDE change history 25 specifies that entities $TDE_1$ and $TDE_2$ have changed in version 2 relative to version 1 of the history. As a result, query results 2 include an indication of the changed entities $TDE_1$ and $TDE_2$, such as by returning the unique identifiers for the changed entities.

Figure 3E:
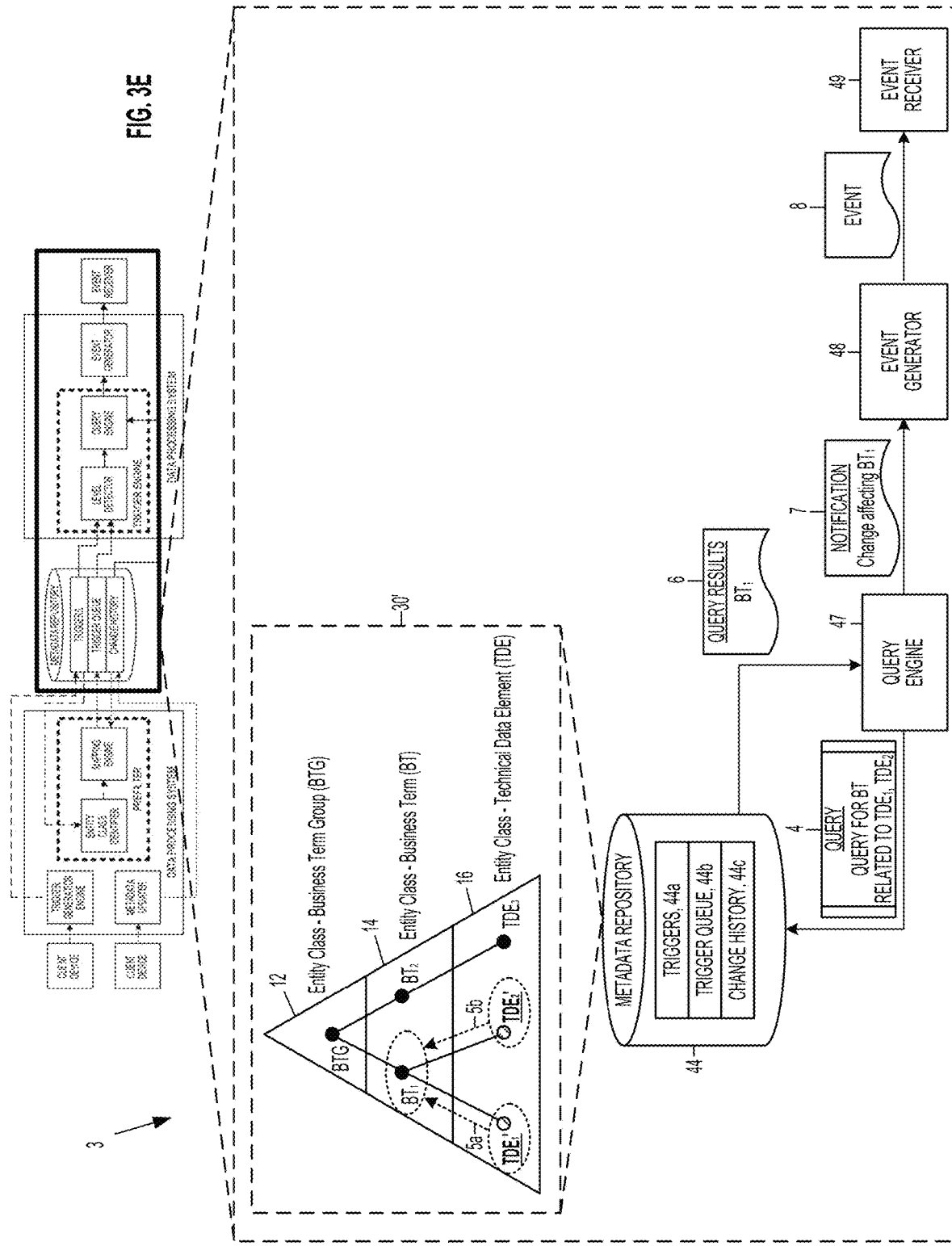

Referring to FIG. 3E, system 3 shows traversal of the metadata model to identify the BT entities for the changed TDEs, and generation of a notification for the BT entity class. Having determined that entities $TDE_1$ and $TDE_2$ have changed (e.g., from query results 2), query engine 47 generates a query 4 for one or more BT entities related to entities $TDE_1$ and $TDE_2$ per the instructions in trigger 21. Responsive to query 4, the metadata model 30' is traversed to identify the one or more BT entities related to entities $TDE_1$ and $TDE_2$. Such a traversal can be performed through use of key relationships (e.g., primary-foreign key relationships) between entities to join entities $TDE_1$ and $TDE_2$ to their related BT entities, followed by selection of an identifier of the joined BT entities. In this example, the $TDE_1$ entity of the TDE entity class 16 is traversed 5a to the $BT_1$ entity of the BT entity class 14. Similarly, the $TDE_2$ entity of the TDE entity class 16 is traversed 5b to the $BT_1$ entity of the BT entity class. Thus, in response to the query 4 for one or more BT entities related to entities $TDE_1$ and $TDE_2$, query results 6 including an indication of $BT_1$ (e.g., a unique identifier for $BT_1$) are returned.

Based on query results 6, query engine 47 generates a notification 7 indicating that a change affecting the BT entity class (specifically, the $BT_1$ entity of the BT entity class) has occurred and transmits the notification 7 to event generator 48. In some examples, the notification 7 can include additional information, such as an indication of the entities or attributes of the entities whose change affected the $BT_1$ entity. Event generator 48 in turn transmits event 8 to event receiver 49, which may be a client device, data processing device, external system, computer system, and so forth. Event 8 may be another notification specifying that code (or instructions or logic) for a data processing application or a pipeline application (e.g., represented by or dependent on $BT_1$) needs to be regenerated or re-executed. In this manner, the changes at the TDE entity class level are consolidated into a single notification at the BT entity class level with an identification of the affected BT entities, thereby reducing the number of change notifications that need to be generated and processed, while providing sufficient information to identify changes of interest (e.g., by indicating that $BT_1$ is affected by the change, but not $BT_2$).

Figure 4:
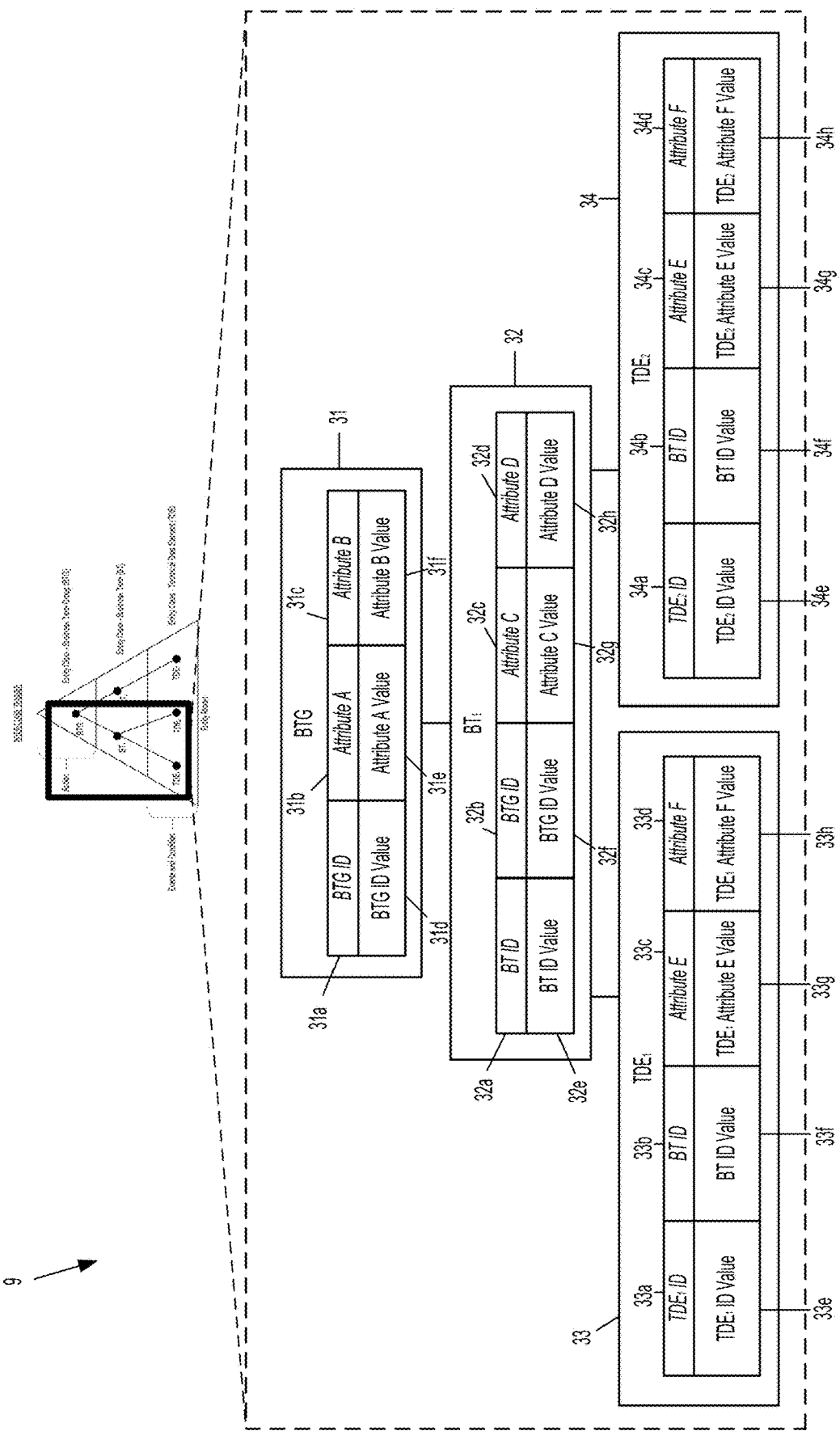
FIG. 4 illustrates an example of an entity model.

Referring to FIG. 4, an environment 9 is shown. In this example, environment 9 shows a visualization of a portion of entity model 10a described in FIG. 2A. This visualization shows BTG entity 31 (which is a particular instance of the BTG entity class), BT entity 32 (which is a particular instance of the business term entity class), TDE entity 33 (which is a particular instance of the TDE entity class), and TDE entity 34 (which is another instance of the TDE entity class). Relationships among these entities are also visually shown. BTG entity 31 includes attributes 31a-31c with respective values 31d-31f. BT entity 32 includes attributes 32a-32d with respective values 32e-32h. TDE entity 33 includes attributes 33a-33d with respective values 33e-33h. TDE entity 34 includes attributes 34a-34d with respective values 34e-34h. In this example, TDEs all have the same attributes-namely, a TDE ID, a BT ID, and attributes E and F. In this example, BTG entity 31, BT entity 32, and TDE entities 33, 34 are each a node in the entity model. The nodes reference or otherwise refer to each other through attributes 31a, 32a, 32b, 33a, 33b, 34a, 34b. For example, BT entity 32 is connected to BTG entity 31 by BT entity 32 having attribute 32*b* with value 32*f* that specifies an ID of BTG entity 31 thereby linking BT entity 32 with BTG entity 31.

In another example, an entity class can correspond to a table (e.g., a data structure), with the entity class attributes represented by the columns in the table (e.g., fields in the data structure), and an entity can correspond to a row of the table (e.g., a record in the data structure having values for each of the fields). In this example, the table corresponding to the BTG entity class includes columns "BTG ID," "Attribute A," and "Attribute B" representing the attributes of entities of the BTG entity class. The columns "Attribute A" and "Attribute B" can represent, for example, a name and a description of the BTG entity class, and the column "BTG ID" can represent a unique identifier of the BTG entity class. A particular instance of the BTG entity class (e.g., a BTG entity) is depicted as a row in the BTG table with values (e.g., "BTG ID Value," "Attribute A Value," and "Attribute B Value") for each of the attributes defined by table's columns.

Figure 5A:
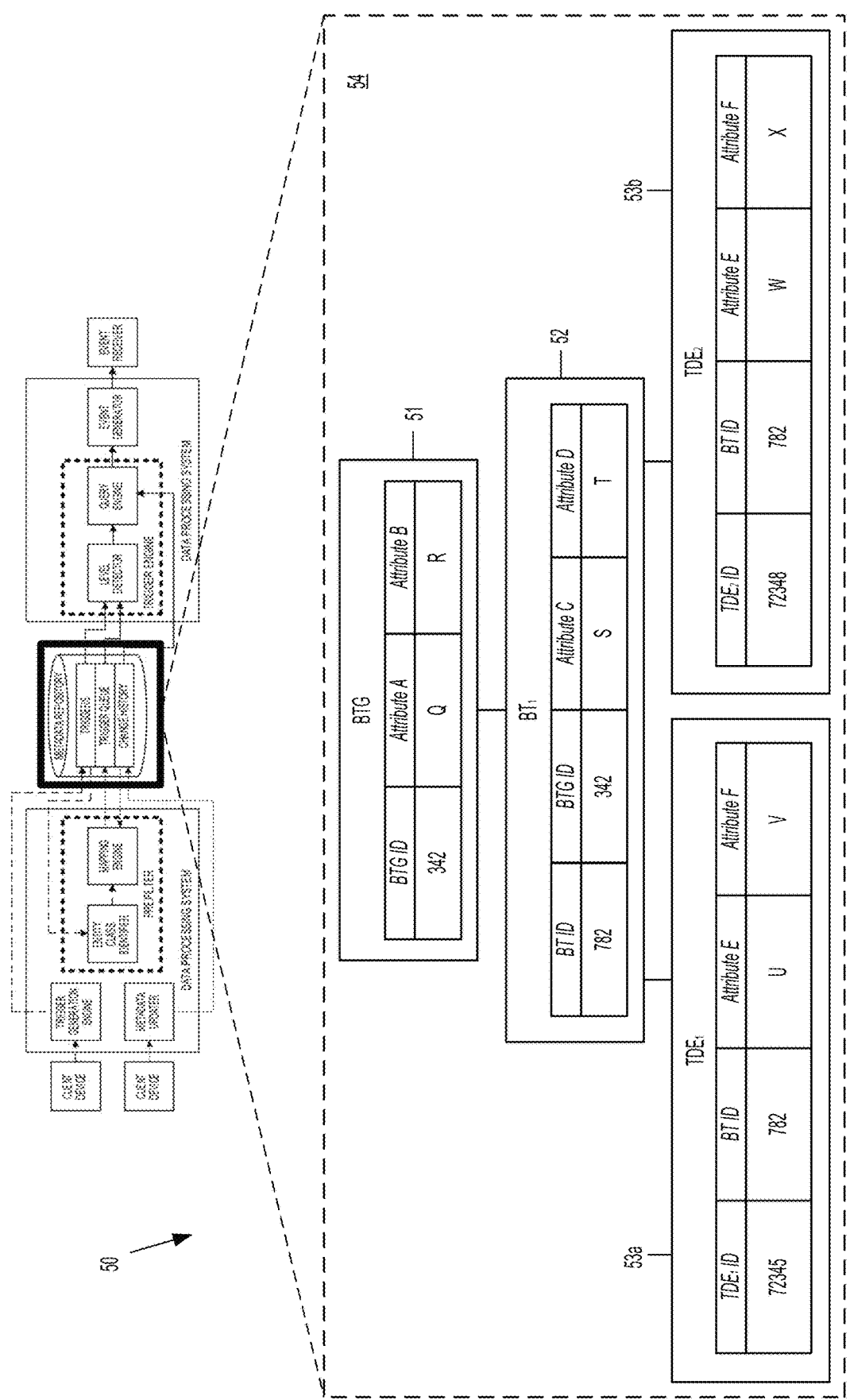

Referring to FIG. 5A, a system 50 is shown with metadata model 54. In this example, metadata model 54 includes BTG entity 51 in a first entity class (e.g., a BTG entity class), $BT_1$ entity 52 in a second entity class (e.g., a BT entity class), and $TDE_1$, $TDE_2$ entities 53*a*, 53*b* in a third entity class (e.g., a TDE entity class).

Figure 5B:
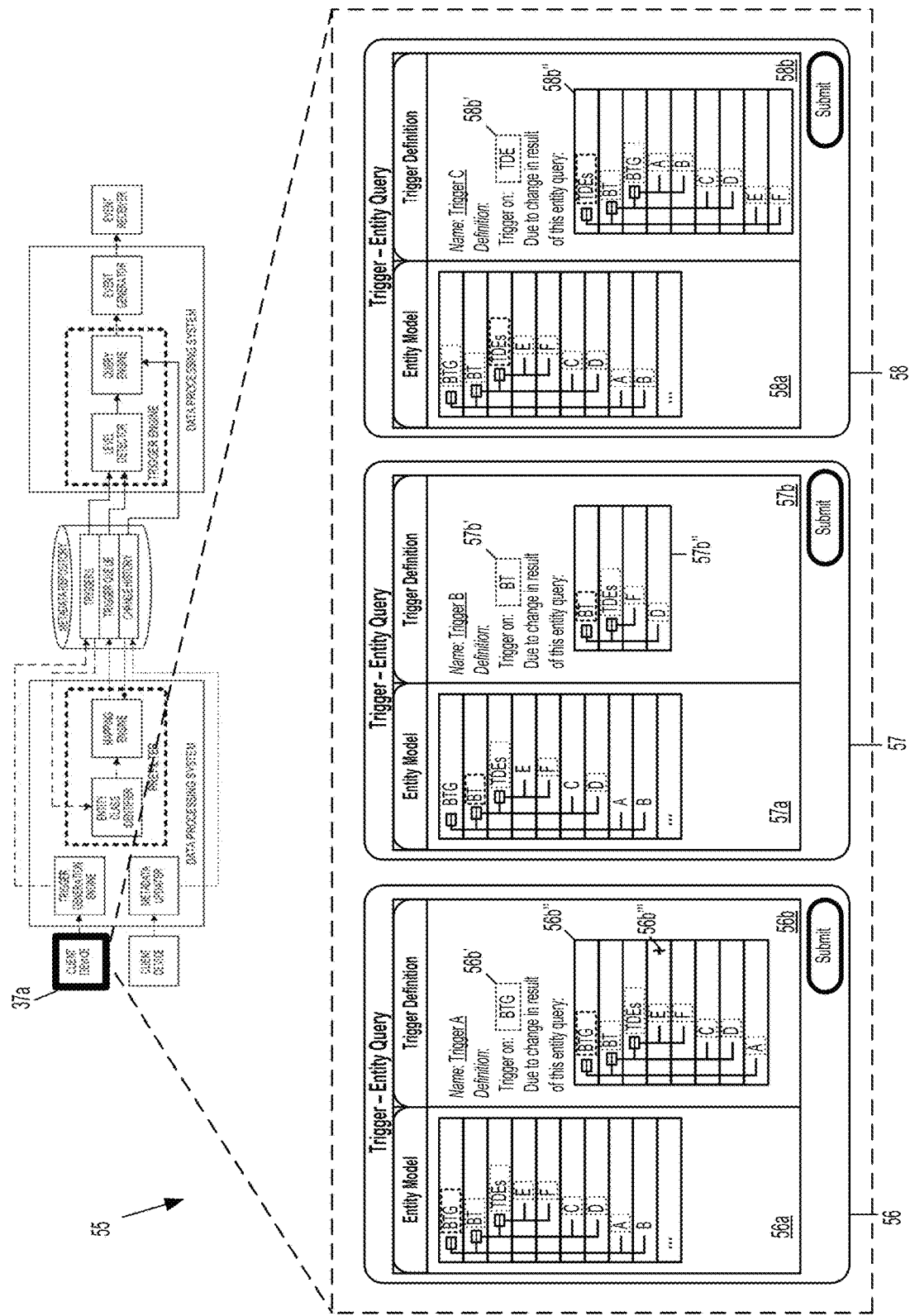

Referring to FIG. 5B, system 55 is shown for defining a trigger to generate a notification for a first entity class when a change to one or more attributes of one or more entities in a second entity class is detected. In this example, client device 37*a* renders graphical user interfaces 56, 57, 58. With regard to graphical user interface 56, portion 56*a* is shown with a visualization of the classes and attributes of metadata model 54 (such as shown in FIG. 5A). In particular, the visualization is a hierarchical visualization showing that the BTG entity class is a parent of the BT entity class, which in turn, is a parent of the TDE entity class. Attributes of each of the entity classes (and entities of the entities classes) are also visually depicted to allow a user to select which attributes to be included in the trigger. In this example, the user has selected that all the attributes of the TDE and BT entity classes are included in the trigger. Only attribute A from the BTG entity class is included in the trigger. In this example, changes to attribute D of entities of the BTG entity class will not cause execution of the trigger.

Graphical user interface 56 also includes portion 56*b* for defining a name of the trigger, which in this case is trigger A. Portion 56*b* also includes control 56*b*' to specify an entity class to trigger on (e.g., to perform an action on, such as generating a notification for the entity class). In some examples, a BTG icon in portion 56*a* may be selectable and may be dragged and dropped over to portion 56*b* into control 56*b*' to specify that there is a trigger on the BTG entity class. By specifying the entity class on which to trigger, system 55 specifies that a notification is generated for a particular entity class, including, for example, that the notification indicates that there have been one or more changes affecting the BTG entity class. The notification can identify the entities of the BTG entity class that are affected by the change, as described in detail below. In some examples, the notification can also identify the entities that caused the trigger to execute. In this example, the trigger is executed when there is a change to attributes of the entities in the entity classes specified in visualization 56*b*". As shown with regard to user interface 56, by allowing a user to select the specific attributes of the entity classes for the trigger, the system enables the user (or the system, when the trigger is generated automatically) to control which attributes cause generation of the notification, and for which entity class. A user can also select an indicator 56*b*''' to specify predicate filtering for, e.g., TDE Attribute E, as described below with respect to FIG. 5K. Note that similar indicators can be included for specifying predicate filtering for other attributes, entities, or entity classes.

Graphical user interface 57 includes portion 57*a* for selection of various attributes of the entity classes for which one or more changes causes the trigger to execute and a notification to be generated. Graphical user interface 57 includes portion 57*b* with control 57*b*' for specifying that, in this example, the trigger is going to be for the BT entity class based on a change in attribute F in the TDE entity class or a change in attribute D in the BT entity class. Portion 57*b* includes visualization 57*b*" that depicts the entity class for which the trigger is generated, in this case the BT entity class, and also visually depicts the attributes and the entity classes for which changes to values of the attributes are monitored or otherwise detected to cause a generation of the notification.

Graphical user interface 58 includes portion 58*a* for selecting entity classes and attributes in defining a trigger. Graphical user interface 58 includes portion 58*b* with control 58*b*' for specifying the entity class for which a trigger is generated. Portion 58*b* also includes visualization 58*b*" that visually depicts the entity class for which the trigger is generated, in this case the TDE entity class, and also visually depicts the attributes and the entity classes for which changes to values of attributes are monitored or otherwise detected to cause a generation of the notification.

Figure 5C:
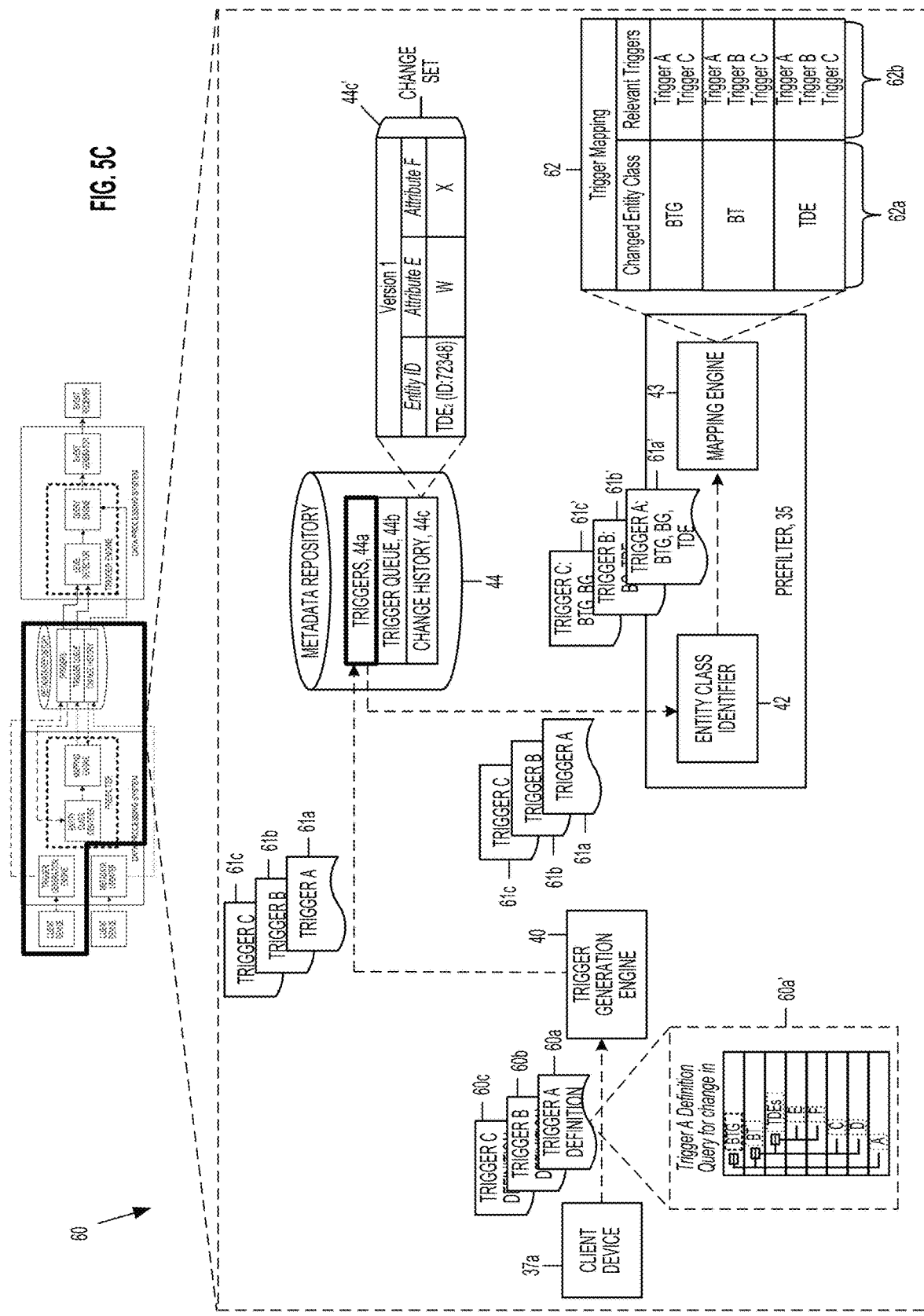

Referring to FIG. 5C, system 60 is shown for generating a mapping of relevant entity classes for a trigger. In this example, client device 37*a* sends trigger definitions 60*a*, 60*b*, 60*c* to trigger generation engine 40. Each of trigger definitions 60*a*, 60*b*, 60*c* represent triggers defined in graphical user interfaces 56, 57, 58 respectively. In this example, visualization 60*a*' is shown for trigger definition 60*a*. In turn, trigger generation engine 40 transmits triggers 61*a*, 61*b*, 61*c* to triggers portion 44*a* of metadata repository 44, shown as triggers 44*a*. Trigger generation engine 40 generates triggers 61*a*, 61*b*, 61*c* in accordance with trigger definitions 60*a*, 60*b*, 60*c* by performing formatting and other operations required by metadata repository 44 for storage. In some examples, trigger generation engine 40 generates instructions or code representing the triggers 61*a*, 61*b*, 61*c* based on the trigger definitions 60*a*, 60*b*, 60*c*.

In this example, triggers 44*a* transmits triggers 61*a*, 61*b*, 61*c* to entity class identifier 42 in prefilter 35. Entity class identifier 42 examines contents of each of triggers 61*a*, 61*b*, 61*c* to identify relevant entity classes for each of those triggers 61*a*, 61*b*, 61*c*. After doing so, entity class identifier 42 transmits trigger data 61*a*', 61*b*', 61*c*' to mapping engine 43. Trigger data 61*a*', 61*b*', 61*c*' specifies for each trigger, a trigger name and the relevant entity classes. Mapping engine 43 uses the received trigger data 61*a*', 61*b*', 61*c*' to generate or update the trigger mapping 62. Trigger mapping 62 includes portion 62*a* specifying a relevant or changed entity class for a trigger and further specifying for each entity class, relevant triggers, as shown in portion 62*b*.

Metadata repository 44 also stores, in change history portion 44*c*, change set 44*c*'. Generally, a change set includes data specifying one or more modifications or changes to a value of an attribute for a particular instance of an entity class. In some examples, a change set includes all changes associated with all instances of a particular entity class (e.g., all changes to instances of the TDE entity class). A change set is distinct from the instance of the entity class.

That is, when a change set is received, the change set specifies a change to a value of an attribute of an instance of the entity class. At some point after receipt of the change set, the data processing system commits the change, e.g., by modifying the value of the attribute for the instance of the entity class. However, by saving these change sets (at least temporarily), the data processing system can query these change sets for changes that are relevant to executing queries, as described in further detail below—without having to query all the instances of the entity classes saved in the metadata repository 44 or in another repository. This is more computationally efficient to identify changes that are relevant to triggers, because there are fewer change sets than instances of entity classes. As such, by only having to search the change sets, there is less information for the data processing system to have to search.

A change set is also created when the first value of an attribute for an instance of an entity class is set. In this example, change set 44c' is created when the data for $TDE_2$ is originally stored in metadata repository 44 or a data store (not shown). In this example, metadata repository 44 describes or otherwise represents data that is stored in a data store, a hardware storage device and so forth. In this example, change set 44c' is created when $TDE_2$ is created in metadata repository 44, a data store or hardware storage device.

In another example, a change set includes data specifying a change to an entity associated with the entity model. As described herein, in determining whether to generate a notification, the data processing system only queries change sets, rather than having to query all entities associated with the entity model. It is more computationally efficient to just query the change sets, rather than all the entities. As such, the change sets themselves improve the computational efficiency of the system.

System 60 is configured such that when these technical data elements or other entities are actually created for the first time, a change set is created and stored in change history portion 44c. In this example, a change set includes a structured item of data specifying the entity ID of the instance of the entity class that is being created or modified (e.g., updated or deleted), along with the attributes of that instance and associated values of the attributes. In this example, as previously described, the technical data elements themselves are not stored in metadata repository 44. Rather, the technical data elements with attributes and associated values would be stored in a different database, and change history portion 44c of metadata repository would simply store change sets describing the changes to that data itself or values for when that data was originally created.

Figure 5D:
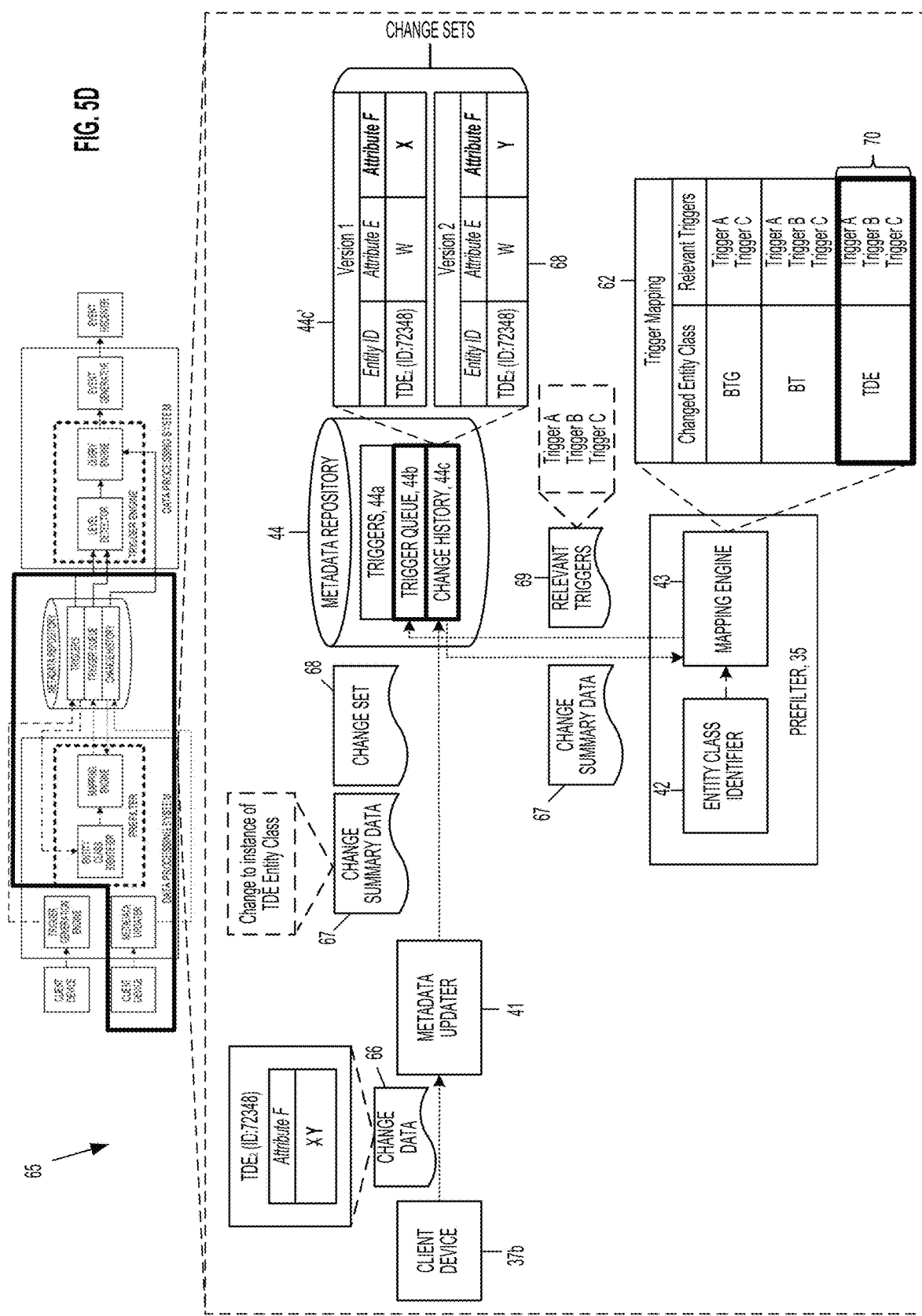

Referring to FIG. 5D, system 65 shows operation of prefilter 35 upon a change to an entity. In an example, client device 37b transmits change data 66 to metadata updater 41. In turn, metadata updater 41 generates change summary data 67, which specifies the entity class(es) to which the change has occurred and also generates change set 68. Metadata updater 41 transmits change summary data 67 and change set 68 to change history portion 44c for storage. In this example, change set 68 includes the entity ID of the entity that is being modified, and also includes the attributes and values of those attributes. By storing the change sets in metadata repository 44, a data processing system (e.g., system 65) is able to more quickly query for changes that may be relevant to triggers because the data processing system can just query the change sets themselves, without having to go into the data store that stores the actual data and query all of the data that is being stored. In addition, prefilter 35 also ensures computational efficiency by, for each change, identifying only those triggers that may be relevant to the change. This is more computationally efficient than the data processing system having to execute every trigger every single time that there is a change. In this example, change summary data 67 is sent to mapping engine 43. Using contents of change summary data 67, mapping engine 43 identifies, using trigger mapping 62, that the changed entity class is the TDE entity class and that accordingly, triggers A, B, C are relevant, as indicated in highlighted portion 70 of trigger mapping 62. Mapping engine 43 transmits to trigger queue 44b these relevant triggers data 69. By storing relevant triggers data 69 in the trigger queue 44b, the system 65 enables asynchronous evaluation of relevant triggers data 69 and implementation of the change set 68. In other words, the changes included in the change set 68 can be implemented within the system 65 without losing track of information about the triggers that are relevant to the changes included in the change set 68. This enables the system 65 to evaluate relevant triggers data 69 at a later time (e.g., at off peak hours) without delaying implementation of the change set 68 due to synchronous evaluation of relevant triggers data 69 and implementation of the change set 68.

Referring to FIG. 5E, system 72 illustrates functionality performed when determining whether to actually execute a trigger. In this example, level detector 46 periodically, or otherwise from time to time, queries trigger queue 44b for relevant triggers to be evaluated. In this example, trigger queue 44b transmits next trigger data 73 to level detector 46. Next trigger data 73 specifies that the next trigger to be executed is trigger A, shown as trigger A 61a. Level detector 46 requests and receives from triggers portion 44a trigger A 61a, a visualization of which is shown as 61a'. Level detector 46 parses and analyzes the contents of trigger A 61a and determines that there are three different levels in trigger A: level 1 (BTG), level 2 (BT), and level 3 (TDE). Such parsing can be done in accordance with a schema (e.g., the entity model). Level detector 46 transmits level data 74 and trigger A 61a to query engine 47. Level data 74 specifies that query engine 47 should use contents of trigger A 61a to generate a query for only level 1 (BTG) at this time.

Figure 5F:
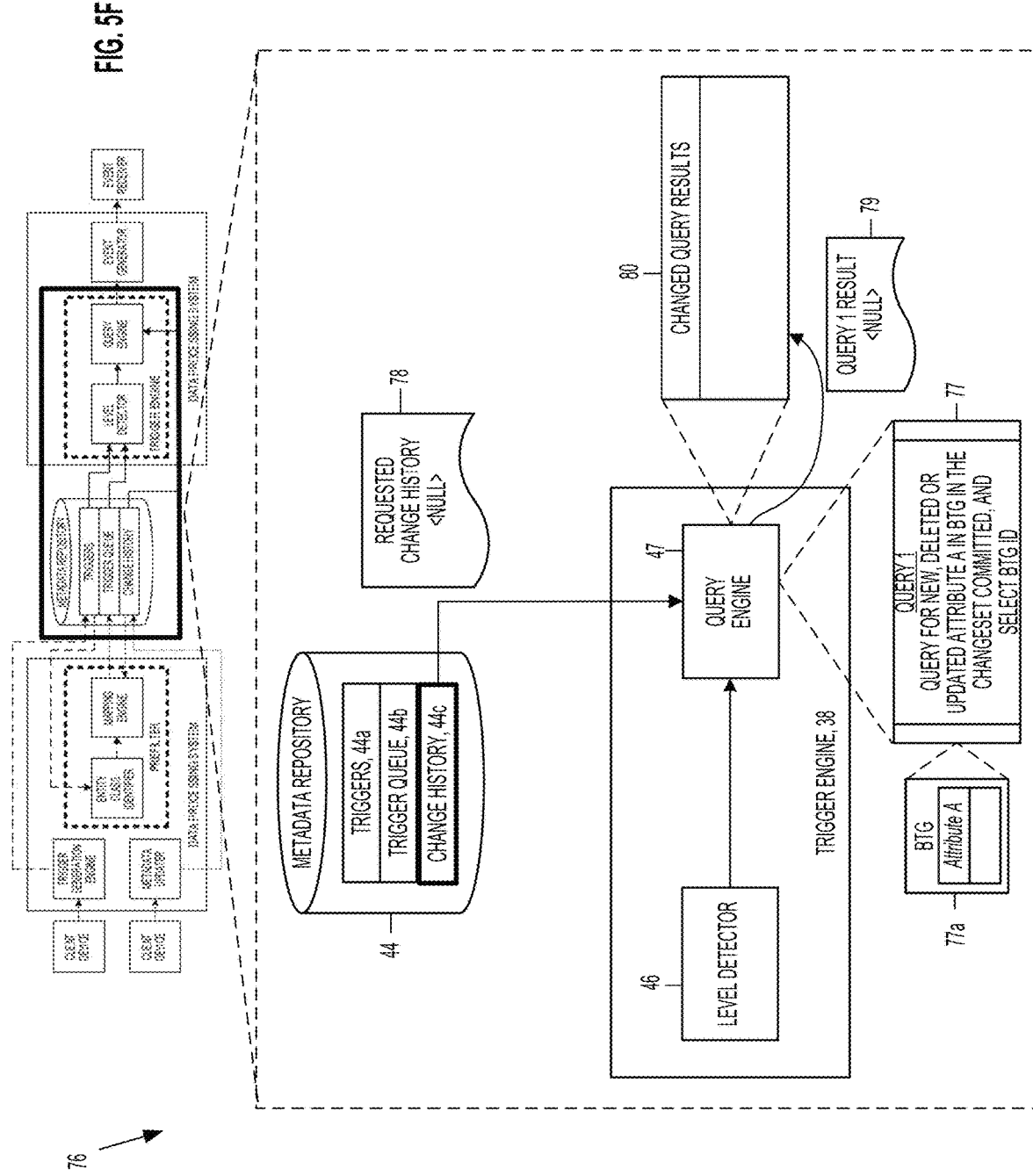

Referring to FIG. 5F, system 76 shows execution of queries by query engine 47. Based on trigger A 61a and level data 74, query engine 47 generates query 77, which is visually shown as query 77a. In this example, level 1 (BTG) of trigger A 61a can include one or more declarative statements specifying that changes to values of attribute A of entities in the BTG entity class should cause the trigger to execute. Query engine 47 can perform one or more transformations to transform these declarative statements into an executable query 77, which is a query for new, deleted, or updated values of attribute A in instances of the BTG entity class in the change set committed, and then selecting BTG ID for any identified instances. In this example, trigger A 61a is configured to trigger on BTG, meaning that trigger A 61a will generate a notification for the BTG entity class when one more changes occur to attributes E or F in instances of the TDE entity class or to attributes C or D in instances of the BT entity class or to attribute A in instances of the BTG entity class. In this example, query 77 is configured to select the BTG ID because that is the entity class on which the trigger executes. In this example, query engine 47 executes query 77, and in response to execution of query 77, change history portion 44c sends requested change history 78 to query engine 47. Requested change history 78 indicates that there are no change sets for the BTG entity class. Since there are no change sets for the BTG entity class, execution of query 77 over the requested change history 78 produces query 1 results 79 having a null value. Query engine 47 transmits or otherwise updates its changed query results table 80 with these query 1 results 79. In this example, query 77 specifies that only attribute A is being queried. As such, this is an example of controlling the attribute for which a trigger is executed.

Figure 5G:
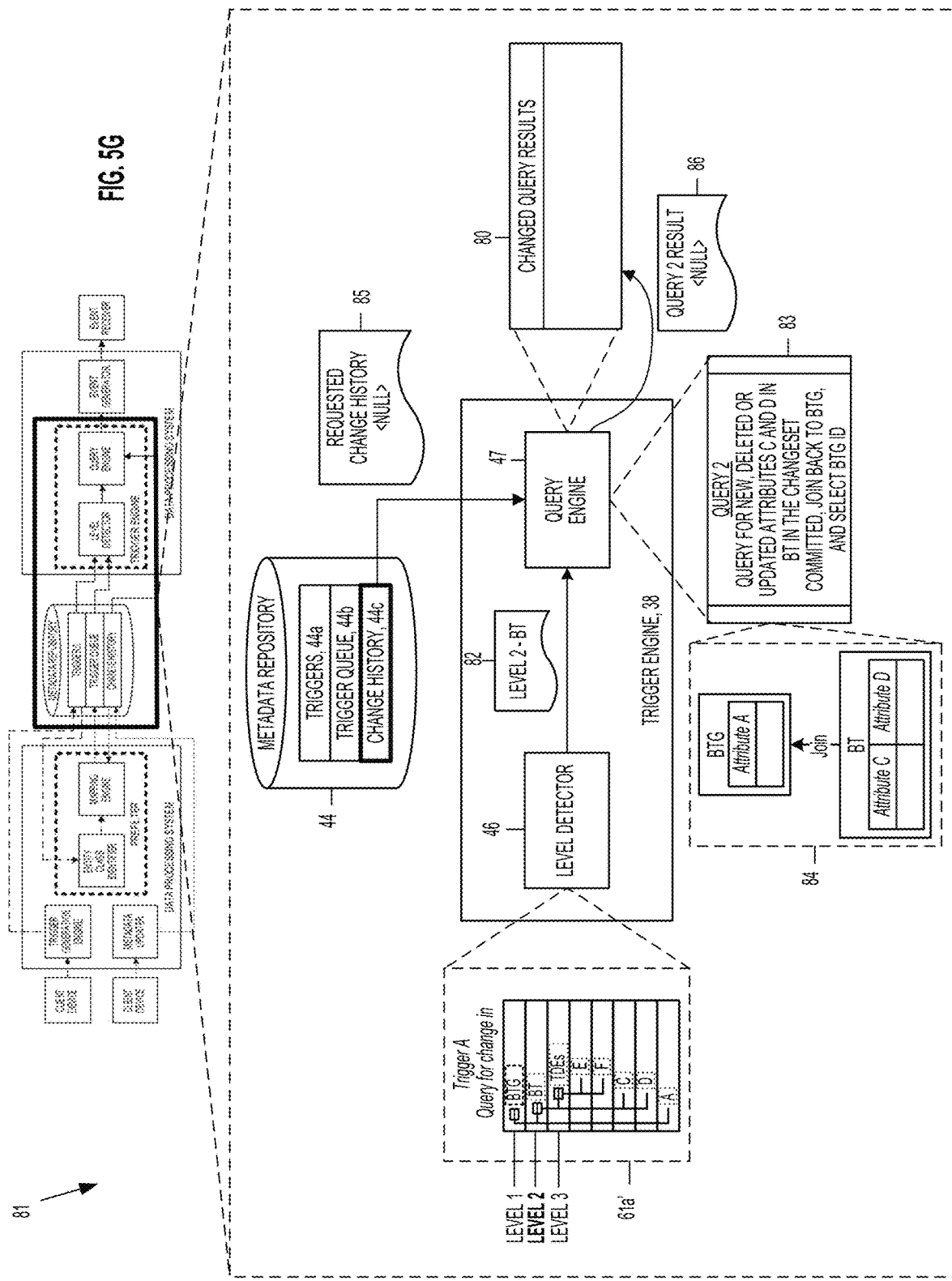

Referring to FIG. 5G, system 81 illustrates query engine 47 executing a query for the next level—level 2—in trigger A 61a. In this example, after query engine 47 successfully executes query 77 and receives the results, query engine 47 asks level detector 46 if there are any other queries to be executed. In response, level detector 46 transmits level data 82 to query engine 47. Level data 82 specifies that query engine 47 should next query for changes in the BT entity class. Based on level data 82 and trigger A 61a, query engine 47 generates query 83, visually depicted as query 84. In this example, level 2 (BT) of trigger A 61a can include one or more declarative statements specifying that changes to values of attributes C and D of entities in the BT entity class should cause the trigger to execute. Query engine 47 can perform one or more transformations to transform these declarative statements into an executable query 83, which is a query for new, deleted, or updated values of attributes C and D in instances of the BT entity class in the change set committed, and then to join back to BTG and select BTG ID. Again, query 83 specifies to join back to BTG and to select BTG ID because this trigger triggers on BTG. As such, if changes are detected in instances of the BT entity class, in order for the notification to occur with regard to BTG, query engine 47 needs to identify the relevant BTG ID (e.g., the relevant instance of the BTG entity class) for which the changes in the BT entity class have been detected. In this example, query engine 47 executes query 83 to request from change history portion 44c results for query 83. In this example, change history portion 44c transmits requested change history 85 to query engine 47. Requested change history 85 indicates that there have been no changes in the BT entity class for either attributes C or D. As such, query engine 47 passes query 2 results 86, which are <Null>, to changed query results table 80.

Figure 5H:
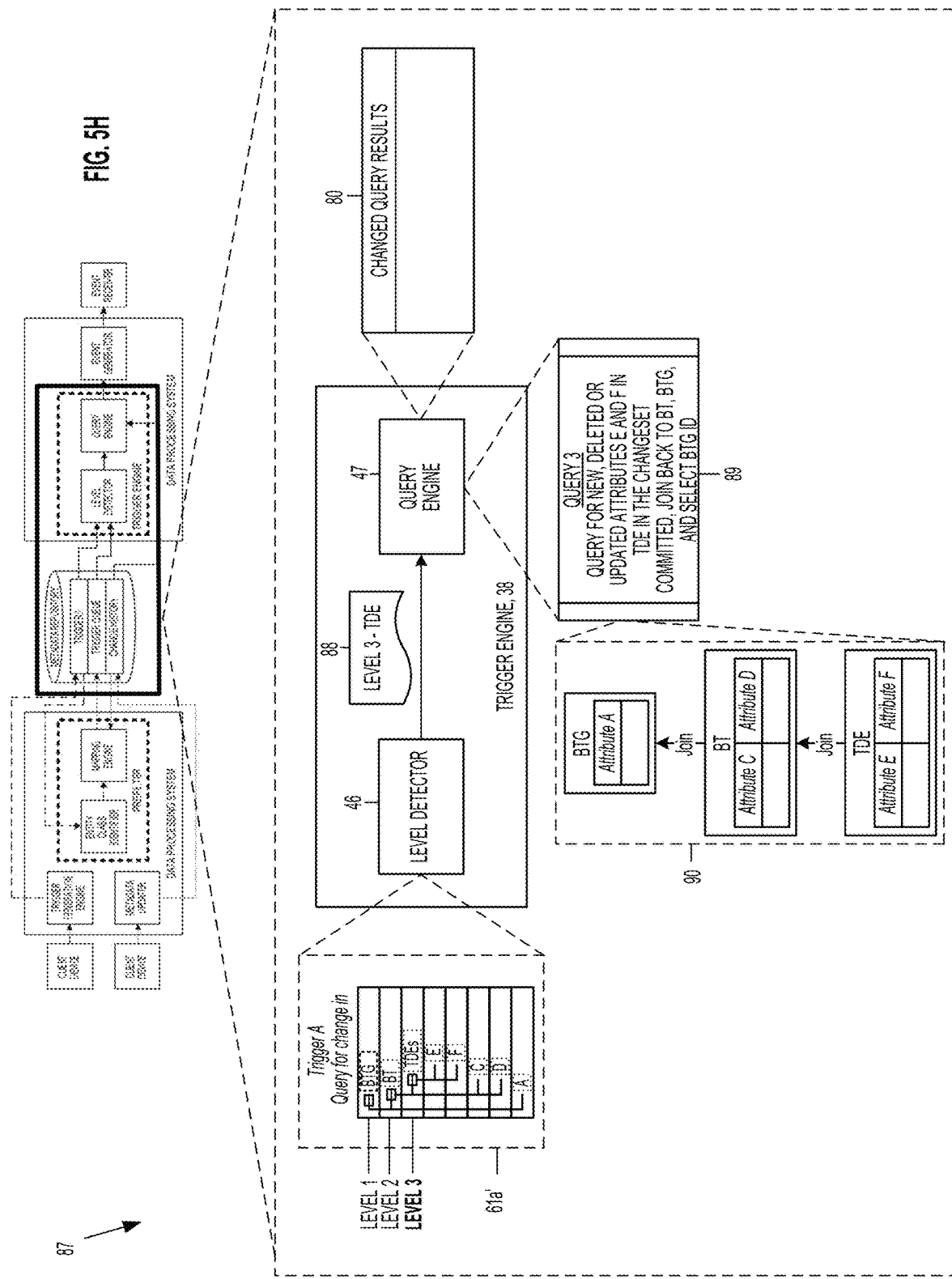

Referring to FIG. 5H, system 87 illustrates that level detector 46 transmits level data 88 to query engine 47. Level data 88 indicates that the next level for which query engine 47 needs to generate a query for is level 3, or the TDE entity class level. Based on level data 88 and trigger A 61a, query engine 47 generates query 89, which is visually depicted as query 90. In this example, level 3 (TDE) of trigger A 61a can include one or more declarative statements specifying that changes to values of attributes E and F of entities in the TDE entity class should cause the trigger to execute. Query engine 47 can perform one or more transformations to transform these declarative statements into an executable query 89, which is a query for new, deleted, or updated values of attributes E and F in instances of the TDE entity class in the change set committed, and then joining back to the BT entity class and the BTG entity class, and selecting the BTG ID. Again, if a change is detected in an instance of the TDE entity class, query engine 47 needs a way to link or otherwise attribute that change in the instance of the TDE entity class back to an instance of the BTG entity class, because the BTG entity class is the entity class for which the notification is being generated. In order to ensure this attribution, query 89 specifies to traverse from the TDE entity class to the BTG entity class by joining the changed instance in the TDE entity class to the related instance in the BT entity class, and then joining the instance in the BT entity class to the related instance in the BTG entity class. The query 89 then specifies to select the appropriate instance of the BTG ID entity class, thereby properly attributing a change in an instance of the TDE entity class to an instance of the BTG entity class so that a notification or other event can be generated for the BTG entity class.

Referring to FIG. 5I, system 92 shows querying of change history portion 44c in accordance with query 89. In this example, metadata repository 44 stores metadata model 54. Query engine 47 transmits query 89 to change history portion 44c. Change history portion 44c stores change sets 44c' and 68, which satisfy the portion of query 89 that is querying for new, deleted, or updated values of attributes E and F in instances of the TDE entity class in the change sets committed. In particular, the change of the value of attribute F from X to Y in $TDE_2$ (ID: 72348) satisfies the portion of query 89. As such, execution of query 89 results in selection (e.g., accessing from metadata repository 44 and/or change sets 44c' and 68) of the values of attributes of the $TDE_2$ (ID: 72348) entity, and storing (e.g., in memory or another hardware storage device) the values in a table (e.g., a data structure), as shown in Table 1. In some examples, a subset of the attributes and values of the $TDE_2$ (ID: 72348) entity are accessed and stored in the table, such as the TDE ID (e.g., 72348), the BT ID (e.g., 782), and/or the changed attribute(s) (e.g., Attribute F and its value Y). In addition, if there are changes to multiple TDE entities that satisfy the change criteria of query 89, then the table can have multiple rows (e.g., one for each TDE entity, or one for each change).

TABLE 1

| TDE ID | BT ID | Attribute E | Attribute F |
|--------|-------|-------------|-------------|
| 72348  | 782   | W           | Y           |

Metadata repository 44 then executes the next portion of query 89, which specifies the join back to BT entity class and BTG entity class, and to select BTG ID. To implement this portion of query 89, metadata repository 44 first performs a join operation (as indicated by indicator 94) to traverse metadata model 54 from an instance of the TDE entity class specified by change sets 44c', 68 to an instance of the BT entity class. In this example, execution of query 89 causes the join operation to be performed based on a primary-foreign key relationship between the BT ID of an instance of the TDE entity class and the BT ID of an instance of the BT entity class. For example, to traverse from the $TDE_2$ (ID: 72348) entity to its related BT entity, the table shown in Table 1 (or a subset thereof) having a BT ID value of 782 (e.g., primary key value) can be joined to a table of the BT entity having a matching BT ID value (e.g., a matching foreign key value). As a result of the join operation, attributes and values of the attributes of the related BT entity can be joined or appended to Table 1 to produce a new or updated table (e.g., data structure), as shown in Table 2. In some examples, a subset of the attributes and values of the BT entity are selected and joined to Table 1, such as the BTG ID.

TABLE 2

| TDE ID | BT ID | Attribute E | Attribute F | BTG ID | Attribute C | Attribute D |
|---|---|---|---|---|---|---|
| 72348 | 782 | W | Y | 342 | S | T |

Metadata repository 44 then traverses from the instance of the BT entity class up to an instance of the BTG entity class via a second join operation, as illustrated by indicator 93. In this example, execution of query 89 causes the second join operation to be performed based on a primary-foreign key relationship between the BTG ID of an instance of the BT entity class and the BTG ID of an instance of the BTG entity class. For example, to traverse from the $BT_1$ entity to its related BTG entity, the table shown in Table 2 (or a subset thereof) having a BTG ID value of 342 (e.g., primary key value) can be joined to a table of the BTG entity having a matching BTG ID value (e.g., foreign key value). As a result of the second join operation, attributes and values of the attributes of the related BTG entity can be joined or appended to Table 2 to produce a new or updated table (e.g., data structure), as shown in Table 3. In some examples, a subset of the attributes and values of the BTG entity are selected and joined to Table 2. In some examples, such as where only the BTG ID is needed (and not the other attributes of the BTG entity), it may not be necessary to perform the second join operation since the BTG ID was identified during the first join operation. In some examples, additional or alternative join operations may be performed to execute different traversals.

tions or logic) needs to be regenerated or re-executed in response to a change affecting the data processing application or the data pipeline application. For example, the data processing application or pipeline application may be a metadata-driven data processing application that is configured to perform operations based on metadata, such as described in U.S. patent application Ser. Nos. 18/496,543 and 18/104,066, the entire contents of each of which are incorporated herein by reference. In this example, if the data processing application or pipeline application operates based on metadata for BTG ID 342 and/or its related BT(s) and TDE(s), and the metadata for BTG ID 342 and/or its related BT(s) and TDE(s) changes (e.g., due to an addition, deletion, or update to an entity and/or its attributes), then the code (or instructions or logic) for the data processing application or pipeline application may need to be regenerated in a way that accounts for the changed metadata, or re-executed to perform operations in accordance with the changed metadata, or both. Similarly, if the data processing application or pipeline application processes data associated with BTG ID 342 and/or its related BT(s) and TDE(s), and BTG ID 342 and/or its related BT(s) and TDE(s) changes, then the code (or instructions or logic) for the data processing application or pipeline application may need to be

TABLE 3

| TDE ID | BT ID | Attribute E | Attribute F | BTG ID | Attribute C | Attribute D | Attribute A | Attribute B |
|---|---|---|---|---|---|---|---|---|
| 72348 | 782 | W | Y | 342 | S | T | Q | R |

After performing the join operations to traverse to the BTG entity class, query 89 causes selection of the BTG ID: 342 (e.g., from Table 3), and data 93a specifying BTG ID: 342 is transmitted to query engine 47. In some examples, change sets 44c', 68 are also transmitted to query engine 47. Using the data 93a, query engine 47 generates query result 96 and transmits query result 96 to changed query results table 80, which is updated as indicated in portion 97.

Figure 5J:
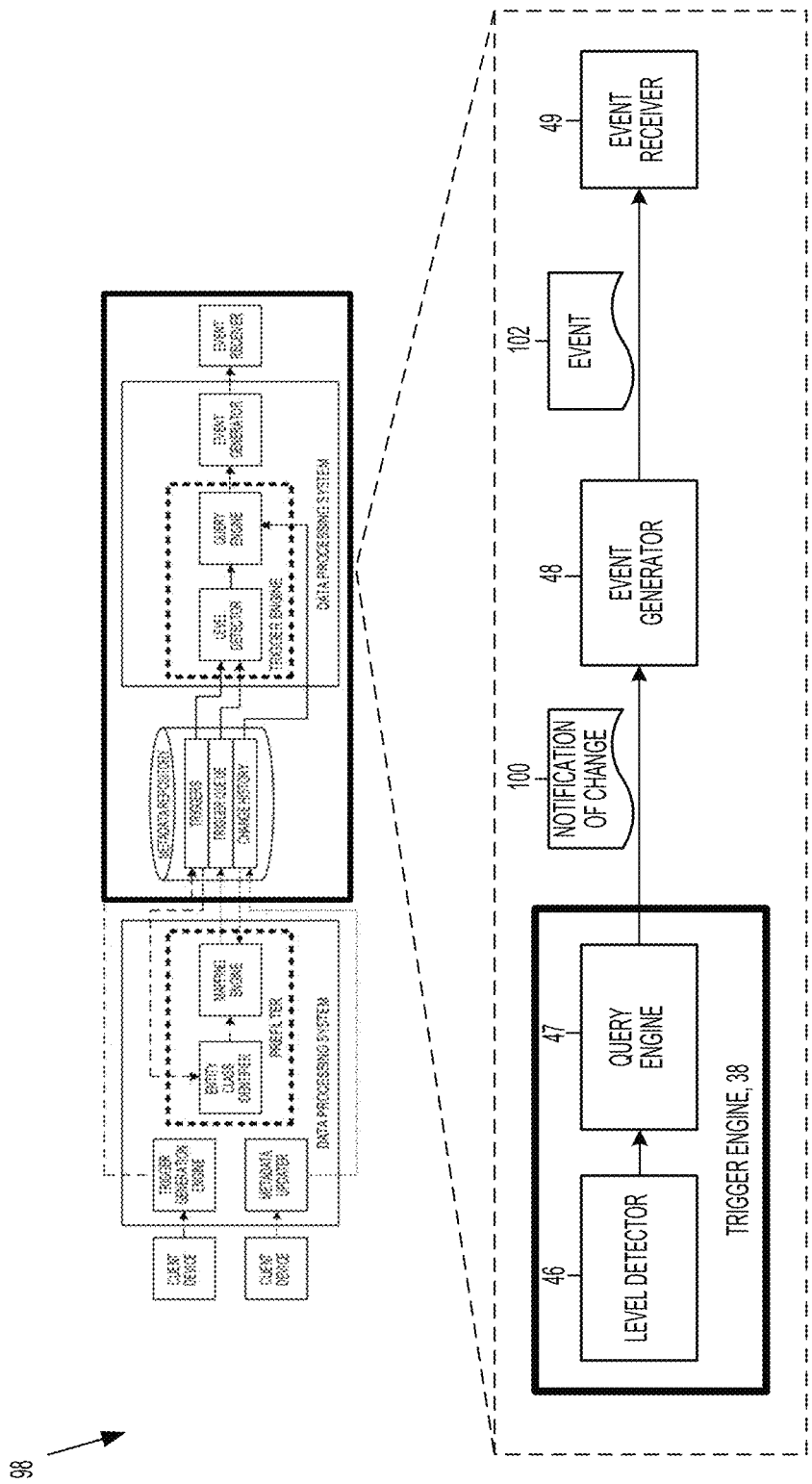

Referring to FIG. 5J, system 98 shows generation of an action or an event based on execution of the trigger. In this example, query engine 47 transmits notification 100 of change to event generator 48, which in turn transmits event 102 to event receiver 49. Notification 100 specifies that a change has, in fact, occurred that is impacting the BTG entity class (or a particular instance of the BTG entity class) or is otherwise related to the BTG entity class. In this example, event generator 48 generates event 102, which may be another notification specifying that code (or instructions or logic) for a data processing application or a pipeline application (e.g., represented by the particular instance of the BTG entity class) needs to be regenerated or re-executed. The notification 100 and/or the event 102 can identify an instance of the BTG entity class affected by the change (e.g., BTG ID: 342). In some examples, the notification 100 and/or the event 102 can identify the instances and/or changes that caused the trigger (e.g., change to $TDE_2$, attribute F).

In general, a data processing application or pipeline application may be configured such that its code (or instrucregenerated in a way that accounts for the changed data, or re-executed to process the changed data, or both. Using the techniques described herein, the data processing application or pipeline application can be caused to regenerate or re-execute its code (or instructions or logic) in a computationally efficient manner.

Figure 5K:
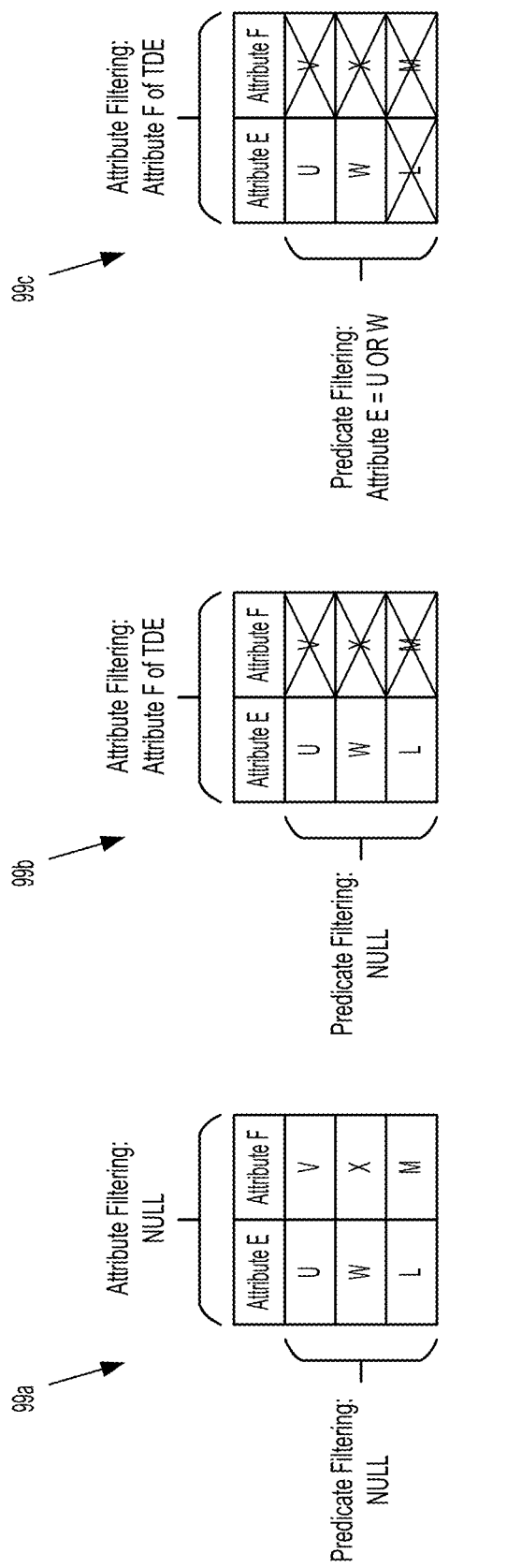
FIG. 5K illustrates an example of attribute filtering and predicate filtering.

Referring to FIG. 5K, examples 99a, 9b, 99c of attribute filtering and predicate filtering are shown. Such filtering can enable more granular specification of changes that are of interest in a particular trigger (e.g., a trigger 61a, 61b, 61c). In example 99a, a user has specified no attribute or predicate filtering for the TDE entity class in a trigger. Stated differently, the user has selected that all the attributes of the TDE entity class are included in the trigger, and that no predicate filtering is applied to values of the attributes in instances of the TDE entity class. Such a selection can be made by, for example, interacting with one of interfaces 56, 57, 58 to select all attributes of the TDE entity class (e.g., Attributes E and F) without specifying any predicate filtering for Attributes E and F. In this example, a change to a value of Attribute E or F in any TDE entity will cause a trigger to execute.

In example 99b, a user has selected to include Attribute E and to filter out attribute F of the TDE entity class in a trigger. The user has also specified no predicate filtering for the TDE entity class. Such a selection can be made by, for example, interacting with one of interfaces 56, 57, 58 to select only Attribute E of the TDE entity class without specifying any predicate filtering for Attributes E and F. As a result, only changes to values of Attribute E in a TDE entity will cause this trigger to execute. In this manner, the user is able to specify more granular changes that cause the trigger to execute (e.g., only changes to values of Attribute E, rather than any change to a value in an TDE entity). This filtering also enables the trigger to execute more efficiently (relative to triggers that do not have such filtering) since only changes to values of Attribute E need to be queried and processed.

In example 99c, a user has selected to include Attribute E and to filter out attribute F of the TDE entity class in a trigger. The user has also specified predicate filtering that only changes where Attribute E has a value of U or W are to cause the trigger to execute. Such a selection can be made by, for example, interacting with one of interfaces 56, 57, 58 to select only Attribute E of the TDE entity class and specifying predicate filtering on values U or W for Attribute E. As a result, only changes to Attribute E from a value of U or W to another value will cause this trigger to execute. Through a combination of predicate and attribute filtering, the user is able to specify the exact rows (e.g., TDE entities) and columns (e.g., TDE attributes) that cause the trigger to execute. Also, predicate filtering further increases the efficiency of executing a trigger (relative to triggers that do not have such filtering), as unnecessary data (e.g., data associated with values that do not satisfy the predicate filter) can be skipped when processing the trigger.

Referring to FIG. 6A, system 103 is shown for generating an inter-class trigger based on inheritance. In this example, metadata repository 44 stores metadata model 104 with entity classes 104a, 104b, 104c, 104d. Entity class 104a is a BTG entity class. Entity class 104b is a BT entity class. Entity class 104c is a TDE entity class. Entity class 104d is a data set (DS) entity class. DS entity class 104d represents data sets that are stored in one or more other hardware storage devices or databases configured for communication with data processing systems 39, 45. In this example, portion 105 of entity or metadata model 104 is shown. Portion 105 includes entities 106, 107, 108a, 108b, 109a, 109b. In this example, entities 108a, 108b each inherit a value for attribute A from entity 107, which in turn, inherits a value of attribute A from entity 106. This inheritance is visually depicted in portion 105 through dotted lines 110a, 110b, 110c.

Figure 6B:
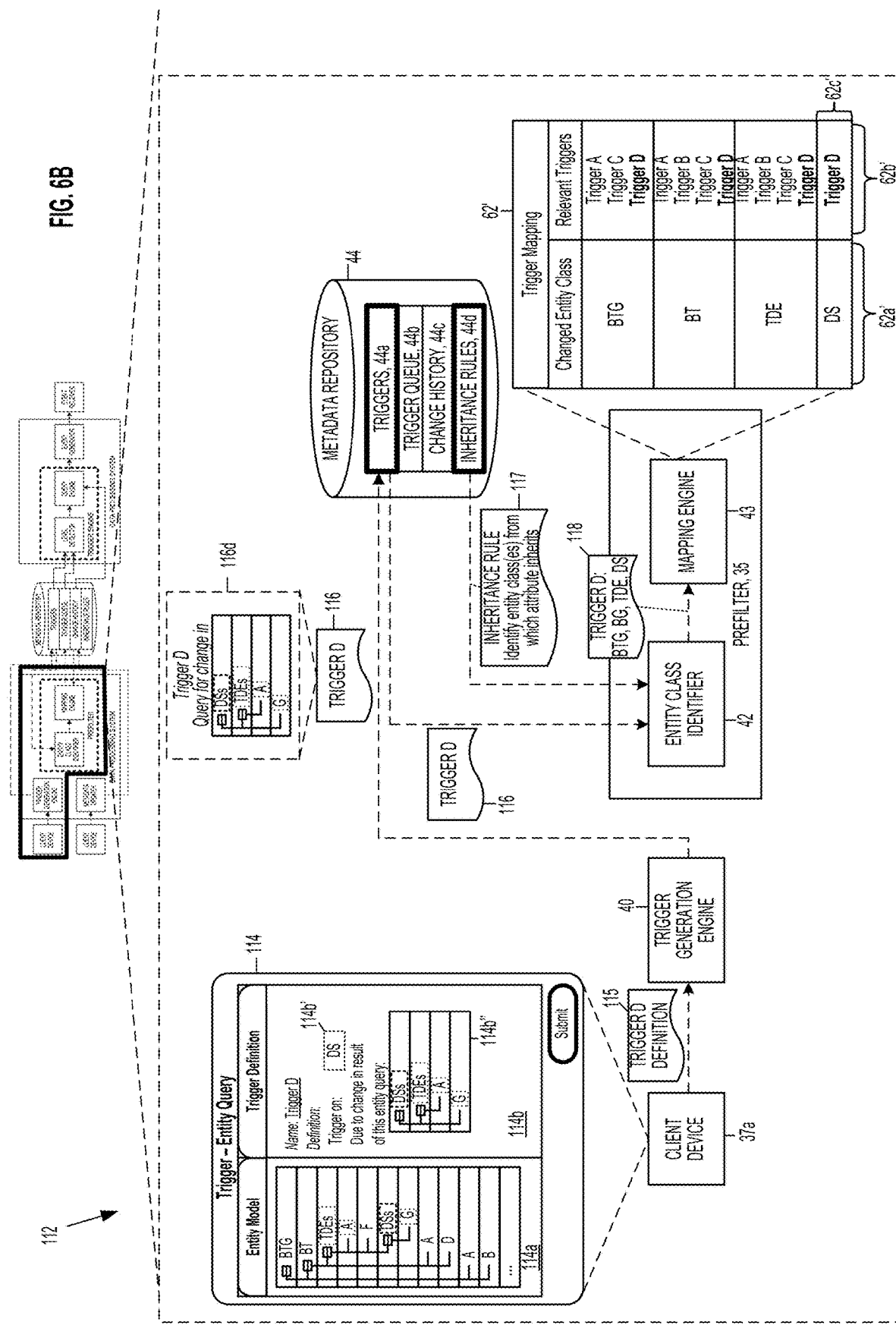

Referring to FIG. 6B, system 112 is shown for updating a trigger mapping when entities inherit attribute values. In this example, client device 37a renders graphical user interface 114 with portions 114a, 114b. In this example, portion 114a provides for selection of an entity class on which to trigger the notification and also for selection of attributes of entity classes to be monitored for changes in one or more of those attribute values. Portion 114b includes control 114b' for input of the name of an entity class for which the trigger is generated. Portion 114b includes visualization 114b" of the attributes of the entity classes that are being monitored for changes. Client device 37a generates trigger D definition 115 in accordance with the inputted selections made through graphical user interface 114. Client device 37a transmits trigger D definition 115 to trigger generation engine 40. Trigger generation engine 40 generates trigger D 116 by formatting and structuring trigger D definition 115, such that it can be stored in triggers portion 44a of metadata repository 44. Trigger generation engine 40 transmits trigger D 116 to triggers portion 44a. Trigger D 116 is a structured and formatted version of trigger D definition 115, such that it is storable in triggers portion 44a. In some examples, trigger D 116 is structured as a query (e.g., an entity query) to the metadata model 104 (e.g., entity model).

Triggers portion 44a transmits trigger D 116 to entity class identifier 42. Additionally, entity class identifier 42 requests and receives inheritance rules 117 from inheritance rules portion 44d (also referred to herein for purposes of convenience as inheritance rules 44d) of metadata repository 44. Inheritance rules portion 44d stores rules specifying or for otherwise identifying which attributes inherit from which other attributes in entity classes. In this example, entity class identifier 42 receives inheritance rules 117 specifying that attribute A of the TDE entity class is inherited from attribute A of the BT entity class, which in turn is inherited from attribute A of the BTG entity class. As such, because trigger D 116 evaluates changes and values of attribute A in the TDE entity class, trigger D 116 will ultimately need to look for changes in values of attribute A in the BTG entity class. Using trigger D 116 and the inheritance rules 117, entity class identifier 42 transmits trigger D entity classes data 118 to mapping engine 43. Trigger D entity classes data 118 specifies the entity classes to be monitored in executing trigger D and accounts for inheritance as previously described. Based on trigger D entity class data 118, mapping engine 43 updates trigger mapping 62', as shown in portions 62a' and 62b'. In particular, trigger mapping 62' includes portion 62c', which specifies that for a change in the DS entity class, the relevant triggers are trigger D. The trigger mapping also specifies that for a change in entity classes BTG, BT, and TDE, a relevant trigger is also trigger D.

Trigger D sends a notification when there is a change to attribute A of the TDE entity class or to attribute G of the DS entity class. Because attribute A is an inherited attributed from attribute A of the BT entity class, which in turn is an inherited attribute of attribute A of the BTG entity class, mapping engine 43 updates trigger mapping 62' to indicate that trigger D is a relevant trigger for the BTG entity class (because a change in attribute A in data associated with the BTG entity class may cause a change in attribute A in data associated with the TDE entity class via the inheritance path from the BTG entity class to the TDE entity class), trigger D is a relevant trigger for the BT entity class (because a change in attribute A in data associated with the BT entity class may cause a change in attribute A in data associated with the TDE entity class via the inheritance path from the BTG entity class to the TDE entity class), and also that trigger D is relevant to the TDE and DS entity classes—as specified in the trigger D definition itself. An inherited attribute includes an attribute of data that inherits its value from another attribute of data, generally in a parent class in a hierarchy of classes. Generally, an inheritance path is data—such as a pointer or other reference—that specifies that a value of one attribute is set to be the same as or correspond to the value of another attribute.

Figure 6C:
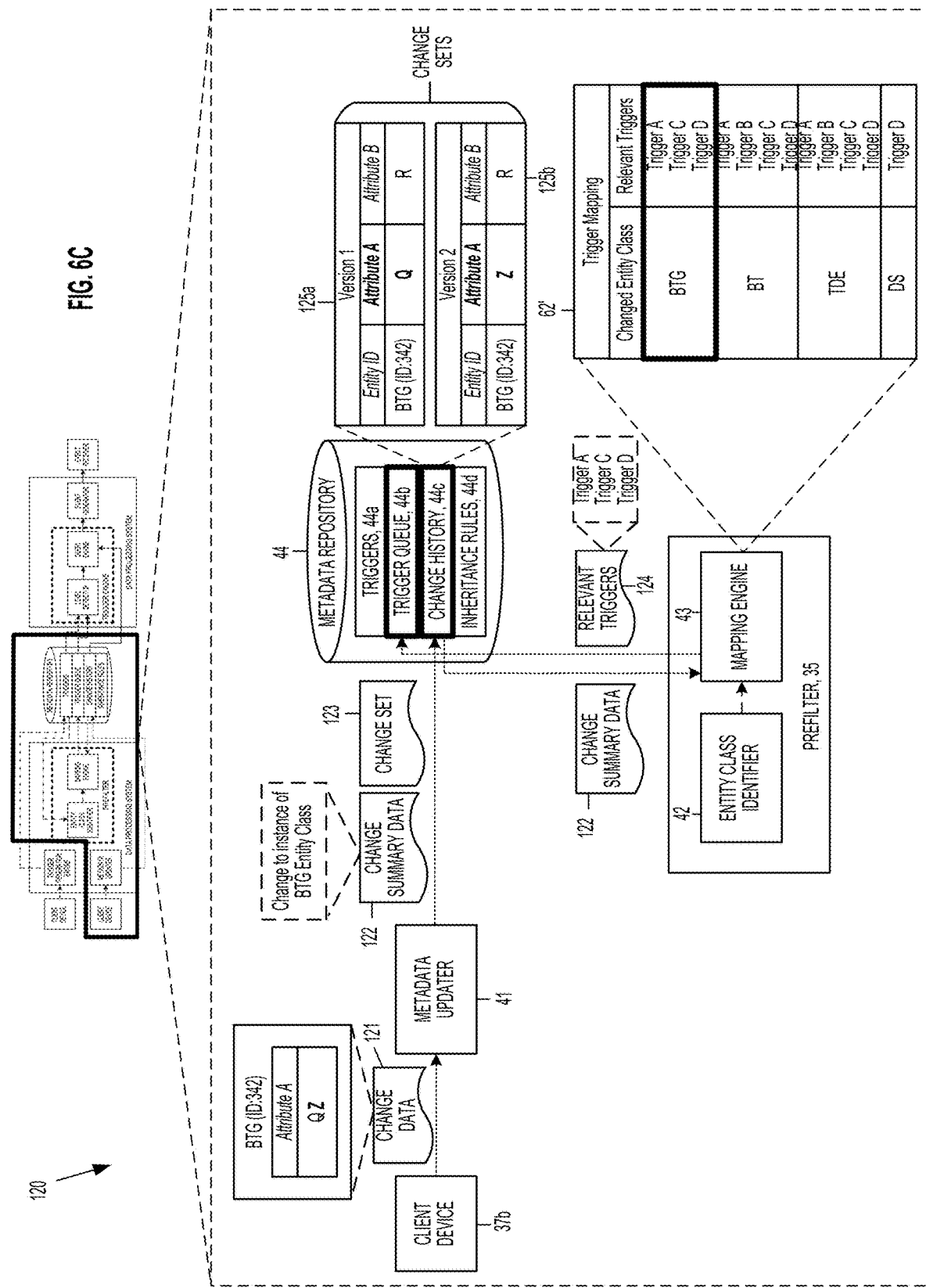

Referring to FIG. 6C, system 120 is shown for identifying which triggers to execute upon a change in a value of attribute A for data associated with the BTG entity class. In this example, client device 37b sends change data 121 to metadata updater 41. Change data 121 specifies a change to a value of attribute A of data associated with the BTG entity class (e.g., a particular instance of the BTG entity class). In turn, metadata updater 41 generates change summary data 122 and change set 123. Change summary data 122 specifies that a change has been made to data that is associated with the BTG entity class. Change set 123 includes contents of change data 121 that has been formatted in accordance with requirements of metadata repository 44. Change set 123 is stored in change history portion 44c of metadata repository 44. Contents of change set 123 are shown as change set 125b. Change history portion 44c also includes change set 125a, which specifies the value for attribute A for data (e.g., an entity) identified by ID 342 and associated with the BTG entity class when the value for attribute A was originally specified. Mapping engine 43 retrieves change summary data 122 from change history portion 44c. Based on change summary data 122, mapping engine 43 identifies in trigger mapping 62' that for a change in entity class BTG that the relevant triggers are triggers A, C and D. Mapping engine 43 transmits to trigger queue 44b relevant triggers data 124. Relevant triggers data 124 specifies that, when the trigger engine next executes triggers, the relevant triggers to be executed are triggers A, C and D.

Referring to FIG. 6D, system 126 is shown for instructing query engine 47 to query for changes in data associated with various levels of the entity classes as specified in trigger D. Level detector 46 retrieves from trigger queue 44b next trigger data 127, which specifies that the next trigger to be executed is trigger D. Accordingly, level detector 46 retrieves from triggers portion 44a trigger D 116, a visual representation of which is shown in visualization 116a. Using trigger D 116, level detector 46 transmits to query engine 47 both trigger D 116 and level data 128 specifying that the first level for which query engine 47 should generate queries for is the DS entity class.

Figure 6E:
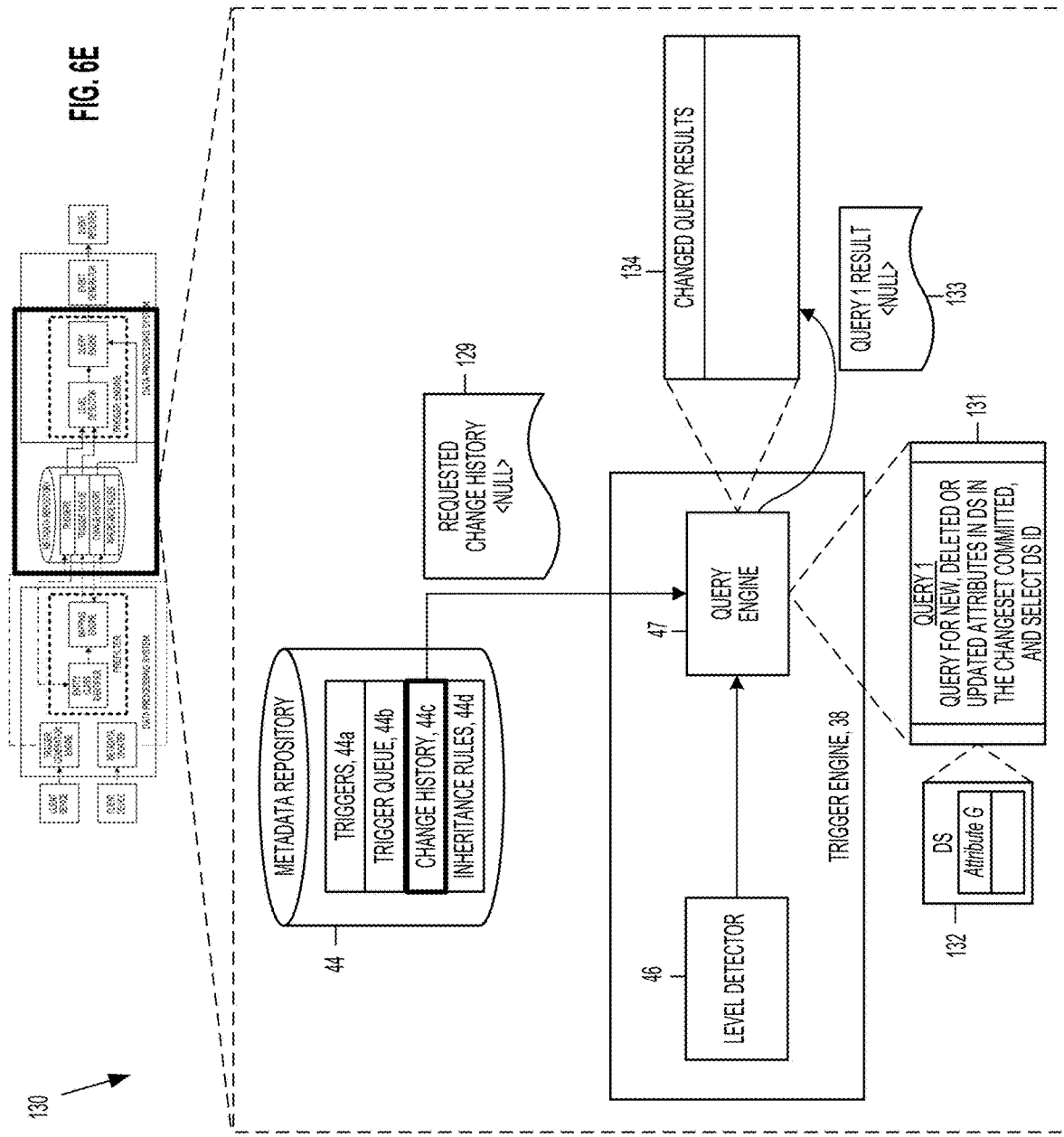

Referring to FIG. 6E, system 130 illustrates generation of queries for the DS entity class. Query engine 47 generates query 1 for trigger D 116. Contents of query 1 are shown as query 131. A visualization of query 131 is shown in portion 132. As shown in portion 132, query engine 47 queries for change sets related to attribute G of the DS entity class. Query engine 47 transmits query 131 to change history portion 44c to request copies of change sets pertaining to the DS entity class. Because change history portion 44c does not have any such requested change sets, change history portion 44c transmits requested change history data 129 with a value of <Null> to query engine 47. Based on not receiving any change histories or change sets, query engine 47 determines that the result of the query is null and transmits query 1 result 133 to changed query results table 134.

Figure 6F:
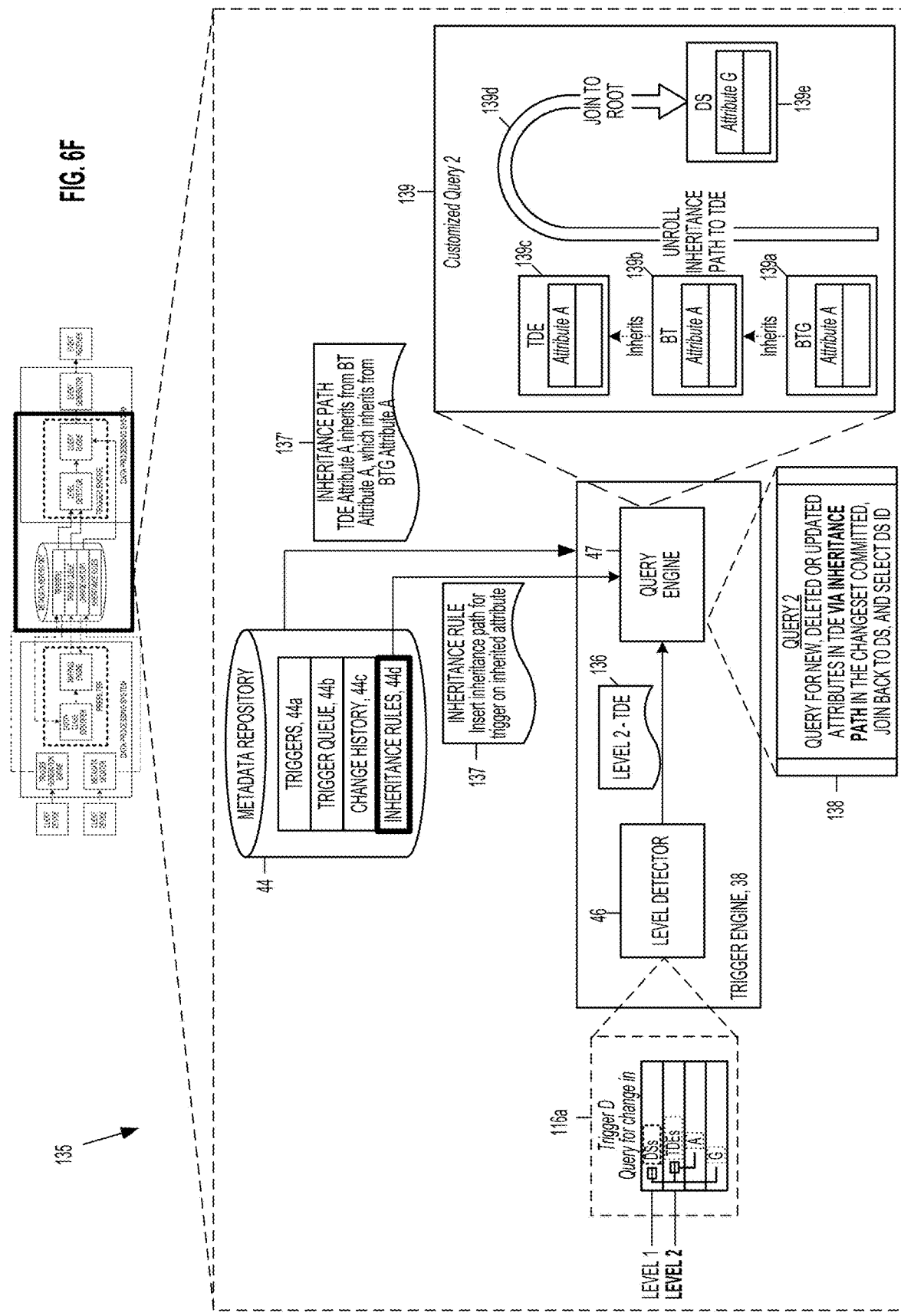

Referring to FIG. 6F, system 135 is shown for executing a query that detects changes in results of change sets for the second level in the trigger—the TDE entity class. Since level detector 46 has already notified query engine 47 to generate and execute queries for level 1 and trigger D, level detector 46 next notifies query engine 47 to generate queries for level 2 and trigger D. To do so, level detector 46 transmits level 2 data 136 to query engine 47. Level 2 data 136 instructs query engine 47 to generate a query for level 2 in trigger D, with level 2 being queries for the TDE entity class. In this example, query engine 47 queries inheritance rules 44d to identify whether there are any inheritance rules that query engine 47 needs to be aware of in generating this query. In response, query engine 47 receives inheritance rules 137 specifying to insert into the query an appropriate inheritance path when the trigger evaluates inherited attributes. Next, to determine whether any of the attributes, namely, attribute A in the TDE entity class are inherited attributes, metadata repository 44 transmits to query engine 47 inheritance path data 137'. Inheritance path data 137' specifies that attribute A of the TDE entity class inherits from attribute A of the BT entity class which, in turn, inherits from attribute A of the BTG entity class. Query engine 47 accesses template 138 for query 2. Template 138 specifies to query for new, deleted, or updated attributes in the TDE entity class via an inheritance path in the change set committed and to then join back to the DS entity class and select the DS ID. Template 138 is a template because the actual contents of the query itself will vary based on whether any of the attributes being queried are inherited attributes. In this case, attribute A is an inherited attribute as specified by inheritance path data 137'. Using template 138 and inheritance path data 137', query engine 47 generates customized query 2 139. Customized query 2 139 specifies that in order to determine if there's a change in the value for attribute A in an instance of the TDE entity class, that the metadata model needs to be traversed to determine if there is a change in attribute A for an instance of the BT entity class and, in turn, if there is a change in attribute A for an instance of the BTG entity class, as visually depicted by portions 139a, 139b, 139c. When there is a change in attribute A for an instance of the TDE entity class then, because trigger D is being generated for the DS entity class, query engine 47 then needs to join 139d back to a relevant instance of the DS entity class 139e to determine the ID for that instance of the DS entity class.

Referring to FIG. 6G, system 140 is shown, in which query engine 47 executes customized query 2 139 to identify relevant changes in change sets 125a, 125b. Query engine 47 receives change sets 125a, 125b for the BTG entity class because, as shown in customized query 139 (FIG. 4F), query engine 47 queries for change sets related to attribute A for the BTG entity class because that is the entity class from which attribute A of the TDE entity class inherits. Based on change sets 125a, 125b, query engine 47 determines that there is a change in the results of customized query 139 for attribute A. As such, query engine 47 transmits back to metadata repository 44 instructions to join to the root node (also referred to herein as "root") to determine the relevant ID of the instance of the DS entity class related to the instance of the TDE entity class for which the change in attribute A is detected. Generally, a root node is an entity or an entity class for which the notification is being generated. When a root node is an entity class, the data processing system identifies an instance of that root node entity class (also referred to as an entity instance or an entity) for which the notification is generated, as described herein.

Based on instructions to join to the root node to determine the relevant ID of the instance of the DS entity class, query engine 47 receives ID 443 and ID 447 signifying the root nodes for which the changes in instances of the TDE entity class have been detected. From this, query engine 47 generates query 2 result 142 and updates change results table 134 in accordance with query result 142, as shown in portion 143 of change query results table 134. In the foregoing example, query engine 47 joins back to a root node, which in this case is an instance of the DS entity class by accessing the metadata model stored in metadata repository 44 and traversing nodes in the metadata model from a node at which a change in a query result is detected—which in this example is an instance of the BTG entity class, and traverses down the metadata model until reaching a node that is the root node—a node for which the notification is to be generated. Once reaching that root node, metadata repository 44 selects the ID of that root node and transmits the ID to query engine 47.

Figure 7A:
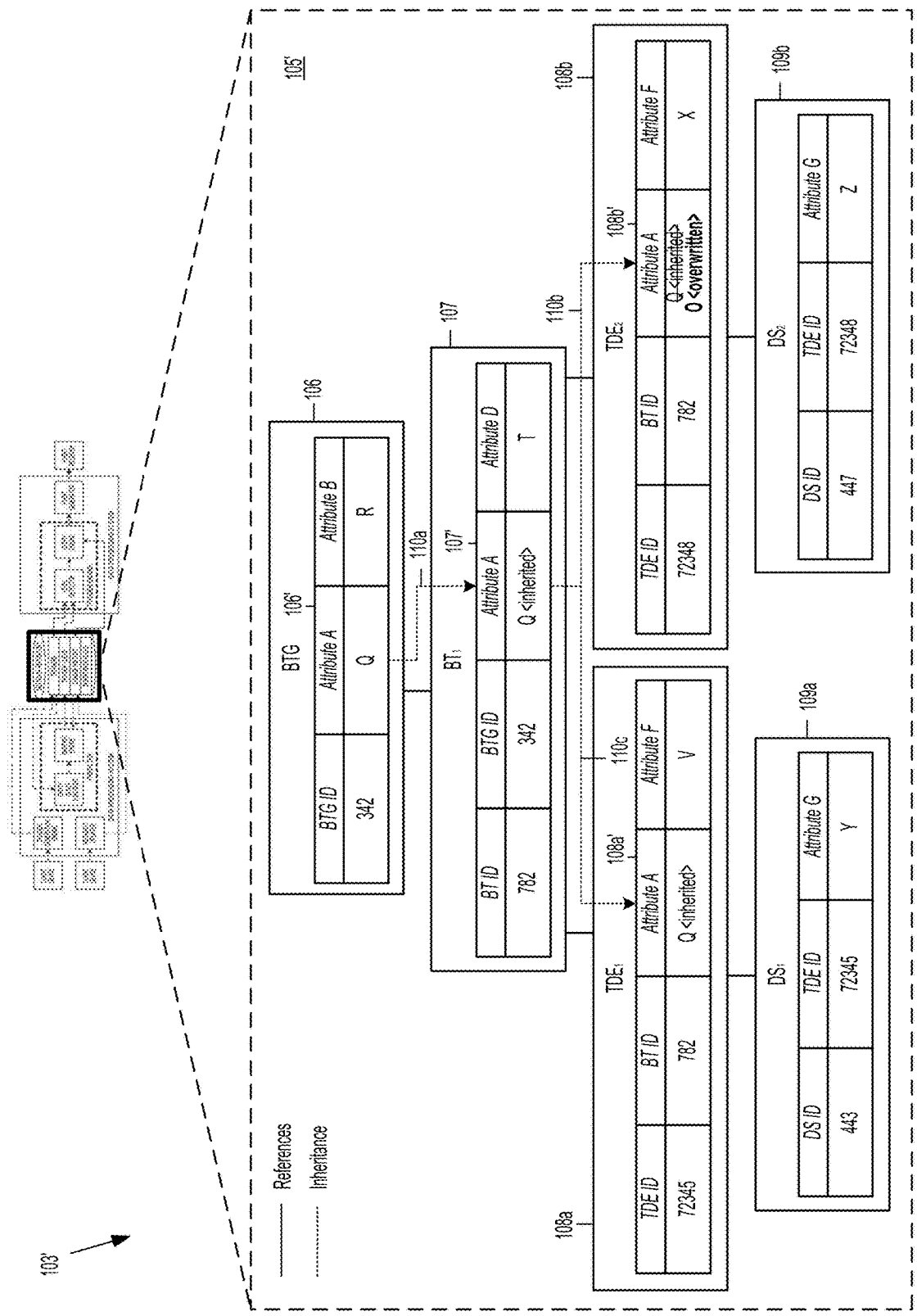

Referring to FIG. 7A, system 103' is shown, which is a variation of system 103 in FIG. 6A. System 103' shows an example of a metadata model 105', in which inherited attributes are overwritten. In this example, attribute 108a' and attribute 108b' inherit their values from attribute 107' in the BT entity class. Attribute 107', in turn, inherits its value from attribute 106' in the BTG entity class. In this example, attribute 108b' is an overwritten attribute, also referred to in this example as an overwritten inherited attribute, meaning that attribute A in this instance of the TDE entity class inherits its value from attribute A in the BT entity class, but also that the inherited value can be overwritten, for example, by receiving input specifying a value for attribute A in the TDE entity class.

Figure 7B:
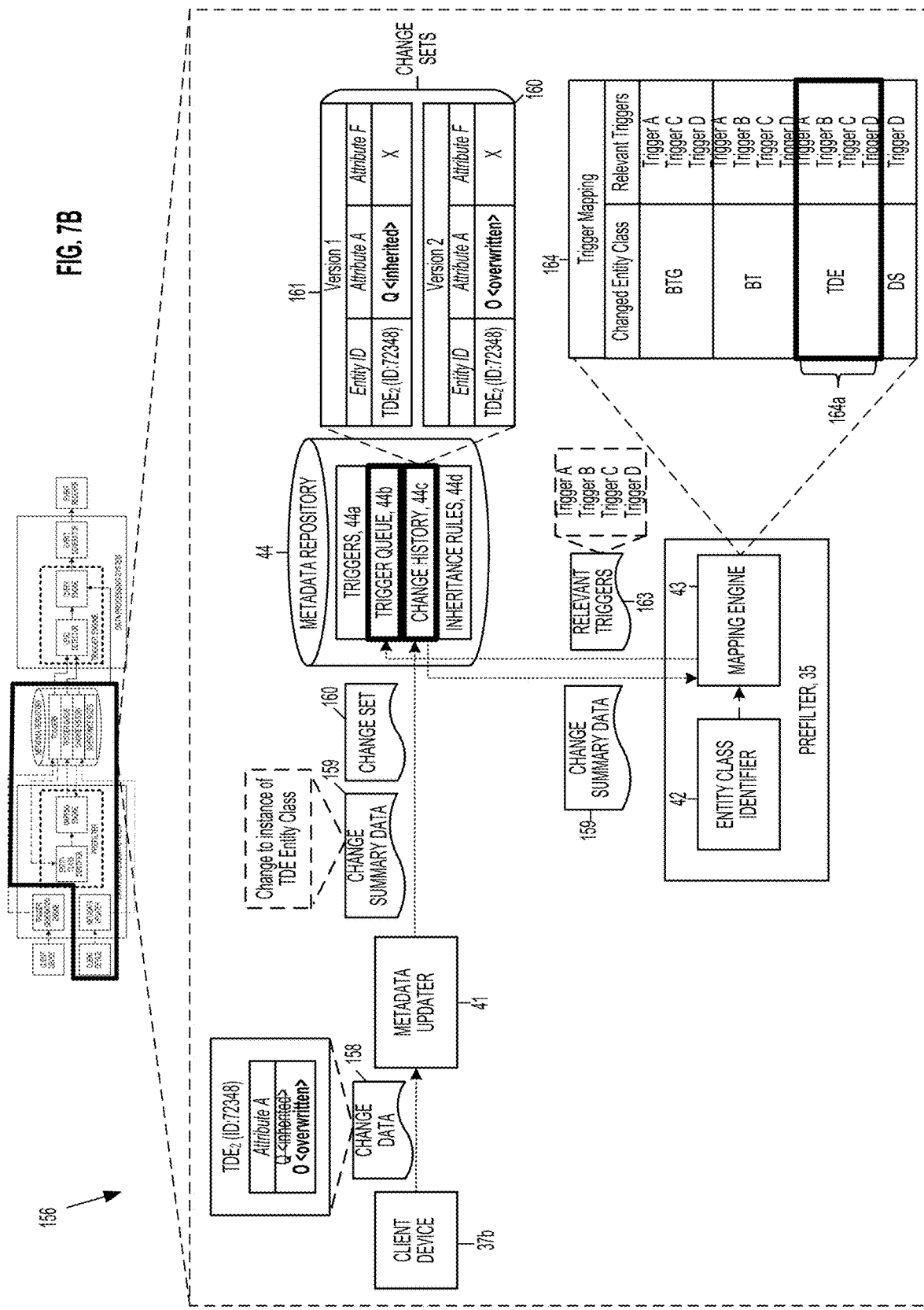

Referring to FIG. 7B, system 156 illustrates prefiltering functionality to identify relevant queries to execute upon a change to an instance of the TDE entity class. In this example, client device 37*b* receives change data 158 that specifies that a value of attribute A in an instance of the TDE entity class is overwritten to have a value of "O." Change data 158 is transmitted from client device 37*b* to metadata updater 41. Using change data 158, metadata updater 41 generates change summary data 159 and change set 160. Change summary data 159 specifies that there has been a change to an instance of the TDE entity class. Change set 160 specifies the value for attribute A of the instance of the TDE entity class associated with ID: 72348 after it is overwritten. Metadata updater 41 transmits change summary data 159 and change set 160 to change history portion 44*c*. Mapping engine 43 retrieves change summary data 159 from change history portion 44*c*. Using change summary data 159, mapping engine 43 identifies in trigger mapping 164 that triggers A, B, C, D are relevant to a change in the TDE entity class as specified in portion 164*a* of trigger mapping 164. In this example, change history portion 44*c* also stores change set 161, which specifies the value of attribute A in a prior version, for example, when the particular instance of the TDE entity class was originally generated. In this example, the value of attribute A when it was originally generated, or as otherwise specified in Version 1, was a value of "Q," which was the inherited value from the BT entity class.

Referring to FIG. 7C, system 126' is shown. System 126' is a version of system 126 that was described previously with regard to FIG. 6D. In an example, system 126' is the same as system 126. System 126' shows retrieval of trigger D within the context of this FIG. 6 series pertaining to overwritten inherited attributes. The reference numbers in FIG. 7C are as described previously with regard to FIG. 6D.

Referring to FIG. 7D, system 130' is shown for accessing and executing a first level query. System 130' shown is a version of system 130 in FIG. 6E. In an example, system 130' is the same as system 130. The reference numbers shown in FIG. 7D are described with regard to FIG. 6E.

Figure 7E:
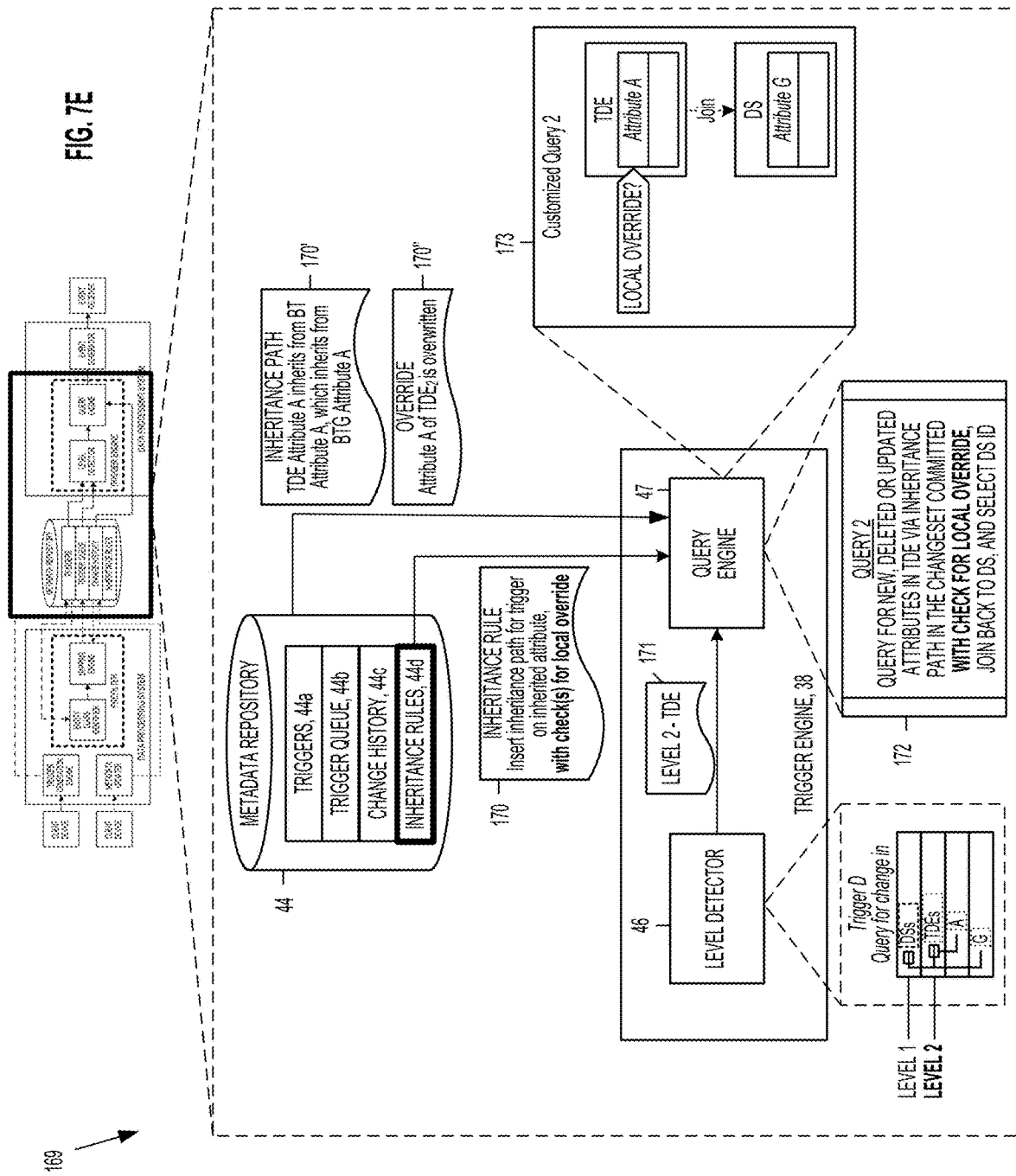

Referring to FIG. 7E, system 169 is shown for executing a second level query as part of the execution of trigger D. Level detector 46 transmits level 2 data 171 to query engine 47. Level 2 data 171 instructs query engine 47 to access a query that determines changes in query results for level 2 entity classes, which in this example is the TDE entity class. In this example, query engine 47 queries inheritance rules 44*d* to identify whether there are any inheritance rules that query engine 47 needs to be aware of in generating this query. In response, query engine 47 receives inheritance rule 170 specifying to insert into the query an appropriate inheritance path when the trigger evaluates inherited attributes, and to also check for local overrides. Next, to determine whether any of the attributes, namely, attribute A in the TDE entity class are inherited attributes and/or overwritten attributes, metadata repository 44 transmits to query engine 47 inheritance path data 170' and override data 170". Inheritance path data 170' specifies that attribute A of the TDE entity class inherits from attribute A of the BT entity class which, in turn, inherits from attribute A of the BTG entity class. Override data 170" specifies that attribute A is an overwritten attribute in the instance of the TDE entity class represented as TDE$_2$. Based on the level 2 data 171, the inheritance path data 170', and override data 170", query engine 47 accesses query template 172, which specifies to query for new, deleted, or updated attributes in the TDE entity class (and/or in instances of the TDE entity class) via an inheritance path in the change set committed with checks for local overrides and to ultimately join back to an appropriate instance of the DS entity class and to select the DS ID of that instance of the DS entity class. Because attribute A is an overwritten attribute for TDE$_2$, customized query 173 can simply look at the value of attribute A for TDE$_2$ itself without regard to the inheritance path, because query engine 47 has already identified that TDE$_2$ is overwritten. Customized query 173 queries for changes in attribute A of TDE$_2$, and if there is a result in a change, then joins back to the DS entity class, as visually shown in customized query 173.

In this example shown in FIG. 7E, customized query 173 is generated with regard to TDE$_2$ in the TDE entity class. This is because attribute A for TDE$_2$ is the only attribute that is overwritten. Therefore, this customized query 173 differs from customized query 139 as shown in FIG. 6F. Customized query 173 is a version of customized query 139 (FIG. 6F), in which the portions of the query pertaining to the BT entity class and the BTG entity class have been removed based on metadata specifying that attribute A is overwritten for TDE$_2$. Because attribute A is overwritten for TDE$_2$, the query that is executed for TDE$_2$ only needs to look at TDE$_2$ and not at the BT entity class and the BTG entity class. However, other TDEs have inherited, not overwritten, values. As such, query engine 47 also executes customized query 139 for the instances of the TDE entity class without the overwritten values.

Figure 7F:
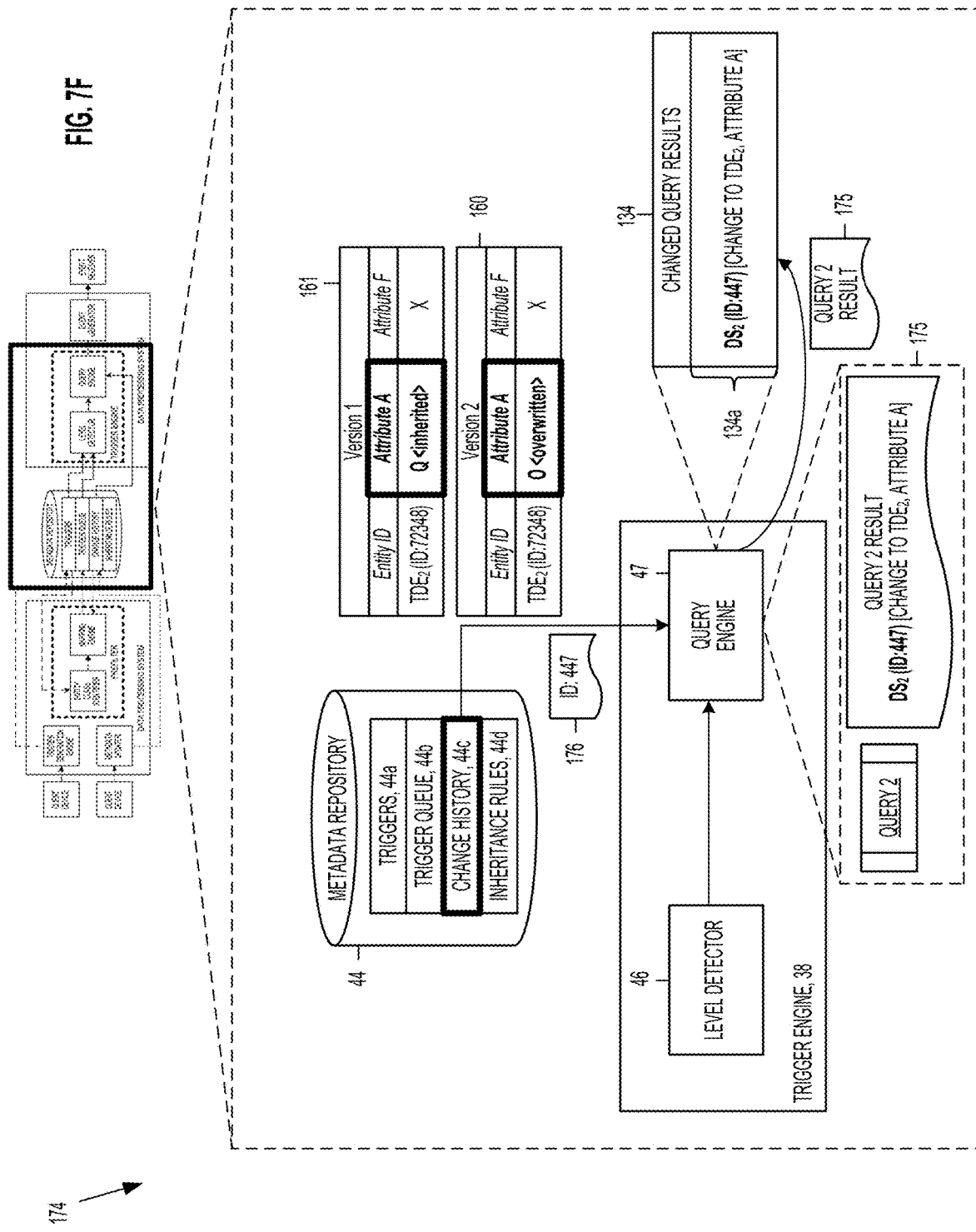

Referring to FIG. 7F, system 174 is shown for executing customized query 173. Based on execution of customized query 173, query engine 47 retrieves change sets 160, 161 from change history portion 44*c*. Based on change sets 160, 161, query engine 47 identifies a change in the result of customized query 173. Namely, the value of attribute A has changed from originally being valued "Q" to now being valued "O". Based on the changed results, query engine 47 instructs metadata repository 44 to traverse the metadata model and to join from the instance of the TDE entity class associated with ID 72348 to the related instance of the DS entity class to select and transmit back to query engine 47 the ID of the related instance of the DS entity class. After performing the traversal, metadata repository 44 transmits join data 176 to query engine 47. Join data 176 includes the ID for the instance of the DS entity class related to the instance of the TDE entity class associated with ID 72348. Using join data 176 and change sets 160, 161, query engine 47 generates result data 175 specifying that there is a change in attribute A for TDE$_2$ and to notify of this change for the instance of the DS entity class represented by ID 447. Query engine 47 updates changed query results table 134 in accordance with results data 175, as shown in portion 134*a* of changed query results table 134. Based on the detected change in the query results, as specified by results data 175, query engine 47 may generate and transmit a notification, for example, to a subscriber or to a third-party device or system informing them of the change.

Figure 8A:
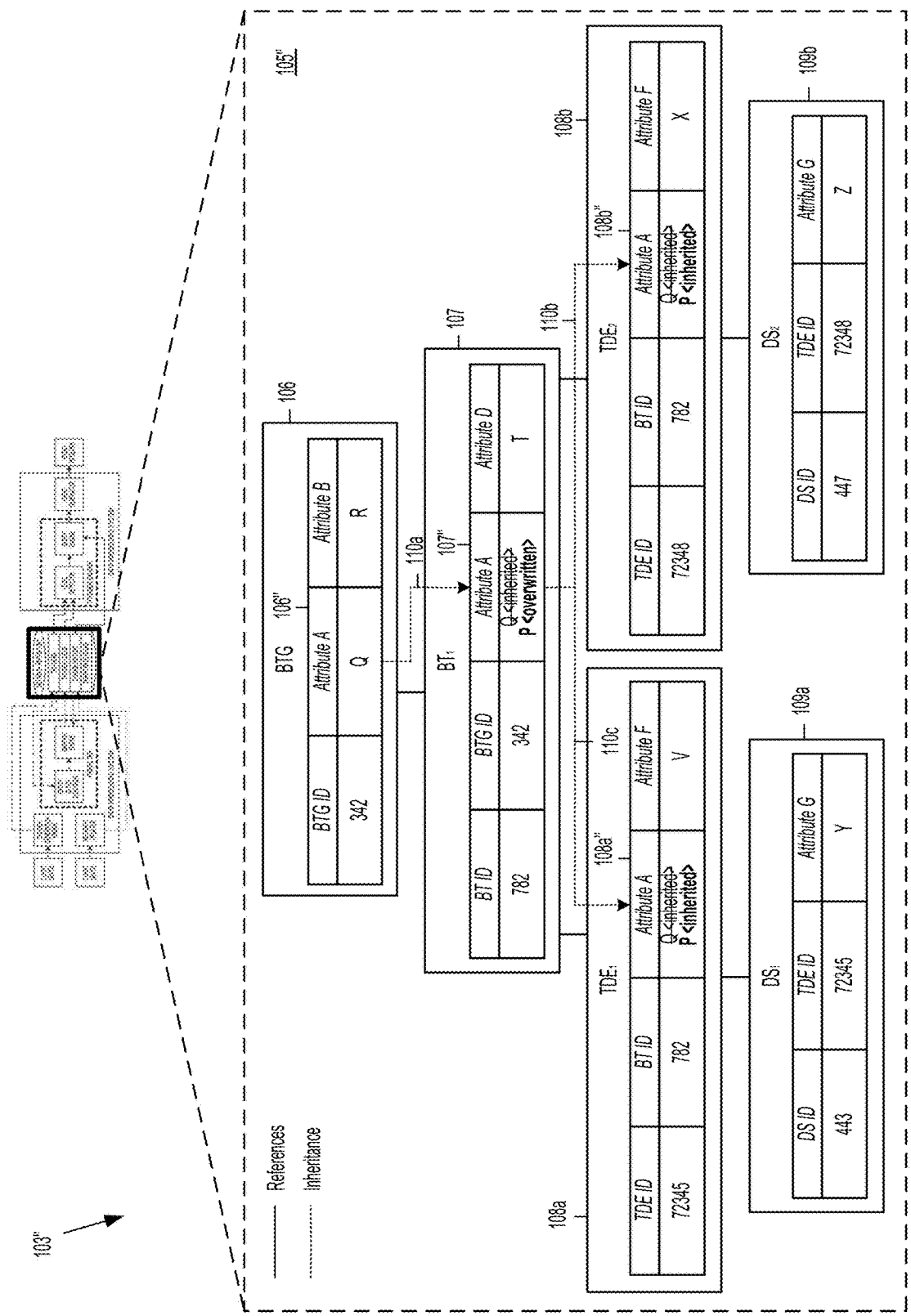
FIGS. 8A-8F each illustrates a system for generating and executing triggers with inheritance and cascading override.

Referring to FIG. 8A, system 103" is shown as an example of cascading overrides. Generally, a cascading override is when an inherited value is overwritten for one entity class and that overwritten value is then inherited by other entity classes. System 103" is a version of system 103 in FIG. 6A. Reference numbers in the figure that corresponds to reference numbers in FIG. 6A are described with regard to FIG. 6A. System 103" includes metadata model 105", in which attribute 107" is an overwritten inherited attribute. The overriding of this attribute 107" cascades downwards to attribute A at the TDE entity class, as specified by attributes 108a" and 108b". Attributes 108a" and 108b" are examples of cascading overrides because the value of attribute A in these TDE entity classes is still inherited from the BT entity class for which the attribute value is overwritten.

Figure 8B:
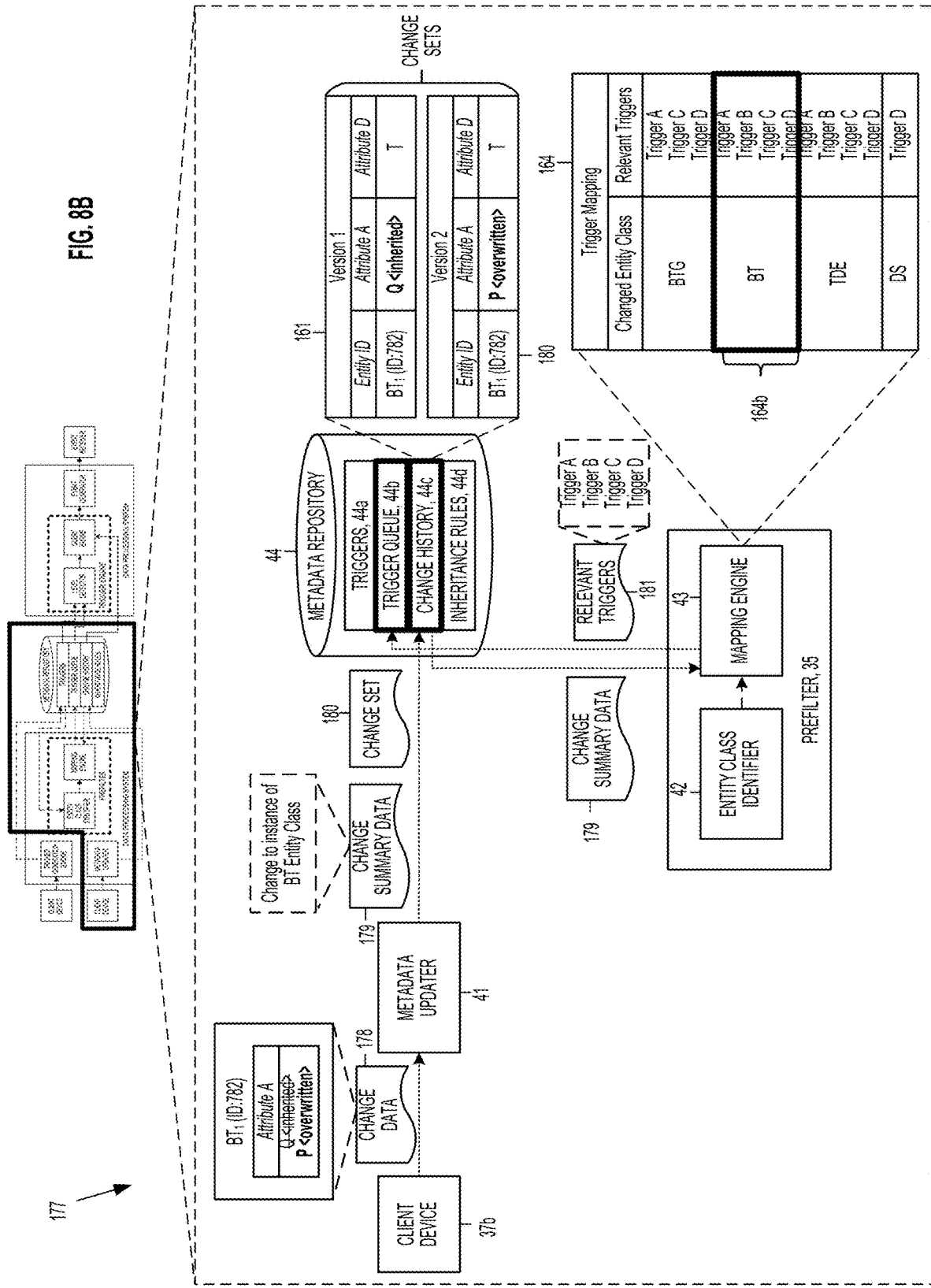

Referring to FIG. 8B, system 177 is shown for identifying triggers to execute in a cascading overrides scenario. In this example, client device 37b transmits change data 178 to metadata updater 41. Metadata updater 41 generates change summary data 179 and change set 180. Metadata updater 41 transmits change summary data 179 and change set 180 to change history portion 44c. Mapping engine 43 retrieves change summary data 179 and, based on parsing contents of change summary data 179, identifies in trigger mapping 164 that triggers A, B, C, and D are relevant triggers for execution, given the change in attribute A for the BT entity class, as specified in portion 164b of trigger mapping 164. Mapping engine 43 transmits relevant triggers data 181 to trigger queue 44b.

Figure 8C:
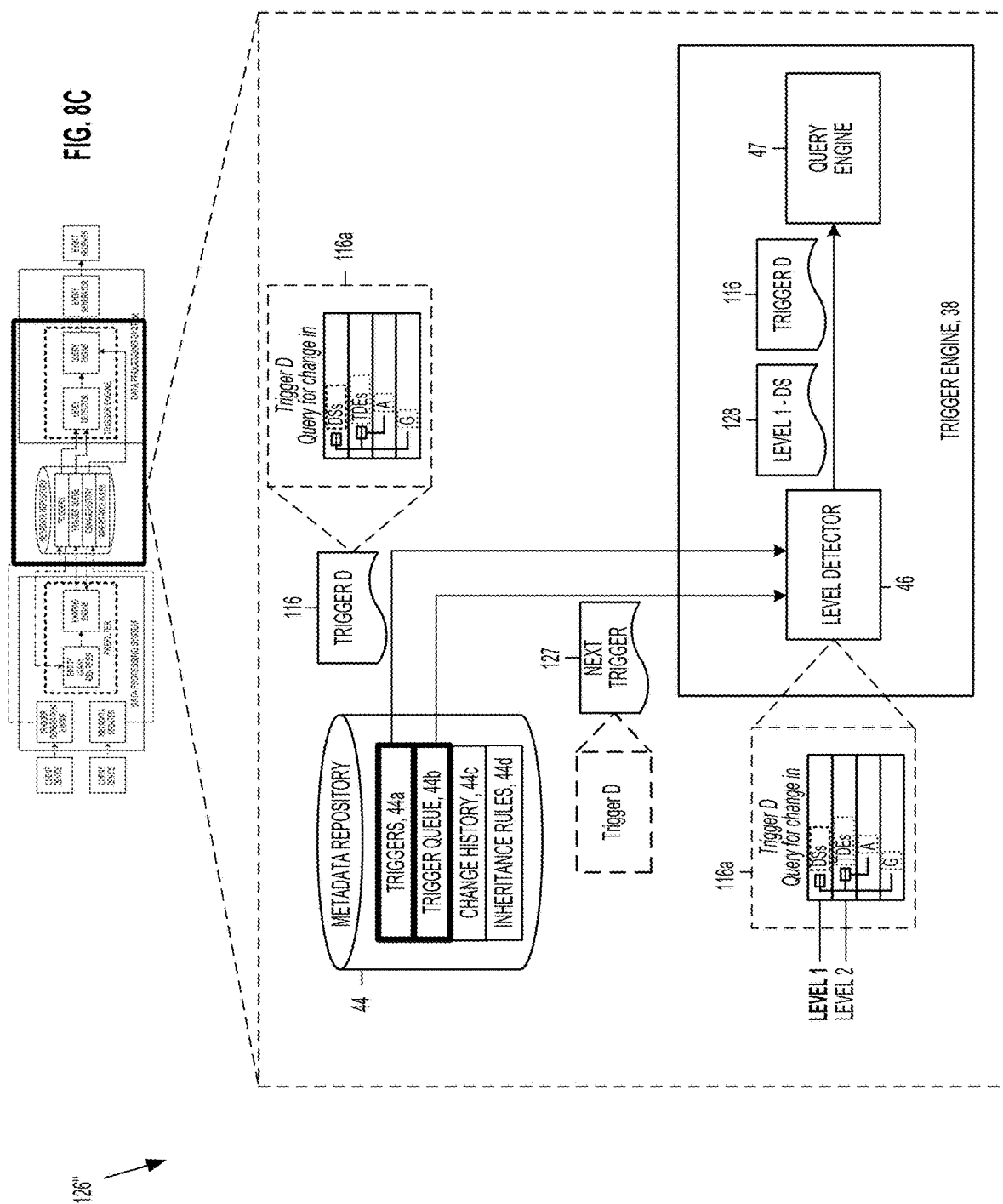

Referring to FIG. 8C, system 126" is shown. System 126" is a version of system 126 in FIG. 6D. System 126" is a version of system 126 for retrieval of trigger D in a cascading override environment. Reference numbers shown in FIG. 8C are described with regard to FIG. 6D.

Figure 8D:
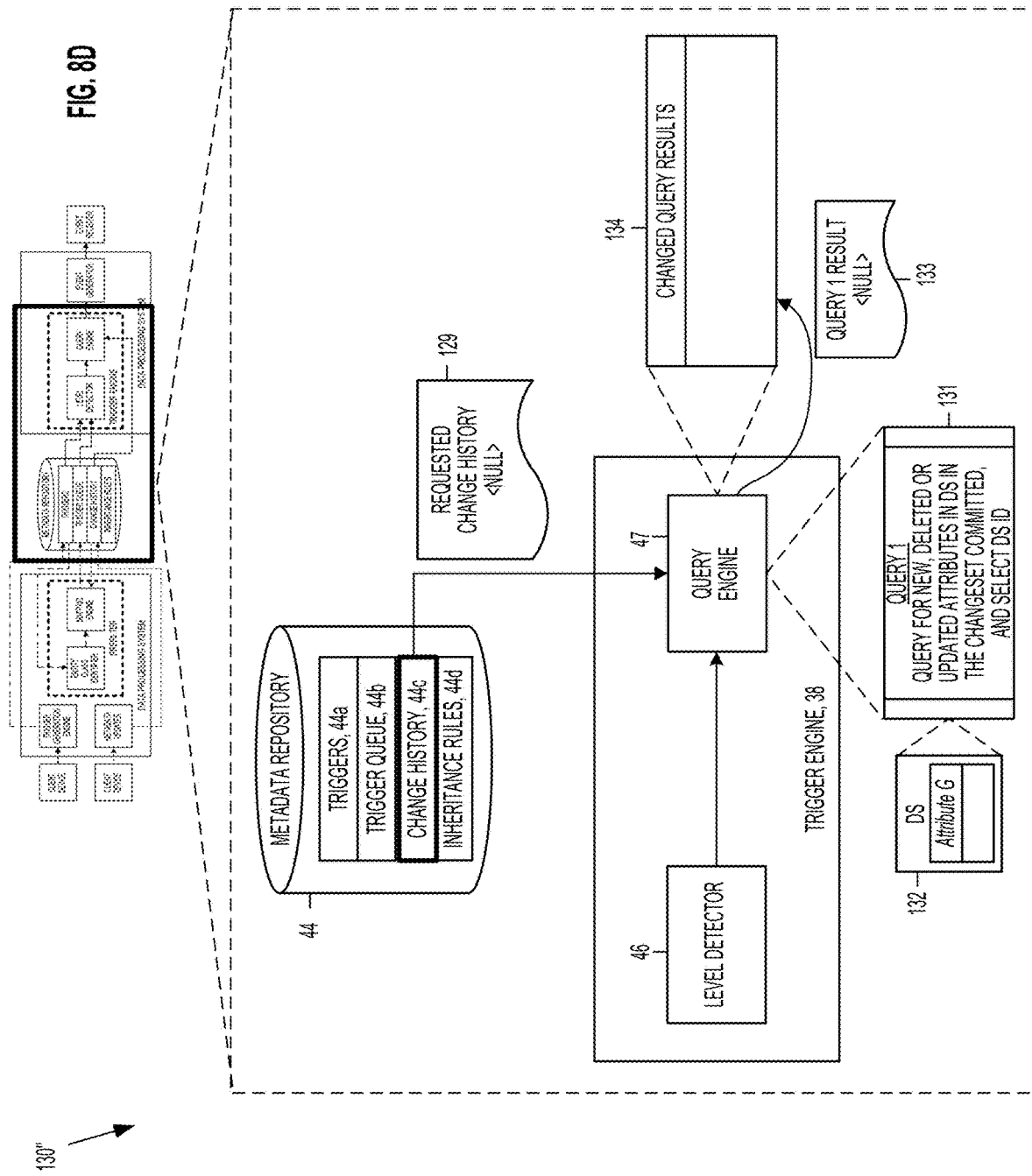

Referring to FIG. 8D, system 130" is shown. System 130" is a version of system 130 described in FIG. 6E. System 130" is an example of executing a first level query in a cascading override environment. The reference numbers shown here in FIG. 8D are described with regard to FIG. 6E.

Figure 8E:
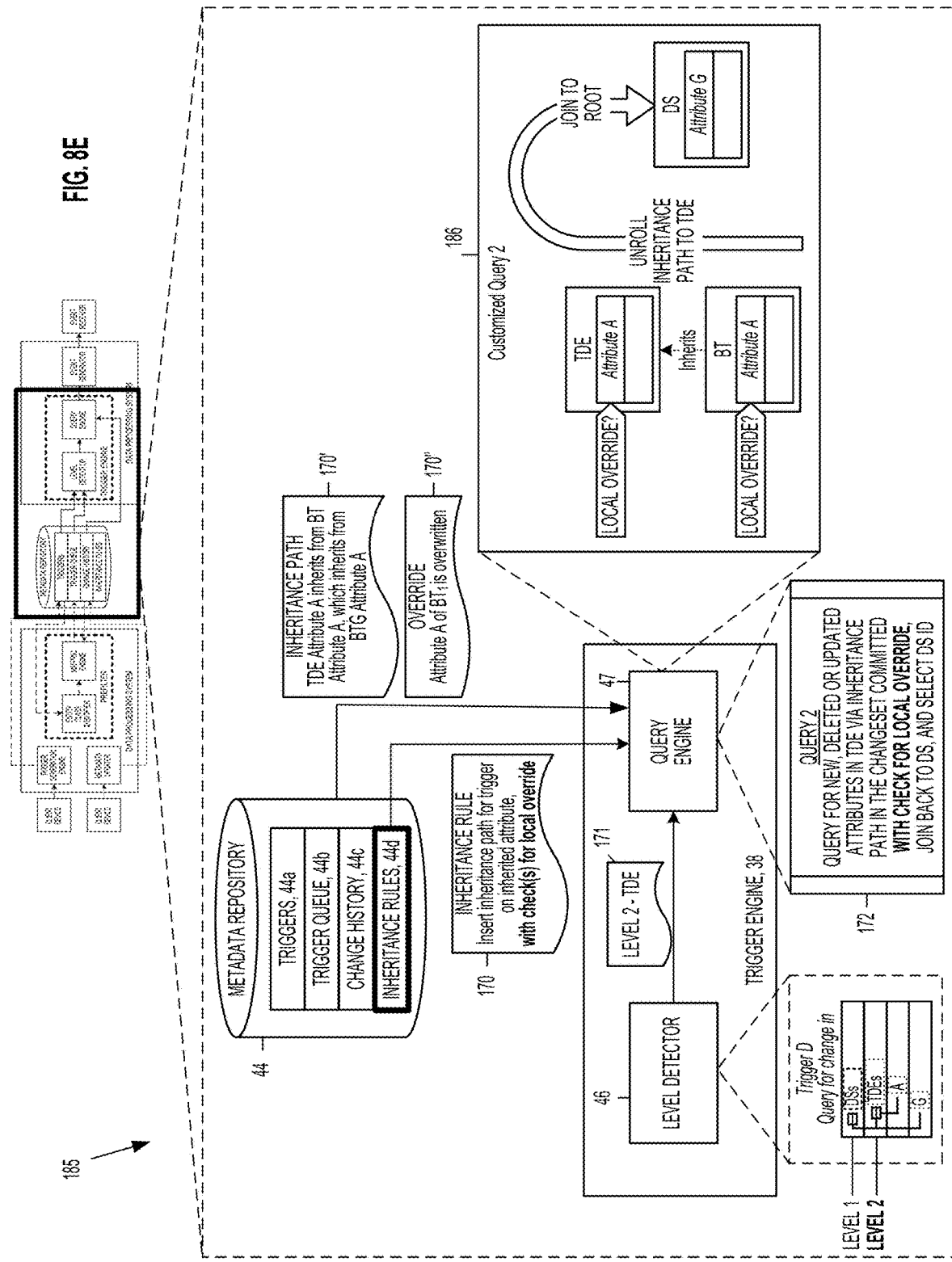

Referring to FIG. 8E, system 185 is shown for accessing a query in a cascading override environment. Level detector 46 transmits level 2 data 171 to query engine 47. Level 2 data 171 specifies that query engine 47 should access a query for the second level entity class in trigger D. In this example, the second level entity class is the TDE entity class. Query engine 47 also queries inheritance rules 44d to identify whether there are any inheritance rules that query engine 47 needs to be aware of in generating this query. In response, query engine 47 receives inheritance rule 170 specifying to insert into the query an appropriate inheritance path when the trigger evaluates inherited attributes, and to also check for local overrides. Next, to determine whether any of the attributes, namely, attribute A in the TDE entity class are inherited attributes and/or overwritten attributes, metadata repository 44 transmits to query engine 47 inheritance path data 170' and override data 170". Inheritance path data 170' specifies that attribute A of the TDE entity class inherits from attribute A of the BT entity class which, in turn, inherits from attribute A of the BTG entity class. Override data 170" specifies that attribute A is an overwritten attribute in the instance of the BT entity class represented as $BT_1$. Based on the level 2 data 171, the inheritance path data 170', and override data 170", query engine 47 accesses query template 172, which specifies to query for new, deleted, or updated attributes in the TDE entity class (and/or in instances of the TDE entity class) via an inheritance path in the change set committed with checks for local overrides and to ultimately join back to an appropriate instance of the DS entity class and to select the DS ID of that instance of the DS entity class. In this example, because override data 170" specifies that attribute A of $BT_1$ is overwritten, query engine 47 identifies that the query should start at the BT entity class level, rather than at the BTG entity class level. This is because even though attribute A of $BT_1$ is an inherited attribute from the BTG entity class, the actual value for attribute A has been overwritten, and therefore the query does not need to look at the inheritance and look up to the BTG entity class. As shown by customized query 186, query engine 47 checks for local overrides at both the BT entity class and the TDE entity class. And if a change is found at the TDE entity class, query engine 47 then instructs metadata repository 44 to join from the TDE entity class back to the root, which in this case is the DS entity class. By joining back to the root, query engine 47 properly identifies the ID for the instance of the DS entity class for which the notification is being generated, even though the change is with regard to an instance of the TDE entity class.

Figure 8F:
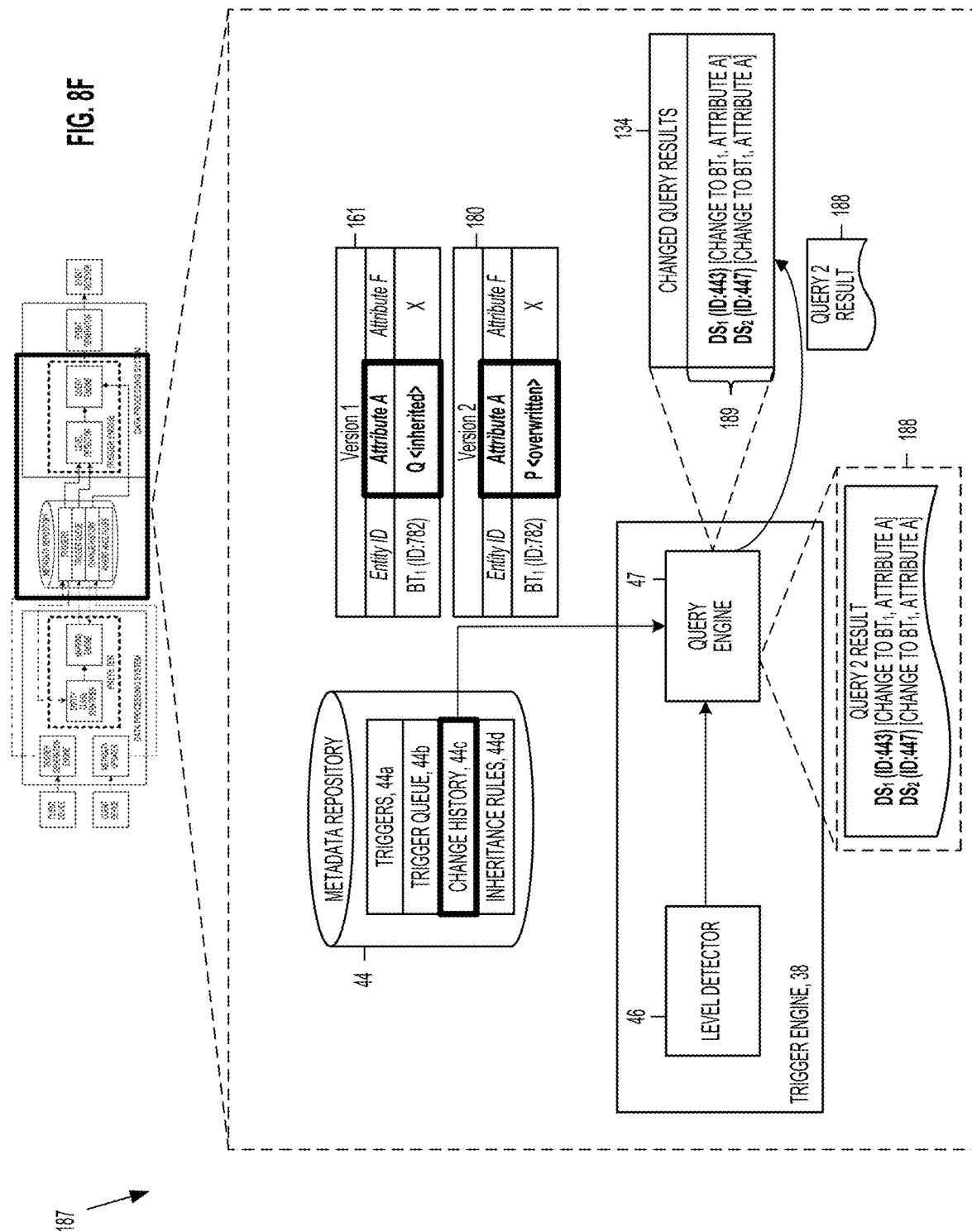

Referring to FIG. 8F, system 187 is shown for detecting a change in attribute values through cascading overrides. In this example, based on execution of customized query 186, query engine 47 receives change sets 161, 180. By analyzing contents of change sets 161, 180, query engine 47 identifies a change in query results for customized query 186. Based on the identified change in the query results, query engine 47 instructs metadata repository 44 to traverse the metadata model from the BT entity class down to the DS entity class to retrieve an entity ID for the DS entity that is related to the BT entity for which the change has occurred. The metadata repository 44 then transmits this ID information back to the query engine 47 to enable query engine 47 to generate query result 188. In this example, because attribute A in the BT entity class is a cascading override, the value of attribute A in the TDE entity classes also changes. As such, the result of the join specifies that the changes are related to $DS_1$, $DS_2$. Query engine 47 updates changed query results table 134 in accordance with query result 188, as shown in portion 189 of changed query results table 134.

Figure 9A:
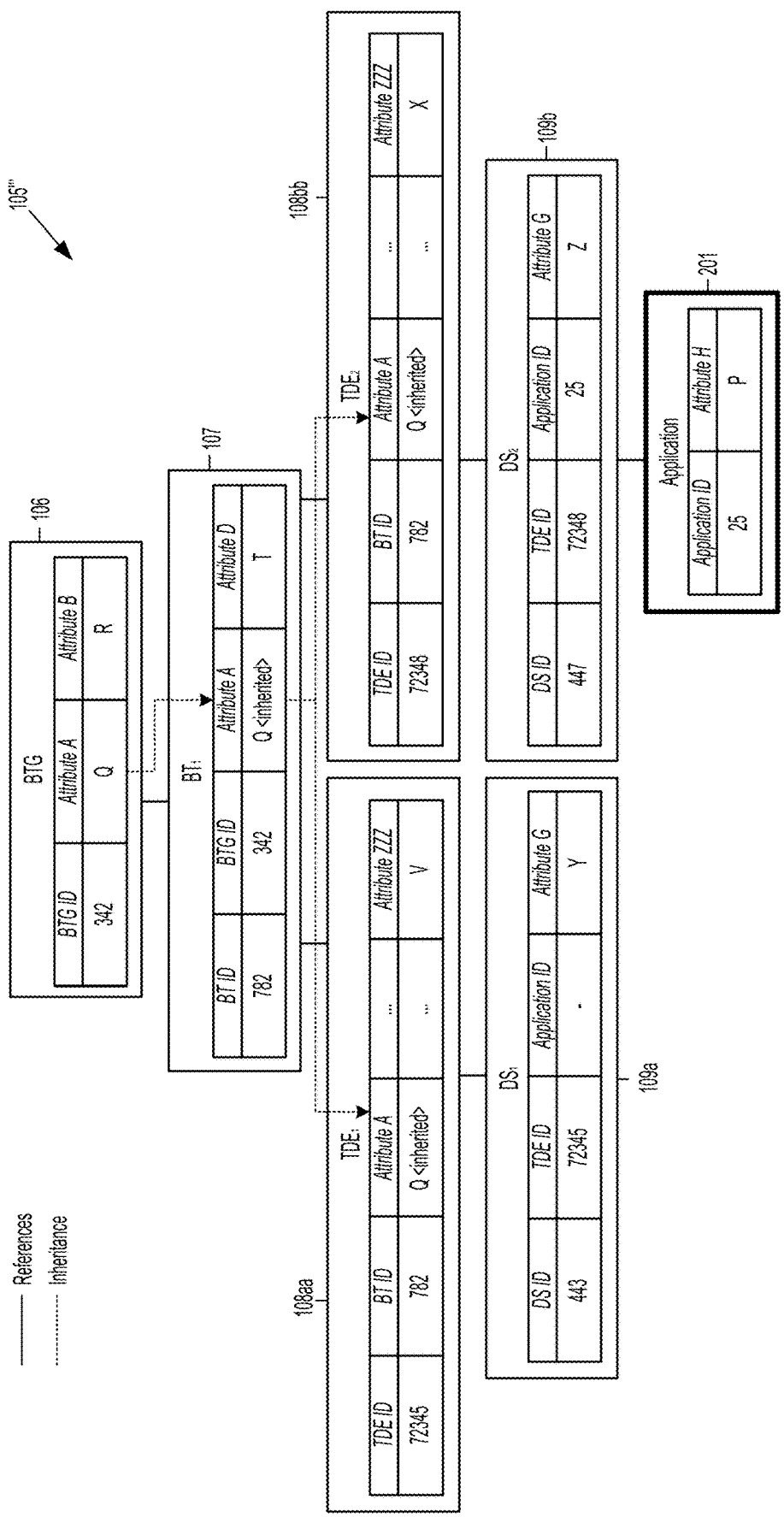
FIG. 9A illustrates an example of an entity model.

Referring to FIG. 9A, metadata model 105''' is shown. Metadata model 105''' is a version of the portion 105 of metadata model 104 shown in FIG. 6A. As such, some of the reference numbers in FIG. 9A are described with regard to FIG. 6A. Metadata model 105''' includes entity 201, which is referred to as an application entity and is part of an application entity class. Entity 201 represents various types of data processing applications, including, e.g., a data pipeline, as described in U.S. patent application Ser. No. 18/496, 543, the entire contents of which are incorporated herein by reference. Generally, a data pipeline is a data processing technique, in which data is ingested from data sources, transformed (e.g., by being cleansed and conformed), and then stored in a data lake or data warehouse. Entity 201 is an instance of the application entity class.

In this example, entity 201 is related to entity 109b, e.g., to specify that an application represented by entity 201 accesses a data set represented by entity 109b. Entity 109b is related to entity 108bb. As such, entity 201 is related to entity 108bb. The pipeline represented by entity 201 accesses and processes technical data elements represented by entity 108bb. The code for the pipeline is generated based on the technical data elements being accessed. As such, if there is a change in values of attributes of entity 108bb or a change in the types of attributes themselves, then the code for the pipeline has to be regenerated. In an example, attribute A specifies a name of a source of technical data elements (e.g., stored in a data store). In this example, the value of attribute A is database ABC. However, if the value of attribute A changes to, e.g., database XYZ, the code for the pipeline needs to be regenerated, e.g., to specify that TDEs from database XYZ, not database ABC, are being read. In another example, attribute A for entity 106 specifies whether PII is encrypted or not. In this example, a value of "yes" specifies that PII is encrypted, whereas a value of "no" specifies that PII is not encrypted. When the value of attribute A changes from "no" to "yes", this impacts code generation of the pipeline, since attribute A is an inherited attribute of entity 108bb.

However, in this same scenario, a change to the value of attribute B in entity 106 does not impact the pipeline represented by entity 201. As such, a data processing system does not need to generate a notification for entity 201 when a change occurs with regard to attribute B of entity 106. In fact, the generation of such a notification—due to entity 201 being related to entity 106—in the entity model 105″—would actually be inefficient, because there is no reason for a notification to be generated in this scenario. This highlights an advantage of this technology, namely, notifications can be targeted (e.g., to a particular application or other entity), rather than notifying for every change to an entity in the entity model, which conserves computational resources in generating and transmitting notifications.

This benefit is further highlighted by entities 108aa and 108bb, each of which has attributes A . . . ZZZ, totaling over 3000 attributes. In this example, a change to one or more of attributes A . . . ZZZ causes the pipeline represented by entity 201 to be regenerated. In an example, values of half of these attributes changes. If the system generated a notification for every change, then over 1500 notifications would be generated and transmitted. This is very computationally inefficient to generate all these notifications for every change. Using the techniques described herein, a single notification is generated, for entity 201, when any of the attributes included in entity 108bb changes. These techniques for generating only a single notification for a particular entity (e.g., instance of an entity class) improves computational efficiency and conserves resources, relative to computational efficiency and usage of resources when generating a notification for every change. Moreover, using the techniques described herein, a notification is only generated when there is a change to one or more attributes of an instance of an entity class that actually affects generation of the code for the pipeline. That is, entity 108bb may have some attributes that do not affect (or are not related to) generation of the code for the pipeline. As such, changes to these attributes do not result in a notification.

Figure 9B:
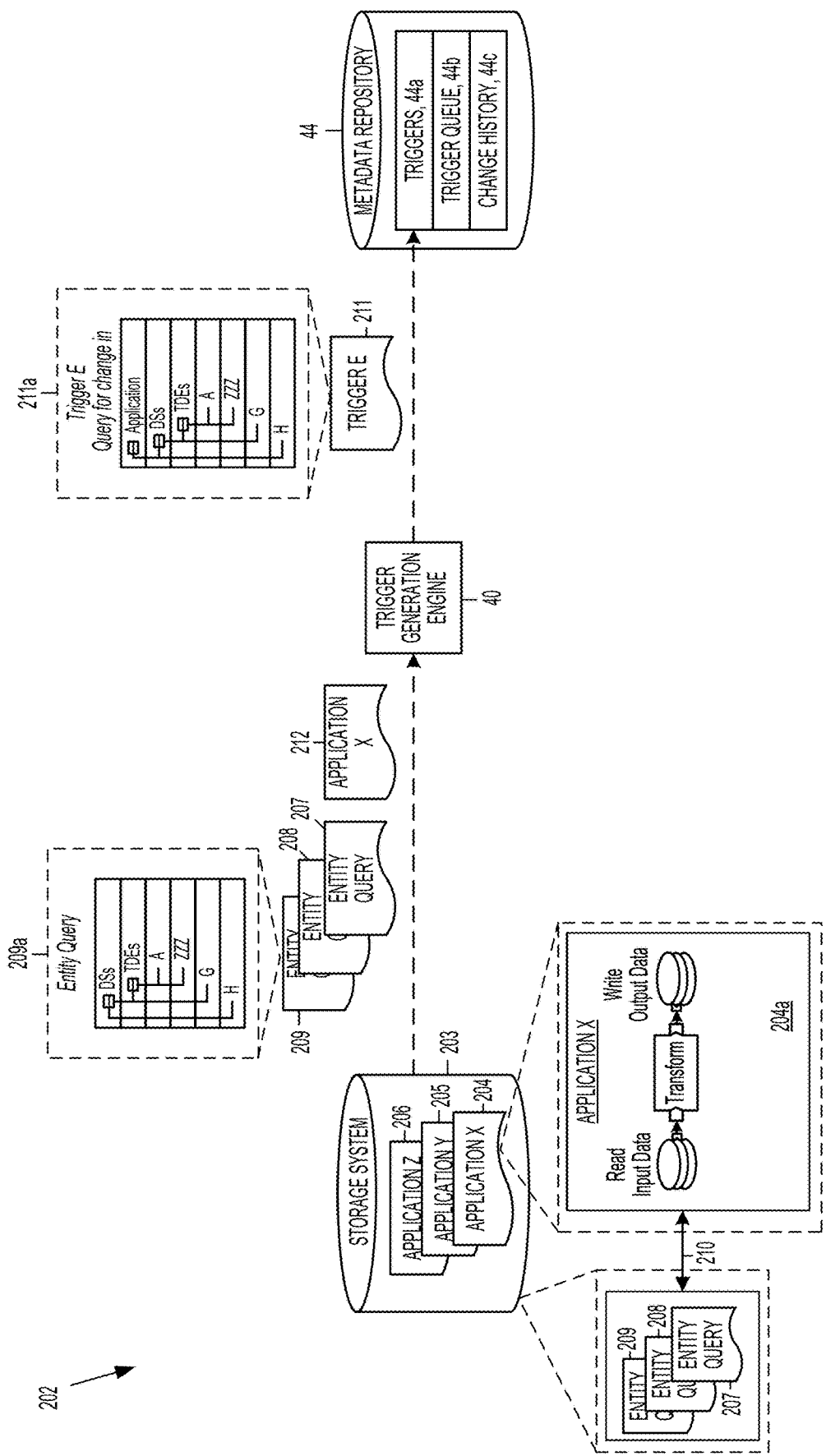
FIG. 9B illustrates a system for generating and executing triggers based on contents of applications.

Referring to FIG. 9B, system 202 is shown for automatically and dynamically generating triggers, e.g., based on contents of applications. System 202 includes storage system 203 that stores applications 204, 205, 206. Visualization 204a of application 204 is shown. Storage system 203 also stores entity queries 207, 208, 209 . . . . In this example, entity queries 207, 208, 209 are associated with application 204 through association 210 in storage system 203. Association 210 includes a link, a pointer, and so forth. Through association 210, application 204 is configured to use entity queries 207, 208, 209 in identifying which data to access to process with application 204. The data to be accessed is stored in a storage system and/or received from data sources and is represented in an entity model. To generate a trigger, trigger generation engine 40 may query storage system 203 for the entity queries for application 204. In response, storage system 203 transmits to trigger generation engine 40, entity queries 207, 208, 209 and application data 212, which specifies an application ID (or other identifying information) for application 204. Contents of entity query 209 are shown in visualization 209a. In this example, application data 212 specifies "Application ID: 25". Using entity query 209 and application data 212, trigger generation engine 40 generates trigger 211, as follows: To identify a root node, trigger generation engine 40 traverses entity or metadata model 105‴ (FIG. 9A) to identify an entity with an application ID matching the application ID specified by application data 212. In this example, trigger generation engine 40 identifies that entity 201 has the same application ID as application data 212. As such, trigger generation engine 40 identifies entity 201 being the root node for trigger 211. As previously described, a root node is an entity (e.g., an instance of an entity class) in the entity model for which a notification is generated, e.g., by the notification specifying the application ID of that entity. To generate trigger 211, trigger generation engine 40 updates entity query 209 with data specifying that the root node is the "Application" entity class.

Trigger 211 is stored in metadata repository 44. Contents of trigger 211 are shown in visualization 211a. Upon detection of a change in attributes A or ZZZ in the TDE entity class, attribute G in the DS entity class or attribute H in the application entity class, a notification is generated for the application represented by entity 201 and transmitted to a client device, e.g., that is responsible for regenerating code for the pipeline represented by entity 201. As described herein, rather than generating multiple notifications when changes are detected that are related to entity 201, a single notification is generated and that single notification specifies the ID of the root node-thereby conserving resources, while still generating a notification that the code for a pipeline may need to be regenerated.

Referring to FIG. 10, process 300 implemented by a data processing system is shown for automatically detecting a change in one or more entities of a first entity class, and, in response to the detecting, generating a notification specifying that a change relating to a second entity class has been detected. In operation, the data processing system stores (302), in a data store, an entity model for a plurality of entity classes. The entity model includes nodes and edges, with a node being associated with an entity of an entity class and with an edge specifying a relationship between nodes. In some examples, the entity model also stores or otherwise specifies the entities. In other examples, the entities themselves are stored in another data store and are referenced or are otherwise associated with the entity classes of the entity model. The data processing system determines (304) that a notification is to be generated upon detection of a change to one or more entities of a first entity class of the entity model, with the notification specifying that the detected change relates to a second entity class of the entity model. The data processing system makes this determination based on entity queries associated with applications, based on input received through the UI, and so forth. In some examples, using an application (e.g., a pipeline application), the data processing system is able to automatically generate the triggers, e.g., based on the entity queries included in or otherwise associated with a particular application. The data processing system receives (306) an indication of one or more changes to one or more entities, as described herein. Based on the received indication, the data processing system detects (308) whether the one or more changes specify a change to at least one of the one or more entities of the first entity class. When the one or more changes specify the change to the one or more entities of the first entity class, the data processing system traverses (310) one or more edges of the entity model to identify a node associated with an entity of the second entity class and having a relationship in the entity model to another node associated with the at least one of the one or more entities of the first entity class. The data processing system generates (312) the notification for the entity of the second entity class. The data processing system stores (314) the notification for transmission.

Figure 11:
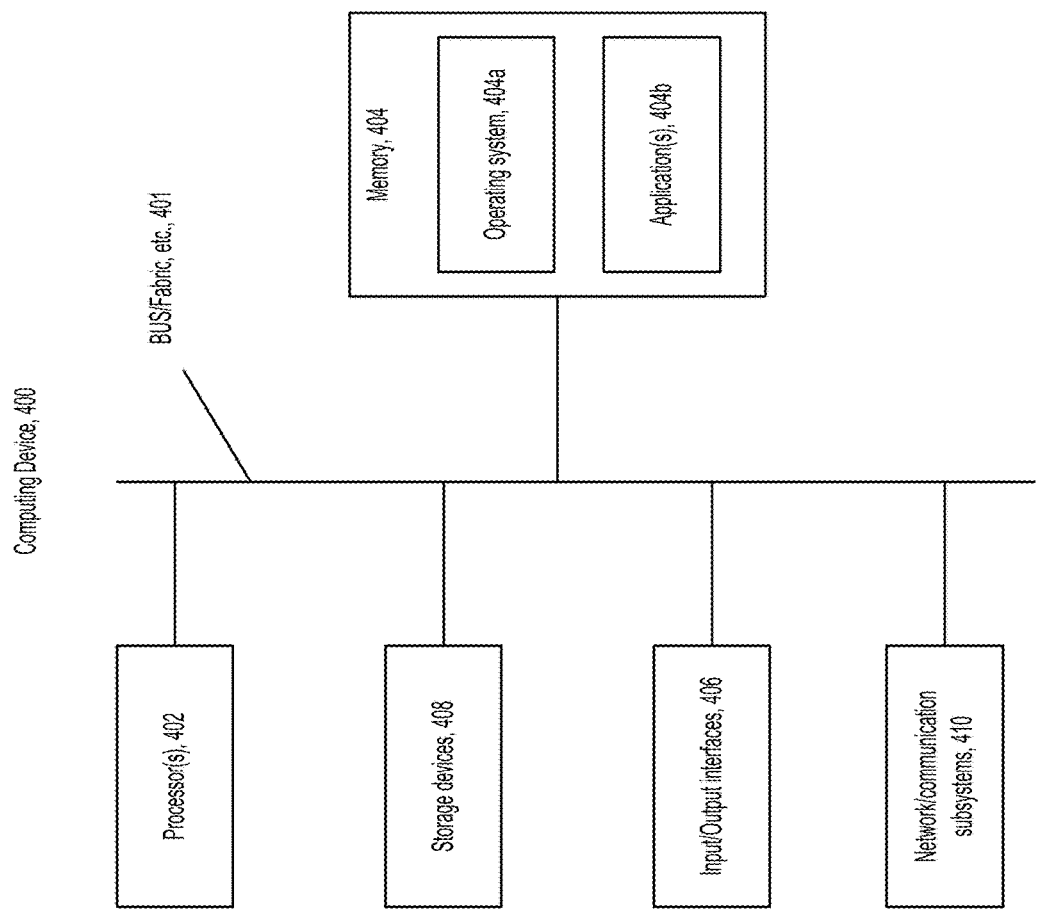
FIG. 11 is a diagram illustrating an example computing system.

Referring to FIG. 11, an example operating environment for implementing embodiments of the present invention is shown and designated generally as computing device 400. Essential elements of a computing device 400 or a computer or data processing system or client or server are one or more programmable processors 402 for performing actions in accordance with instructions and one or more memory devices 404 for storing instructions and data. Generally, a computer will also include, or be operatively coupled, (via bus 401, fabric, network, etc.) to I/O components 406, e.g., display devices, network/communication subsystems, etc. (not shown) and one or more mass storage devices 408 for storing data and instructions, etc., and a network communication subsystem 410, which are powered by a power supply (not shown). In memory devices 404, are an operating system 404a and applications 404b for application programming.

The computer program instructions and data may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is stored on or downloaded (from a cloud computing infrastructure or other remote source) to a computer-readable storage medium (e.g., solid state memory or media, or magnetic or optical media) of a storage device accessible by a general or special purpose programmable computer, for configuring and operating the computer when the storage device medium is read by the computer to perform the processing described herein. Each such computer program may also be accessed as a service provided by cloud computing infrastructure. The embodiments described herein may also be implemented as a tangible, non-transitory medium, configured with a computer program, where the medium so configured causes a computer to operate in a specific and predefined manner to perform one or more of the processing steps described herein.

The computer program may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

To provide for interaction with a user, embodiments of the subject matter described in this specification can be implemented on a computer having a display device (monitor) for displaying information to the user, and a keyboard and a pointing device, (e.g., a mouse or a trackball) by which the user can provide input to the computer. In addition, a computer can interact with a user by sending documents to and receiving documents from a device that is used by the user (for example, by sending web pages to a web browser on a user's device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN"), a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the user device). Data generated at the client device (e.g., a result of the user interaction) can be received from the client device at the server.

Any computation described herein can be expressed as dataflow through a computational graph with nodes and links. The computation includes components specifying portions of the computation. A node represents one or more of these components. The nodes are connected by the links to represent data flow, such as flow of data records, among the components. As such, a computational graph may also be referred to as a dataflow graph. The dataflow graph itself is executable, e.g., by compiling or otherwise processing the dataflow graph to generate executable computer code. Additional details regarding dataflow graphs are described in U.S. Pat. No. 5,966,072, titled "Executing Computations Expressed as Graphs," the entire content of which in incorporated herein by reference.

A component may be an upstream component, a downstream component, or both. An upstream component includes a component that outputs data to another component. A downstream component includes a component that receives data from another component. Additionally, components include input and output ports. The links are directed links that are coupled from an output port of an upstream component to an input port of a downstream component. The ports have indicators that represent characteristics of how data is written to and read from the links and/or how the components are controlled to process data. These ports may have various characteristics. For example, one characteristic of a port is its directionality as an input port or output port. The directed links represent data and/or control being conveyed from an output port of an upstream component to an input port of a downstream component.

A subset of the components serves as sources and/or sinks of data from the overall computation, for example, to and/or from data files, database tables, and external data flows. Parallelism can be achieved at least by enabling different components to be executed in parallel by different processes (hosted on the same or different server computers or processor cores), where different components executing in parallel on different paths through a dataflow graph is referred to as component parallelism, and different components executing in parallel on different portions of the same path through a dataflow graph is referred to as pipeline parallelism.

Generally applicable to executable dataflow graphs described herein, the executable dataflow graph implements a graph-based computation performed on data flowing from one or more input data sets of a data source through the data processing components to one or more output data sets, wherein the dataflow graph is specified by data structures in the data storage, the dataflow graph having the nodes that are specified by the data structures and representing the data processing components connected by the one or more links, the links being specified by the data structures and representing data flows between the data processing components. An execution environment or runtime environment is coupled to the data storage and is hosted on one or more computers, the runtime environment including a pre-processing module configured to read the stored data structures specifying the dataflow graph and to allocate and configure system resources (e.g. processes, memory, CPUs, etc.) for performing the computation of the data processing components that are assigned to the dataflow graph by the pre-processing module, the runtime environment including the execution module to schedule and control execution of the computation of the data processing components. In other words, the runtime or execution environment hosted on one or more computers is configured to read data from the data source and to process the data using an executable computer program expressed in form of the dataflow graph.

While this specification contains many specific implementation details, these should not be construed as limitations on the scope of any inventions or of what may be claimed, but rather as descriptions of features specific to particular embodiments of particular inventions.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Accordingly, other embodiments are within the scope of the following claims.

What is claimed is:

1. A method implemented by a data processing system for automatically detecting a change in one or more entities of a first entity class, and, in response to the detecting, generating a notification specifying that a change relating to a second entity class has been detected, including:
    storing, in a data store, an entity model for a plurality of entity classes, with the entity model including nodes and edges, with a node being associated with an entity of an entity class and with an edge specifying a relationship between nodes;
    determining, by a data processing system, that a notification is to be generated upon detection of a change to one or more entities of a first entity class of the entity model, with the notification specifying that the detected change relates to a second entity class of the entity model;
    receiving, by a data processing system, an indication of one or more changes to one or more entities;
    based on the received indication, detecting, by a data processing system, whether the one or more changes specify a change to at least one of the one or more entities of the first entity class;
    when the one or more changes specify the change to the one or more entities of the first entity class,
        traversing, by a data processing system, one or more edges of the entity model stored in the data store to identify a node associated with an entity of the second entity class and having a relationship in the entity model to another node associated with the at least one of the one or more entities of the first entity class;
    generating, by a data processing system, the notification for the entity of the second entity class; and
    storing, in a data store, the notification for transmission.

2. The method of claim 1, further including:
    for a given application of the data processing system,
        accessing one or more entity queries associated with that given application;
        identifying, based on the entity model, an entity representing the given application;
        identifying, in the entity model, an entity class of the identified entity, wherein the identified entity class is a root entity class;
    based on the one or more entity queries, generating one or more instructions to generate a notification for the root entity class upon detection of one or more changes to one or more entities of one or more entity classes specified by the one or more entity queries; and
    storing the one or more instructions.

3. The method of claim 2, further including:
    detecting one or more changes to one or more entities specified by the one or more entity queries;
    identifying an entity of the root entity class that is associated with at least one of the one or more entities for which the one or more changes are detected; and
    generating a notification for the identified entity of the root entity class, with the notification specifying an identifier of the identified entity of the root entity class.

4. The method of claim 3, further including:
    responsive to the notification for the identified entity of the root entity class, causing regeneration of code of the given application.

5. The method of claim 1, wherein determining that a notification is to be generated includes:

determining that a notification is to be generated upon detection of a change to one or more attributes of the one or more entities of the first entity class of the entity model.

6. The method of claim 5, wherein one or more values of the one or more attributes are inherited from a third entity class of the entity model.

7. The method of claim 6, further including:
receiving inheritance data specifying that the one or more values of the one or more attributes of the one or more entities of the first entity class are inherited from the third entity class of the entity model;
wherein detecting whether the one or more changes specify a change to at least one of the one or more entities of the first entity class includes:
in accordance with the received inheritance data, detecting whether the one or more changes specify a change to one or more values of one or more attributes of one or more entities of the third entity class;
when the one or more changes specify the change to the one or more values of the one or more attributes of the one or more entities associated with the third entity class,
identifying an entity in the first entity class that inherits a value of the one or more attributes from at least one of the one or more entities in the third entity class; and
identifying an entity in the second entity class related to the identified entity in the first entity class;
generating a notification for the second entity class, with the generated notification specifying an identifier of the identified entity in the second entity class; and
storing the generated notification for transmission.

8. The method of claim 6, further including:
receiving inheritance data specifying that the one or more values of the one or more attributes of the one or more entities associated with the first entity class are inherited from the third entity class of the entity model and further specifying that the one or more inherited values are overwritten;
wherein detecting whether the one or more changes specify a change to at least one of the one or more entities associated with the first entity class includes:
in accordance with the received inheritance data, detecting whether the one or more changes specify a change to one or more values of one or more attributes of one or more entities of the first entity class;
when the one or more changes specify the change to the one or more values of the one or more attributes of the one or more entities of the first entity class,
identifying at least one of the one or more entities of the first entity class; and
identifying an entity in the second entity class related to the identified entity in the first entity class;
generating a notification for the second entity class, with the generated notification specifying an identifier of the identified entity in the second entity class; and
storing the generated notification for transmission.

9. The method of claim 6, wherein one or more values of the one or more attributes of one or more entities of the third entity class are inherited from a fourth entity class of the entity model, wherein the one or more values of the one or more attributes of one or more entities of the third entity class are overwritten, the method further including:

receiving inheritance data specifying that the one or more values of the one or more attributes of the one or more entities associated with the first entity class are inherited from the third entity class of the entity model and that one or more values of the one or more attributes of the third entity class are inherited from the fourth entity class and are overwritten;
wherein detecting whether the one or more changes specify a change to at least one of the one or more entities associated with the first entity class includes:
in accordance with the inheritance data,
detecting whether the one or more changes specify a change to one or more values of one or more attributes of one or more entities of the third entity class, and, if not,
detecting whether the one or more changes specify a change to one or more values of one or more attributes of one or more entities of the fourth entity class;
when the one or more changes specify the change to the one or more values of the one or more attributes of the one or more entities associated with the third entity class,
identifying an entity in the first entity class that inherits a value of the one or more attributes from at least one of the one or more entities in the third entity class;
when the one or more changes specify the change to the one or more values of the one or more attributes of the one or more entities associated with the fourth entity class and not the third entity class,
identifying an entity in the third entity class that inherits a value of the one or more attributes from at least one of the one or more entities in the fourth entity class; and
identifying an entity in the first entity class related to the identified entity in the third entity class;
identifying an entity in the second entity class related to the identified entity in the first entity class;
generating a notification for the second entity class, with the generated notification specifying an identifier of the identified entity in the second entity class; and
storing the generated notification for transmission.

10. The method of claim 1, wherein the notification identifies the entity of the second entity class.

11. The method of claim 1, wherein detecting whether the one or more changes specify a change to at least one of the one or more entities of the first entity class includes executing one or more queries on a change set that specifies one or more changes to one or more attributes of one or more entities of the first entity class.

12. The method of claim 1, further including:
based on the indication, determining that at least one of the one or more changes relate to the first entity class; and
queuing instructions to perform the detecting of whether the one or more changes specify a change to at least one of the one or more entities of the first entity class.

13. The method of claim 1, wherein the traversing includes:
accessing a first data structure associated with the at least one of the one or more entities of the first entity class, the first data structure having a first key value;
identifying a second data structure having a second key value that matches the first key value;

joining at least a portion of the first data structure with at least a portion of the second data structure to produce a joined data structure; and selecting, from the joined data structure, an identifier for the entity of the second entity class.

14. One or more non-transitory machine-readable hardware storage devices for automatically detecting a change in one or more entities of a first entity class, and, in response to the detecting, generating a notification specifying that a change relating to a second entity class has been detected, the one or more machine-readable hardware storage devices storing instructions that, when executed by one or more processors, cause the one or more processors to perform operations including:

storing, in a data store, an entity model for a plurality of entity classes, with the entity model including nodes and edges, with a node being associated with an entity of an entity class and with an edge specifying a relationship between nodes;

determining that a notification is to be generated upon detection of a change to one or more entities of a first entity class of the entity model, with the notification specifying that the detected change relates to a second entity class of the entity model;

receiving an indication of one or more changes to one or more entities;

based on the received indication, detecting whether the one or more changes specify a change to at least one of the one or more entities of the first entity class;

when the one or more changes specify the change to the one or more entities associated with the first entity class, traversing one or more edges of the entity model to identify a node associated with an entity of the second entity class and having a relationship in the entity model stored in the data store to another node associated with the at least one of the one or more entities of the first entity class;

generating the notification for the entity of the second entity class; and storing, in a data store, the notification for transmission.

15. The one or more non-transitory machine-readable hardware storage devices of claim 14, wherein the operations further include:

for a given application, accessing one or more entity queries associated with that given application;

identifying, based on the entity model, an entity representing the given application;

identifying, in the entity model, an entity class of the identified entity, wherein the identified entity class is a root entity class;

based on the one or more entity queries, generating one or more instructions to generate a notification for the root entity class upon detection of one or more changes to one or more entities or one or more entity classes specified by the one or more entity queries; and storing the one or more instructions.

16. The one or more non-transitory machine-readable hardware storage devices of claim 15, wherein the operations further include:

detecting one or more changes to one or more entities specified by the one or more entity queries;

identifying an entity of the root entity class that is associated with at least one of the one or more entities for which the one or more changes are detected; and generating a notification for the identified entity of the root entity class, with the notification specifying an identifier of the identified entity of the root entity class.

17. The one or more non-transitory machine-readable hardware storage devices of claim 15, wherein the operations further include:

responsive to the notification for the identified entity of the root entity class, causing regeneration of code of the given application.

18. The one or more non-transitory machine-readable hardware storage devices of claim 14, wherein determining that a notification is to be generated includes:

determining that a notification is to be generated upon detection of a change to one or more attributes of one or more entities associated with a first entity class of the entity model.

19. A data processing system for automatically detecting a change in one or more entities of a first entity class, and, in response to the detecting, generating a notification specifying that a change relating to a second entity class has been detected, the data processing system including:

one or more processing devices; and one or more machine-readable hardware storage devices storing instructions that, when executed by the one or more processing devices, cause the one or more processing devices to perform operations including:

storing, in a data store, an entity model for a plurality of entity classes, with the entity model including nodes and edges, with a node being associated with an entity of an entity class and with an edge specifying a relationship between nodes;

determining that a notification is to be generated upon detection of a change to one or more entities associated with a first entity class of the entity model, with the notification specifying that the detected change relates to a second entity class of the entity model;

receiving an indication of one or more changes to one or more entities;

based on the received indication, detecting whether the one or more changes specify a change to at least one of the one or more entities associated with the first entity class;

when the one or more changes specify the change to the one or more entities associated with the first entity class, traversing one or more edges of the entity model to identify a node associated with an entity of the second entity class and having a relationship in the entity model stored in the data store to another node associated with the at least one of the one or more entities of the first entity class generating the notification for the entity of the second entity class; and storing, in a data store, the notification for transmission.

20. The data processing system of claim 19, wherein the operations further include:

for a given application of the data processing system, accessing one or more entity queries associated with that given application;

identifying, based on the entity model, an entity representing the given application;

identifying, in the entity model, an entity class of the identified entity, wherein the identified entity class is a root entity class;

based on the one or more entity queries, generating one or more instructions to generate a notification for the root entity class upon detection of one or more changes to one or more entities or one or more entity classes specified by the one or more entity queries; and storing the one or more instructions.

21. The data processing system of claim 20, wherein the operations further include:

detecting one or more changes to one or more entities specified by the one or more entity queries;

identifying an entity of the root entity class that is associated with at least one of the one or more entities for which the one or more changes are detected; and generating a notification for the identified entity of the root entity class, with the notification specifying an identifier of the identified entity of the root entity class.

22. The data processing system of claim 21, wherein the operations further include:

responsive to the notification for the identified entity of the root entity class, causing regeneration of code of the given application.

23. The data processing system of claim 19, wherein determining that a notification is to be generated includes:

determining that a notification is to be generated upon detection of a change to one or more attributes of one or more entities associated with a first entity class of the entity model.

* * * * *